(12) United States Patent
Lablans

(10) Patent No.: US 11,336,425 B1
(45) Date of Patent: *May 17, 2022

(54) CRYPTOGRAPHIC MACHINES CHARACTERIZED BY A FINITE LAB-TRANSFORM (FLT)

(71) Applicant: Peter Lablans, Morris Township, NJ (US)

(72) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 181 days.

This patent is subject to a terminal disclaimer.

(21) Appl. No.: 16/717,691

(22) Filed: Dec. 17, 2019

Related U.S. Application Data

(63) Continuation-in-part of application No. 15/442,556, filed on Feb. 24, 2017, now Pat. No. 10,515,567, (Continued)

(51) Int. Cl.
*H04L 7/00* (2006.01)
*G06F 7/58* (2006.01)
(Continued)

(52) U.S. Cl.
CPC ............ *H04L 7/0091* (2013.01); *G06F 7/584* (2013.01); *H03K 23/54* (2013.01);
(Continued)

(58) Field of Classification Search
CPC .................................. H04L 9/06; G06F 7/584
See application file for complete search history.

(56) References Cited

U.S. PATENT DOCUMENTS

| | | | | |
|---|---|---|---|---|
| 3,962,539 A | * | 6/1976 | Ehrsam ................. | H04L 9/0625 380/29 |
| 4,165,444 A | * | 8/1979 | Gordon ................. | H04L 9/0662 380/265 |

(Continued)

OTHER PUBLICATIONS

FIPS Pub 180-4—Secure Hash Standard (SHS), Aug. 2015, 31 pages, Information Technology Laboratory National Institute of Standards and Technology,Gaithersburg, MD 20899-890.
(Continued)

*Primary Examiner* — Jason Chiang

(57) ABSTRACT

Digital n-state switching devices are characterized by n-state switching tables with n greater than 4. N-state switching tables are transformed by a Finite Lab-transform (FLT) into an FLTed n-state switching table. Memory devices, processors and combinational circuits with inputs and an output are characterized by an FLTed n-state switching table and perform switching operations between physical states in accordance with an FLTed n-state switching table. The devices characterized by FLTed n-state switching tables are applied in cryptographic devices. The cryptographic devices perform standard cryptographic operations or methods that are modified in accordance with an FLT. One or more standard cryptographic methods are specified in Federal Information Processing Standard (FIPS) Publications. Security is improved by at least a factor $n^2$.

18 Claims, 20 Drawing Sheets

Related U.S. Application Data which is a continuation-in-part of application No. 15/244,985, filed on Aug. 23, 2016, now Pat. No. 10,650,373, which is a continuation-in-part of application No. 14/975,841, filed on Dec. 20, 2015, now abandoned, said application No. 15/442,556 is a continuation-in-part of application No. 14/752,997, filed on Jun. 28, 2015, now abandoned, which is a continuation-in-part of application No. 14/324,217, filed on Jul. 6, 2014, now Pat. No. 9,100,166, which is a continuation of application No. 13/118,767, filed on May 31, 2011, now Pat. No. 8,817,928, application No. 16/717,691, which is a continuation-in-part of application No. 16/532,489, filed on Aug. 6, 2019, now abandoned, and a continuation-in-part of application No. 16/172,584, filed on Oct. 26, 2018, now Pat. No. 11,093,213, which is a continuation-in-part of application No. 14/975,841, filed on Dec. 20, 2015, now abandoned, which is a continuation-in-part of application No. 14/622,860, filed on Feb. 14, 2015, now Pat. No. 9,218,158, which is a continuation of application No. 14/064,089, filed on Oct. 25, 2013, now abandoned, which is a continuation-in-part of application No. 12/952,482, filed on Nov. 23, 2010, now abandoned, and a continuation-in-part of application No. 12/980,504, filed on Dec. 29, 2010, now Pat. No. 8,577,026.

(60) Provisional application No. 62/209,331, filed on Aug. 24, 2015, provisional application No. 61/350,247, filed on Jun. 1, 2010, provisional application No. 62/299,935, filed on Feb. 25, 2016, provisional application No. 62/435,814, filed on Dec. 18, 2016, provisional application No. 62/455,555, filed on Feb. 6, 2017, provisional application No. 62/902,350, filed on Sep. 18, 2019.

(51) Int. Cl.
*H04L 9/00* (2022.01)
*H04J 13/00* (2011.01)
*H04J 13/10* (2011.01)
*H03K 23/54* (2006.01)

(52) U.S. Cl.
CPC ...... *H04J 13/0029* (2013.01); *H04J 13/0033* (2013.01); *H04J 13/0074* (2013.01); *H04J 13/10* (2013.01); *H04L 9/006* (2013.01)

(56) References Cited

U.S. PATENT DOCUMENTS

| | | | | |
|---|---|---|---|---|
| 5,854,759 | A | 12/1998 | Kaliski | |
| 5,995,539 | A * | 11/1999 | Miller | H04K 1/02 375/222 |
| 6,052,704 | A * | 4/2000 | Wei | G06F 7/724 708/492 |
| 6,111,952 | A * | 8/2000 | Patarin | H04L 9/3247 380/259 |
| 6,278,780 | B1 | 8/2001 | Shimada | |
| 6,343,305 | B1 | 1/2002 | Koc et al. | |
| 6,829,355 | B2 | 12/2004 | Lilly | |
| 7,369,661 | B2 | 5/2008 | Graunke | |
| 8,259,935 | B2 | 9/2012 | Riedl | |
| 8,666,062 | B2 * | 3/2014 | Lambert | G06F 7/726 713/169 |
| 9,379,891 | B2 | 8/2016 | Yoon et al. | |
| 10,515,567 | B2 * | 12/2019 | Lablans | H04L 9/3066 |
| 2005/0002523 | A1 | 1/2005 | Sonnekalb | |
| 2005/0074120 | A1 | 4/2005 | Vidakovic | |
| 2006/0149962 | A1 * | 7/2006 | Fountain | H04L 63/06 713/151 |
| 2006/0171530 | A1 | 8/2006 | Futa | |
| 2008/0075278 | A1 | 3/2008 | Gaubatz | |
| 2008/0143561 | A1 * | 6/2008 | Miyato | H04L 9/0618 341/79 |
| 2009/0089584 | A1 | 4/2009 | Bender | |
| 2009/0092250 | A1 * | 4/2009 | Lablans | G06F 7/582 380/255 |
| 2009/0168745 | A1 | 7/2009 | Ahmadi | |
| 2009/0220083 | A1 * | 9/2009 | Schneider | H04L 9/0662 380/42 |
| 2009/0285326 | A1 | 11/2009 | Lablans | |
| 2009/0310775 | A1 * | 12/2009 | Gueron | H04L 9/0643 380/28 |
| 2010/0057823 | A1 | 3/2010 | Filseth et al. | |
| 2011/0016321 | A1 * | 1/2011 | Sundaram | H04L 67/34 713/171 |
| 2011/0243320 | A1 * | 10/2011 | Halevi | H04L 9/0861 380/30 |
| 2012/0023336 | A1 * | 1/2012 | Natarajan | H04L 9/0841 713/179 |
| 2012/0121084 | A1 * | 5/2012 | Tomlinson | H04L 9/304 380/30 |
| 2012/0284533 | A1 | 11/2012 | Assche et al. | |
| 2014/0195782 | A1 | 7/2014 | Yap et al. | |
| 2014/0281761 | A1 | 9/2014 | Lablans | |

OTHER PUBLICATIONS

Barreto et al.; Whirlwind: a new cryptographic hash function, Des. Codes Cryptogr. (2010) 56:141-162;Apr. 16, 2010, published on-line.
FIPS Pub 202- SHA-3 Standard: Permutation-Based Hash and Extendable-Output Functions, Aug. 2015, 29 pages, Information Technology Laboratory National Institute of Standards.
Bertoni et al. ; Cryptographic sponge functions, version .1, Jan. 14, 2011, 93 pages, published on-line.
FIPS Pub 180-2, Secure Hash Standard (with Change Notice 1 ), Feb. 25, 2004, 79 pages Information Technology Laboratory National Institute of Standards and Technology.
NIST SP 800-67, Revision 1, Recommendation for the Triple Data Encryption Algorithm (TDEA) Block Cipher, 2012, Gaithersburg, MD 20899-8930.
FIPS Pub 46-3 Data Encryption Standard (DES), 1999, NIST Gaithersburg, MD 20899-8930.
FIPS Pub 186-4 Digital Signature Standard (DSS), 2015, NIST Gaithersburg, MD 20899-8930.
FIPS Pub 197—Advanced Encryption Standard, (AES), 2001, NIST Gaithersburg, MD 20899-8930.
FIPS Pub 198-1, The Keyed-Hash Message Authentication Code (HMAC), 2008, NIST Gaithersburg, MD 20899-8930.
RSA Laboratories PKCS #1 v2.2: RSA Cryptography Standard, Oct. 27, 2012.
RSA Laboratories PKCS#3: Diffie-Hellman Key Agreement Standard Revised Nov. 1, 1993.
The Elliptic Curve Digital Signature Algorithm (ECDSA), Johnson et al. 2001, Certicom Corporation 2001.
Standards for Efficient Cryptography SEC 1: Elliptic Curve Cryptography, version 2, Certicom Research, 2009.
OpenPGP Message Format, Memo, Callas et al., 2007, RFC4880, downloaded from https://tools.ietf.org/html/rfc4880.
Fast Software Exponentiation in GF(2k), C.Koc and T.Acar, Proceedings, 13th Symposium on Computer Arithmetic, T. Lang, J.-M. Muller, and N. Takagi, editors, pp. 225-231.
Efficient Finite Field Computations for Elliptic Curve Cryptography, Wangchen Dai, University of Windsor, Ontario, Canada, 2013.
Claude Shannon. A Symbolic Analysis of Relay and Switching Circuits Massachusetts Institute of Technology 1940.
Neal Wagner website URLhttp://www.cs.utsa.edu/-wagner/laws/FFM.html 2001.

(56) References Cited

OTHER PUBLICATIONS

Bernhard Linke the Fundamentals of an ECDSA Authentication System Maxim Integrated, May 16, 2014.

* cited by examiner

```
>> sc8i-1 ans =

```
>> m8i-1 ans =

```
1    % make sGF(8)
2 -  inv8=[2 3 4 5 6 7 0 1]+1;% the 8-state inverter
3    % make the reversing inverter rinv8
4 -  rinv8=zeros(1,8); % initialise
5 -  sc8i=zeros(8,8);
6 -  m8i=zeros(8,8);
7    % make rinv8
8 -  for k=1:8
9 -      ind=inv8(k);
10-      rinv8(ind)=k;
11-  end
12   % modify sc8 and m8
13-  for i1=1:8
14-      for i2=1:8
15-          ix=inv8(i1);
16-          iy=inv8(i2);
17-          aa=sc8(ix,iy);
18-          sc8i(i1,i2)=rinv8(aa);
19-          bb=m8(ix,iy);
20-          m8i(i1,i2)=rinv8(bb);
21-      end
22-  end
23   % display sc8i and m8i in origin 0
24-  sc8i-1
25-  m8i-1
```

FIG. 6 col 1-15                                                                                                                    3200

| | | | | | | | | | | | | | | |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | ①  | 2 | 3 | 4 | 5 | 6 | 7 | 8 | 9 | 10 | 11 | 12 | 13 | 14 |
| 0 | 2 | 3 | 4 | 5 | 6 | 7 | 8 | 9 | 10 | 11 | 12 | 13 | 14 | 15 |
| 0 | 3 | 4 | 5 | 6 | 7 | 8 | 9 | 10 | 11 | 12 | 13 | 14 | 15 | 16 |
| 0 | 4 | 5 | 6 | 7 | 8 | 9 | 10 | 11 | 12 | 13 | 14 | 15 | 16 | 17 |
| 0 | 5 | 6 | 7 | 8 | 9 | 10 | 11 | 12 | 13 | 14 | 15 | 16 | 17 | 18 |
| 0 | 6 | 7 | 8 | 9 | 10 | 11 | 12 | 13 | 14 | 15 | 16 | 17 | 18 | 19 |
| 0 | 7 | 8 | 9 | 10 | 11 | 12 | 13 | 14 | 15 | 16 | 17 | 18 | 19 | 20 |
| 0 | 8 | 9 | 10 | 11 | 12 | 13 | 14 | 15 | 16 | 17 | 18 | 19 | 20 | 21 |
| 0 | 9 | 10 | 11 | 12 | 13 | 14 | 15 | 16 | 17 | 18 | 19 | 20 | 21 | 22 |
| 0 | 10 | 11 | 12 | 13 | 14 | 15 | 16 | 17 | 18 | 19 | 20 | 21 | 22 | 23 |
| 0 | 11 | 12 | 13 | 14 | 15 | 16 | 17 | 18 | 19 | 20 | 21 | 22 | 23 | 24 |
| 0 | 12 | 13 | 14 | 15 | 16 | 17 | 18 | 19 | 20 | 21 | 22 | 23 | 24 | 25 |
| 0 | 13 | 14 | 15 | 16 | 17 | 18 | 19 | 20 | 21 | 22 | 23 | 24 | 25 | 26 |
| 0 | 14 | 15 | 16 | 17 | 18 | 19 | 20 | 21 | 22 | 23 | 24 | 25 | 26 | ① |
| 0 | 15 | 16 | 17 | 18 | 19 | 20 | 21 | 22 | 23 | 24 | 25 | 26 | ① | 2 |
| 0 | 16 | 17 | 18 | 19 | 20 | 21 | 22 | 23 | 24 | 25 | 26 | ① | 2 | 3 |
| 0 | 17 | 18 | 19 | 20 | 21 | 22 | 23 | 24 | 25 | 26 | ① | 2 | 3 | 4 |
| 0 | 18 | 19 | 20 | 21 | 22 | 23 | 24 | 25 | 26 | ① | 2 | 3 | 4 | 5 |
| 0 | 19 | 20 | 21 | 22 | 23 | 24 | 25 | 26 | ① | 2 | 3 | 4 | 5 | 6 |
| 0 | 20 | 21 | 22 | 23 | 24 | 25 | 26 | ① | 2 | 3 | 4 | 5 | 6 | 7 |
| 0 | 21 | 22 | 23 | 24 | 25 | 26 | ① | 2 | 3 | 4 | 5 | 6 | 7 | 8 |
| 0 | 22 | 23 | 24 | 25 | 26 | ① | 2 | 3 | 4 | 5 | 6 | 7 | 8 | 9 |
| 0 | 23 | 24 | 25 | 26 | ① | 2 | 3 | 4 | 5 | 6 | 7 | 8 | 9 | 10 |
| 0 | 24 | 25 | 26 | ① | 2 | 3 | 4 | 5 | 6 | 7 | 8 | 9 | 10 | 11 |
| 0 | 25 | 26 | ① | 2 | 3 | 4 | 5 | 6 | 7 | 8 | 9 | 10 | 11 | 12 |
| 0 | 26 | ① | 2 | 3 | 4 | 5 | 6 | 7 | 8 | 9 | 10 | 11 | 12 | 13 |

| 7 | 6 | 5 | 4 | 3 | 2 | 1 | 0 |
| 6 | 5 | 4 | 3 | 2 | 1 | 0 | 7 |
| 5 | 4 | 3 | 2 | 1 | 0 | 7 | 6 |
| 4 | 3 | 2 | 1 | 0 | 7 | 6 | 5 |
| 3 | 2 | 1 | 0 | 7 | 6 | 5 | 4 |
| 2 | 1 | 0 | 7 | 6 | 5 | 4 | 3 |
| 1 | 0 | 7 | 6 | 5 | 4 | 3 | 2 |
| 0 | 7 | 6 | 5 | 4 | 3 | 2 | 1 |

| 0 | 1 | 2 | 3 | 4 | 5 | 6 | 7 |
| 1 | 0 | 6 | 4 | 3 | 7 | 2 | 5 |
| 2 | 6 | 0 | 7 | 5 | 4 | 1 | 3 |
| 3 | 4 | 7 | 0 | 1 | 6 | 5 | 2 |
| 4 | 3 | 5 | 1 | 0 | 2 | 7 | 6 |
| 5 | 7 | 4 | 6 | 2 | 0 | 3 | 1 |
| 6 | 2 | 1 | 5 | 7 | 3 | 0 | 4 |
| 7 | 5 | 3 | 2 | 6 | 1 | 4 | 0 |

| 0 | 1 | 5 | 4 | 2 | 3 | 7 | 6 |
| 1 | 0 | 7 | 2 | 4 | 6 | 5 | 3 |
| 5 | 7 | 0 | 6 | 3 | 2 | 1 | 4 |
| 4 | 2 | 6 | 0 | 1 | 7 | 3 | 5 |
| 2 | 4 | 3 | 1 | 0 | 5 | 6 | 7 |
| 3 | 6 | 2 | 7 | 5 | 0 | 4 | 1 |
| 7 | 5 | 1 | 3 | 6 | 4 | 0 | 2 |
| 6 | 3 | 4 | 5 | 7 | 1 | 2 | 0 |

```
1    function y=labtransform(table,invert)
2    % lab-transform or L-transformation
3    % inverts n-state switching table 'table' with
4    % n-state inverter 'invert' at inputs and
5    %reversing inverter 'rinvert' at output
6    % the table and inverter are in origin 1
7    % Copyright 2017 Ternarylogic LLC. All right reserved
8
9    % determine size of 'table'
10   lent=size(table);
11   len=lent(2); % len is n
12
13   % initialize 'tableinv' and 'rinvert'
14   rinvert=zeros(1,len);
15   tableinv=zeros(len,len);
16
17   % determine 'rinvert' from 'invert'
18   for i=1:len
19       ind=invert(i);
20       rinvert(ind)=i;
21   end
22
23   % determine modified table 'tableinv'
24   for i1=1:len
25       for i2=1:len
26           k1=invert(i1); % invert input 1
27           k2=invert(i2); % invert input 2
28           aa=table(k1,k2);
29           tableinv(i1,i2)=rinvert(aa);% invert output
30       end
31   end
32   y=tableinv; % the inverted switching table
```

FIG. 14

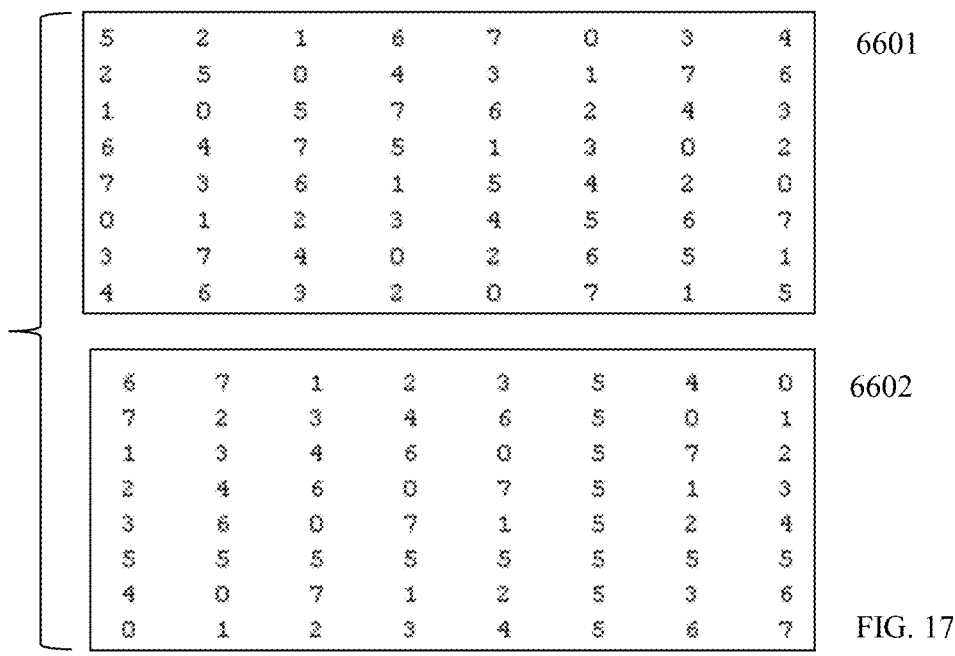

```
1   % Copyright 2017 Ternarylogic LLC. All right reserved
2   % make a 11-state (origin 1) switching table
3   % for * mod-11 and (e-irow-icolumn) mod n
4 - sc11=zeros(11,11);  % initialize
5 - m11=zeros(11,11);   % initialize
6 - eoff=4; % offset in (e-irow-icolumn) mod n
7
8 - for i1=1:11
9 -     for i2=1:11
10-     sc11(i1,i2)=mod(eoff-i1-i2,11)+1;% offset based
11-     m11(i1,i2)=mod((i1-1)*(i2-1),11)+1; % mult *
12-     end
13- end
14
15  % invert11
16- invert11=[6 9 4 2 1 11 8 7 10 3 5];
17
18  % labtransformation with invert11
19- labsc11=zeros(11,11);  % initialize
20- labm11=zeros(11,11);   % initialize
21- isc11=labtransform(sc11,invert11);
22- im11=labtransform(m11,invert11);
```

FIG. 21

| 3 | 5 | 1 | 7 | 2 | 9 | 4 | 10 | 6 | 8 | 11 |
|---|---|---|---|---|---|---|---|---|---|---|
| 5 | 2 | 10 | 11 | 1 | 8 | 9 | 6 | 7 | 3 | 4 |
| 1 | 10 | 7 | 9 | 6 | 5 | 3 | 11 | 4 | 2 | 8 |
| 7 | 11 | 9 | 5 | 4 | 10 | 1 | 8 | 3 | 6 | 2 |
| 2 | 1 | 6 | 4 | 10 | 3 | 8 | 7 | 11 | 5 | 9 |
| 9 | 8 | 5 | 10 | 3 | 11 | 7 | 2 | 1 | 4 | 6 |
| 4 | 9 | 3 | 1 | 8 | 7 | 6 | 5 | 2 | 11 | 10 |
| 10 | 6 | 11 | 8 | 7 | 2 | 5 | 4 | 9 | 1 | 3 |
| 6 | 7 | 4 | 3 | 11 | 1 | 2 | 9 | 8 | 10 | 5 |
| 8 | 3 | 2 | 6 | 5 | 4 | 11 | 1 | 10 | 9 | 7 |
| 11 | 4 | 8 | 2 | 9 | 6 | 10 | 3 | 5 | 7 | 1 |

7101

| 3 | 7 | 11 | 1 | 5 | 8 | 10 | 2 | 4 | 6 | 9 |
|---|---|---|---|---|---|---|---|---|---|---|
| 7 | 9 | 10 | 2 | 5 | 3 | 4 | 11 | 8 | 1 | 6 |
| 11 | 10 | 9 | 3 | 5 | 2 | 6 | 7 | 1 | 8 | 4 |
| 1 | 2 | 3 | 4 | 5 | 6 | 7 | 8 | 9 | 10 | 11 |
| 5 | 5 | 5 | 5 | 5 | 5 | 5 | 5 | 5 | 5 | 5 |
| 8 | 3 | 2 | 6 | 5 | 4 | 11 | 1 | 10 | 9 | 7 |
| 10 | 4 | 6 | 7 | 5 | 11 | 1 | 9 | 2 | 3 | 8 |
| 2 | 11 | 7 | 8 | 5 | 1 | 9 | 3 | 6 | 4 | 10 |
| 4 | 8 | 1 | 9 | 5 | 10 | 2 | 6 | 11 | 7 | 3 |
| 6 | 1 | 8 | 10 | 5 | 9 | 3 | 4 | 7 | 11 | 2 |
| 9 | 6 | 4 | 11 | 5 | 7 | 8 | 10 | 3 | 2 | 1 |

```
1  function y=labtransform_indiv_mod(i1,i2,k,plus,n)
2  % lab-transform of individual operations
3  % this example uses op=multiplication mod-n
4  % inputs i1 and i2, inverse is *k mod-n, and offset is plus
5  % Copyright 2017 Ternarylogic LLC. All right reserved
6
7      % begin body of individual lab-transform
8 -    k1=ruleinv(i1,k,plus,n); % determine inverted first input
9 -    k2=ruleinv(i2,k,plus,n); % determine inverted second input
10
11 -   outi=mulm(k1,k2,n);      % result of (k1*k2) mod-n
12
13 -   outr=rulerinv(outi,k,plus,n); % invert outi with reversing
14     % inverter wherein ruleinv and rulerinv combined are identity
15
16     % end of body of individual lab-transform
17
18 - y=outr; % output of labtransformed operation
```
7300

```
1  function y=ruleinv(i,k,plus,n)
2  % create inverter state from multiplication
3  % mod-n of input i with multiplier k and add plus mod-n
4  % Copyright 2017 Ternarylogic LLC. All right reserved
5
6 - y=mod((k*i)+plus,n); % multiplier row k +plus mod n
```
7301

```
1  function y=rulerinv(i,k,plus,n)
2  % create reverse inverter invn from multiplication
3  % mod-n at multiplier k and offset plus
4  % Copyright 2017 Ternarylogic LLC. All right reserved
5
6 - kinv=modinvn(k,n); % mult inverse of k
7 - r=mod(n-plus,n);   % position for which r+plus is 0
8 - x=mod(r*kinv,n);   % offset x at multiplier kinv
9 - y=mod((kinv*i)+x,n); % inverse of i by reversing inverter
```
7302

FIG. 23

```
1   function y=labtransform_consec(i1,i2,k,plus,n)
2   % lab-transform of individual operations
3   % is consecutive n-state multiplication
4   % for inversion factor k and offset plus
5   % Copyright 2017 Ternarylogic LLC. All right reserved
6   k1=rule_inv_cons(i1,k,plus,n); % determine input invert
7   k2=rule_inv_cons(i2,k,plus,n); % determine input invert
8   ax=mulnp(k1,k2,n); % results of consec mult of k1 and k2
9   % determine reverse invert of output
10  bx=rule_rinv_consec(k,plus,ax,n);
11  y=bx; % y is result
```
7400

```
1   function y=rule_inv_cons(i,k,plus,n)
2   % create inversion in n-state consecutive
3   % multiplication with factor k as inverter
4   % and offset plus
5   % Copyright 2017 Ternarylogic LLC. All right reserved
6   if i==0 % check if input is 0
7       aa=0;
8   else
9       % result of consecutive multiplication with k
10      aa=mod((k+i-1),n)+(((k+i-1)>=n)*1);
11  end
12  y=mod(aa+plus,n); % offset
```
7401

```
1   function y=rule_rinv_consec(k,p,i2,n)
2   % create reverse inversion in n-state consecutive
3   % multiplication with factor k as inverter
4   % and offset plus
5   % Copyright 2017 Ternarylogic LLC. All right reserved
6       kinv=(n+1-k); % determine multiplicative inverse
7   % next step determines shift of multiplication kinv
8       m=(n-p+i2)*(i2<p)+(0)*(i2==p)+(i2-p)*(i2>p);
9       if m==0
10          mp=0;
11      else
12          % determine reverse inversion state
13          mp=mod((kinv+m-1),n)+(((kinv+m-1)>=n)*1);
14      end
15  y=mp; % output result
```
7402

```
1   function y=mulnp(i1,i2,p)
2   % Copyright 2017 Ternarylogic LLC. All right reserved
3   % determine n-state consecutive product
4   if i1*i2==0
5       mp=0;
6   else
7       mp=mod((i1+i2-1),p)+(((i1+i2-1)>=p)*1); % result
8   end
9   y=mp;
```
7403

FIG. 24

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |
| 0 | 2 | 4 | 6 | 8 | 10 | 12 | 14 | 1 | 3 | 5 | 7 | 9 | 11 | 13 |
| 0 | 3 | 6 | 9 | 12 | 0 | 3 | 6 | 9 | 12 | 0 | 3 | 6 | 9 | 12 |
| 0 | 4 | 8 | 12 | 1 | 5 | 9 | 13 | 2 | 6 | 10 | 14 | 3 | 7 | 11 |
| 0 | 5 | 10 | 0 | 5 | 10 | 0 | 5 | 10 | 0 | 5 | 10 | 0 | 5 | 10 |
| 0 | 6 | 12 | 3 | 9 | 0 | 6 | 12 | 3 | 9 | 0 | 6 | 12 | 3 | 9 |
| 0 | 7 | 14 | 6 | 13 | 5 | 12 | 4 | 11 | 3 | 10 | 2 | 9 | 1 | 8 |
| 0 | 8 | 1 | 9 | 2 | 10 | 3 | 11 | 4 | 12 | 5 | 13 | 6 | 14 | 7 |
| 0 | 9 | 3 | 12 | 6 | 0 | 9 | 3 | 12 | 6 | 0 | 9 | 3 | 12 | 6 |
| 0 | 10 | 5 | 0 | 10 | 5 | 0 | 10 | 5 | 0 | 10 | 5 | 0 | 10 | 5 |
| 0 | 11 | 7 | 3 | 14 | 10 | 6 | 2 | 13 | 9 | 5 | 1 | 12 | 8 | 4 |
| 0 | 12 | 9 | 6 | 3 | 0 | 12 | 9 | 6 | 3 | 0 | 12 | 9 | 6 | 3 |
| 0 | 13 | 11 | 9 | 7 | 5 | 3 | 1 | 14 | 12 | 10 | 8 | 6 | 4 | 2 |
| 0 | 14 | 13 | 12 | 11 | 10 | 9 | 8 | 7 | 6 | 5 | 4 | 3 | 2 | 1 |

FIG. 25

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |
| 0 | 2 | 8 | 11 | 0 | 2 | 5 | 8 | 11 | 0 | 2 | 5 | 8 | 11 | 5 |
| 0 | 3 | 11 | 1 | 4 | 8 | 12 | 14 | 5 | 9 | 13 | 2 | 6 | 10 | 7 |
| 0 | 4 | 0 | 4 | 9 | 0 | 4 | 9 | 0 | 4 | 9 | 0 | 4 | 9 | 9 |
| 0 | 5 | 2 | 8 | 0 | 5 | 11 | 2 | 8 | 0 | 5 | 11 | 2 | 8 | 11 |
| 0 | 6 | 5 | 12 | 4 | 11 | 3 | 10 | 2 | 9 | 14 | 8 | 1 | 7 | 13 |
| 0 | 7 | 8 | 14 | 9 | 2 | 10 | 3 | 11 | 4 | 12 | 5 | 13 | 6 | 1 |
| 0 | 8 | 11 | 5 | 0 | 8 | 2 | 11 | 5 | 0 | 8 | 2 | 11 | 5 | 2 |
| 0 | 9 | 0 | 9 | 4 | 0 | 9 | 4 | 0 | 9 | 4 | 0 | 9 | 4 | 4 |
| 0 | 10 | 2 | 13 | 9 | 5 | 14 | 12 | 8 | 4 | 1 | 11 | 7 | 3 | 6 |
| 0 | 11 | 5 | 2 | 0 | 11 | 8 | 5 | 2 | 0 | 11 | 8 | 5 | 2 | 8 |
| 0 | 12 | 8 | 6 | 4 | 2 | 1 | 13 | 11 | 9 | 7 | 5 | 3 | 14 | 10 |
| 0 | 13 | 11 | 10 | 9 | 8 | 7 | 6 | 5 | 4 | 3 | 2 | 14 | 1 | 12 |
| 0 | 14 | 5 | 7 | 9 | 11 | 13 | 1 | 2 | 4 | 6 | 8 | 10 | 12 | 3 |

FIG. 26

| 7 | 11 | 8 | 0 | 0 | 4 | 7 | 11 | 8 | 8 | 0 | 4 | 7 | 11 | 4 |
|---|---|---|---|---|---|---|---|---|---|---|---|---|---|---|
| 11 | 3 | 2 | 1 | 7 | 12 | 14 | 4 | 8 | 9 | 13 | 0 | 5 | 10 | 6 |
| 8 | 2 | 9 | 2 | 8 | 2 | 9 | 8 | 8 | 2 | 9 | 8 | 2 | 9 | 9 |
| 0 | 1 | 2 | 3 | 4 | 5 | 6 | 7 | 8 | 9 | 10 | 11 | 12 | 13 | 14 |
| 0 | 7 | 8 | 4 | 4 | 11 | 0 | 7 | 8 | 8 | 4 | 11 | 0 | 7 | 11 |
| 4 | 12 | 2 | 5 | 11 | 1 | 10 | 0 | 8 | 9 | 14 | 7 | 3 | 6 | 13 |
| 7 | 14 | 9 | 6 | 0 | 10 | 1 | 11 | 8 | 2 | 12 | 4 | 13 | 5 | 3 |
| 11 | 4 | 8 | 7 | 7 | 0 | 11 | 4 | 8 | 8 | 7 | 0 | 11 | 4 | 0 |
| 8 | 8 | 8 | 8 | 8 | 8 | 8 | 8 | 8 | 8 | 8 | 8 | 8 | 8 | 8 |
| 8 | 9 | 2 | 9 | 8 | 9 | 2 | 8 | 8 | 9 | 2 | 8 | 9 | 2 | 2 |
| 0 | 13 | 9 | 10 | 4 | 14 | 12 | 7 | 8 | 2 | 3 | 11 | 6 | 1 | 5 |
| 4 | 0 | 8 | 11 | 11 | 7 | 4 | 0 | 8 | 8 | 11 | 7 | 4 | 0 | 7 |
| 7 | 5 | 2 | 13 | 0 | 3 | 13 | 11 | 8 | 9 | 6 | 4 | 1 | 14 | 10 |
| 11 | 10 | 9 | 13 | 7 | 6 | 5 | 4 | 8 | 2 | 1 | 0 | 14 | 3 | 12 |
| 4 | 6 | 9 | 14 | 11 | 13 | 3 | 0 | 8 | 2 | 5 | 7 | 10 | 12 | 1 |

FIG. 27

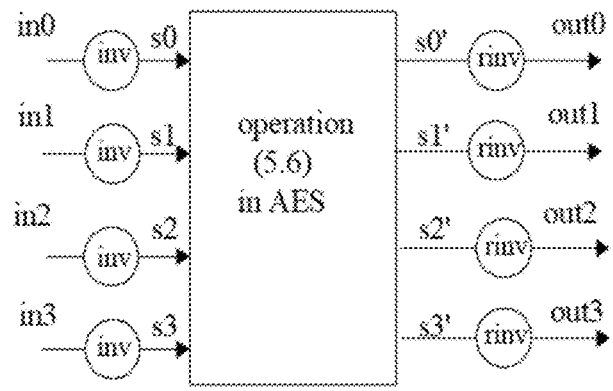
FIG. 28
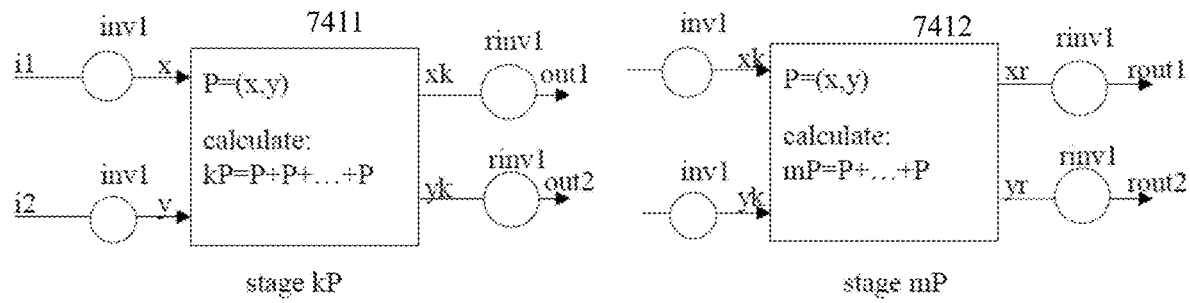
FIG. 29
```
                  7501                                          7502
AND8 | 000  001  010  011  100  101  110  111      AND8d | 0  1  2  3  4  5  6  7
000  | 000  000  000  000  000  000  000  000        0   | 0  0  0  0  0  0  0  0
001  | 000  001  000  001  000  001  000  001        1   | 0  1  0  1  0  1  0  1
010  | 000  000  010  010  000  000  010  010        2   | 0  0  2  2  0  0  2  2
011  | 000  001  010  011  000  001  010  011        3   | 0  1  2  3  0  1  2  3
100  | 000  000  000  000  100  100  100  100        4   | 0  0  0  0  4  4  4  4
101  | 000  001  000  001  100  101  100  101        5   | 0  1  0  1  4  5  4  5
110  | 000  000  010  010  100  100  110  111        6   | 0  0  2  2  4  4  5  6
111  | 000  001  010  011  100  101  110  111        7   | 0  1  2  3  4  5  6  7
```
FIG. 30

| $AND8dFLT$ | 0 | 1 | 2 | 3 | 4 | 5 | 6 | 7 |
|---|---|---|---|---|---|---|---|---|
| 0 | 1 | 3 | 0 | 3 | 7 | 6 | 6 | 7 |
| 1 | 3 | 1 | 1 | 3 | 5 | 5 | 6 | 6 |
| 2 | 0 | 1 | 2 | 3 | 4 | 5 | 6 | 7 |
| 3 | 3 | 3 | 3 | 3 | 6 | 6 | 6 | 6 |
| 4 | 7 | 5 | 4 | 6 | 4 | 5 | 6 | 7 |
| 5 | 6 | 5 | 5 | 6 | 5 | 5 | 6 | 6 |
| 6 | 6 | 6 | 6 | 6 | 6 | 6 | 6 | 6 |
| 7 | 7 | 6 | 7 | 6 | 7 | 6 | 6 | 7 |
7601
| $AND8FLT$ | 000 | 001 | 010 | 011 | 100 | 101 | 110 | 111 |
|---|---|---|---|---|---|---|---|---|
| 000 | 001 | 011 | 000 | 011 | 111 | 110 | 110 | 111 |
| 001 | 011 | 001 | 001 | 011 | 101 | 101 | 110 | 110 |
| 010 | 000 | 001 | 010 | 011 | 100 | 101 | 110 | 111 |
| 011 | 011 | 011 | 011 | 011 | 110 | 110 | 110 | 110 |
| 100 | 111 | 101 | 100 | 110 | 100 | 101 | 110 | 111 |
| 101 | 110 | 101 | 101 | 110 | 101 | 101 | 110 | 110 |
| 110 | 110 | 110 | 110 | 110 | 110 | 110 | 110 | 110 |
| 111 | 111 | 110 | 111 | 110 | 111 | 110 | 110 | 111 |
7602
FIG. 31
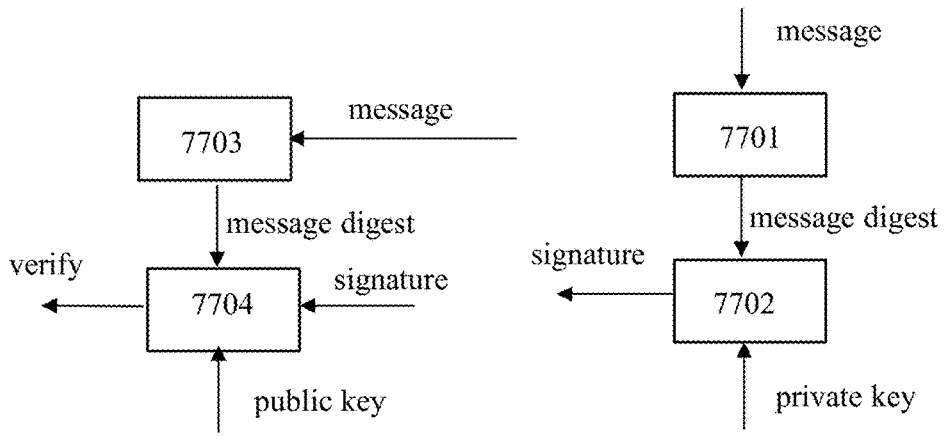
FIG. 32
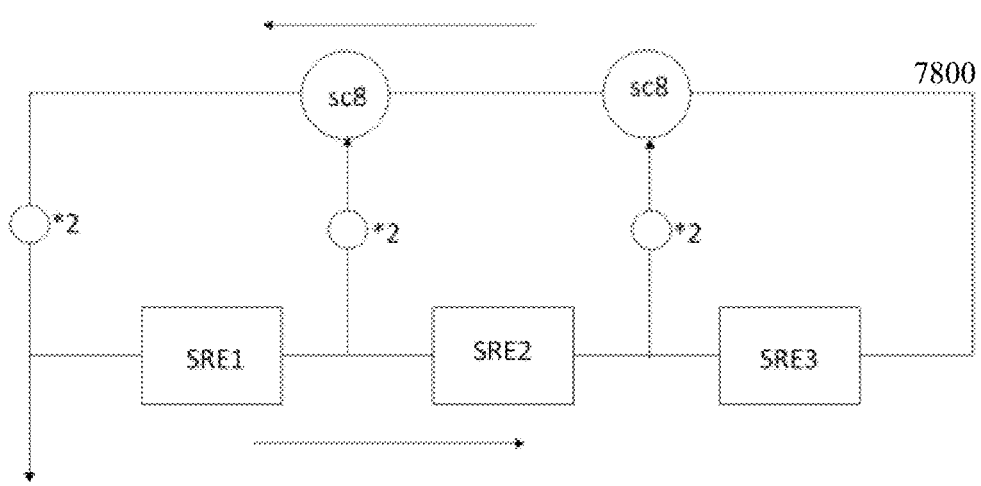
FIG. 33

3700

| 0 | 0 | 0 | 0 | 0 | 0 | 0 | 0 | 0 |
|---|---|---|---|---|---|---|---|---|
| 0 | 1 | 2 | 3 | 4 | 5 | 6 | 7 | 8 |
| 0 | 2 | 1 | 6 | 8 | 7 | 3 | 5 | 4 |
| 0 | 3 | 6 | 2 | 5 | 8 | 1 | 4 | 7 |
| 0 | 4 | 8 | 5 | 6 | 1 | 7 | 2 | 3 |
| 0 | 5 | 7 | 8 | 1 | 3 | 4 | 6 | 2 |
| 0 | 6 | 3 | 1 | 7 | 4 | 2 | 8 | 5 |
| 0 | 7 | 5 | 4 | 2 | 6 | 8 | 3 | 1 |
| 0 | 8 | 4 | 7 | 3 | 2 | 5 | 1 | 6 |

3701

| 0 | 0 | 0 | 0 | 0 | 0 | 0 | 0 | 0 |
|---|---|---|---|---|---|---|---|---|
| 0 | 1 | 2 | 3 | 4 | 5 | 6 | 7 | 8 |
| 0 | 2 | 1 | 6 | 8 | 7 | 3 | 5 | 4 |
| 0 | 3 | 6 | 7 | 1 | 4 | 5 | 8 | 2 |
| 0 | 4 | 8 | 1 | 5 | 6 | 2 | 3 | 7 |
| 0 | 5 | 7 | 4 | 6 | 2 | 8 | 1 | 3 |
| 0 | 6 | 3 | 5 | 2 | 8 | 7 | 4 | 1 |
| 0 | 7 | 5 | 8 | 3 | 1 | 4 | 2 | 6 |
| 0 | 8 | 4 | 2 | 7 | 3 | 1 | 6 | 5 |

3702

| 0 | 0 | 0 | 0 | 0 | 0 | 0 | 0 | 0 |
|---|---|---|---|---|---|---|---|---|
| 0 | 1 | 2 | 3 | 4 | 5 | 6 | 7 | 8 |
| 0 | 2 | 3 | 4 | 5 | 6 | 7 | 8 | 1 |
| 0 | 3 | 4 | 5 | 6 | 7 | 8 | 1 | 2 |
| 0 | 4 | 5 | 6 | 7 | 8 | 1 | 2 | 3 |
| 0 | 5 | 6 | 7 | 8 | 1 | 2 | 3 | 4 |
| 0 | 6 | 7 | 8 | 1 | 2 | 3 | 4 | 5 |
| 0 | 7 | 8 | 1 | 2 | 3 | 4 | 5 | 6 |
| 0 | 8 | 1 | 2 | 3 | 4 | 5 | 6 | 7 |

FIG. 37

| 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 |
| 1 | 3 | 5 | 7 | 9 | 11 | 13 | 15 | 17 | 2 | 4 | 6 | 8 | 10 | 12 | 14 | 16 |
| 1 | 4 | 7 | 10 | 13 | 16 | 2 | 5 | 8 | 11 | 14 | 17 | 3 | 6 | 9 | 12 | 15 |
| 1 | 5 | 9 | 13 | 17 | 4 | 8 | 12 | 16 | 3 | 7 | 11 | 15 | 2 | 6 | 10 | 14 |
| 1 | 6 | 11 | 16 | 4 | 9 | 14 | 2 | 7 | 12 | 17 | 5 | 10 | 15 | 3 | 8 | 13 |
| 1 | 7 | 13 | 2 | 8 | 14 | 3 | 9 | 15 | 4 | 10 | 16 | 5 | 11 | 17 | 6 | 12 |
| 1 | 8 | 15 | 5 | 12 | 2 | 9 | 16 | 6 | 13 | 3 | 10 | 17 | 7 | 14 | 4 | 11 |
| 1 | 9 | 17 | 8 | 16 | 7 | 15 | 6 | 14 | 5 | 13 | 4 | 12 | 3 | 11 | 2 | 10 |
| 1 | 10 | 2 | 11 | 3 | 12 | 4 | 13 | 5 | 14 | 6 | 15 | 7 | 16 | 8 | 17 | 9 |
| 1 | 11 | 4 | 14 | 7 | 17 | 10 | 3 | 13 | 6 | 16 | 9 | 2 | 12 | 5 | 15 | 8 |
| 1 | 12 | 6 | 17 | 11 | 5 | 16 | 10 | 4 | 15 | 9 | 3 | 14 | 8 | 2 | 13 | 7 |
| 1 | 13 | 8 | 3 | 15 | 10 | 5 | 17 | 12 | 7 | 2 | 14 | 9 | 4 | 16 | 11 | 6 |
| 1 | 14 | 10 | 6 | 2 | 15 | 11 | 7 | 3 | 16 | 12 | 8 | 4 | 17 | 13 | 9 | 5 |
| 1 | 15 | 12 | 9 | 6 | 3 | 17 | 14 | 11 | 8 | 5 | 2 | 16 | 13 | 10 | 7 | 4 |
| 1 | 16 | 14 | 12 | 10 | 8 | 6 | 4 | 2 | 17 | 15 | 13 | 11 | 9 | 7 | 5 | 3 |
| 1 | 17 | 16 | 15 | 14 | 13 | 12 | 11 | 10 | 9 | 8 | 7 | 6 | 5 | 4 | 3 | 2 |

FIG. 38

| 1 | 3 | 5 | 7 | 9 | 11 | 13 | 15 | 16 | 2 | 4 | 6 | 8 | 10 | 12 | 14 |
|---|---|---|---|---|---|---|---|---|---|---|---|---|---|---|---|
| 1 | 4 | 7 | 10 | 13 | 16 | 2 | 5 | 8 | 11 | 14 | 15 | 3 | 6 | 9 | 12 |
| 1 | 5 | 9 | 13 | 14 | 4 | 8 | 12 | 16 | 3 | 7 | 11 | 15 | 2 | 6 | 10 |
| 1 | 6 | 11 | 16 | 4 | 9 | 14 | 2 | 7 | 12 | 13 | 5 | 10 | 15 | 3 | 8 |
| 1 | 7 | 13 | 2 | 8 | 14 | 3 | 9 | 15 | 4 | 10 | 16 | 5 | 11 | 12 | 6 |
| 1 | 8 | 15 | 5 | 12 | 2 | 9 | 16 | 6 | 13 | 3 | 10 | 11 | 7 | 14 | 4 |
| 1 | 9 | 10 | 8 | 16 | 7 | 15 | 6 | 14 | 5 | 13 | 4 | 12 | 3 | 11 | 2 |
| 1 | 10 | 2 | 11 | 3 | 12 | 4 | 13 | 5 | 14 | 6 | 15 | 7 | 16 | 8 | 9 |
| 1 | 11 | 4 | 14 | 7 | 8 | 10 | 3 | 13 | 6 | 16 | 9 | 2 | 12 | 5 | 15 |
| 1 | 12 | 6 | 7 | 11 | 5 | 16 | 10 | 4 | 15 | 9 | 3 | 14 | 8 | 2 | 13 |
| 1 | 13 | 8 | 3 | 15 | 10 | 5 | 6 | 12 | 7 | 2 | 14 | 9 | 4 | 16 | 11 |
| 1 | 14 | 10 | 6 | 2 | 15 | 11 | 7 | 3 | 16 | 12 | 8 | 4 | 5 | 13 | 9 |
| 1 | 15 | 12 | 9 | 6 | 3 | 4 | 14 | 11 | 8 | 5 | 2 | 16 | 13 | 10 | 7 |
| 1 | 16 | 14 | 12 | 10 | 8 | 6 | 4 | 2 | 3 | 15 | 13 | 11 | 9 | 7 | 5 |
| 1 | 2 | 16 | 15 | 14 | 13 | 12 | 11 | 10 | 9 | 8 | 7 | 6 | 5 | 4 | 3 |

FIG. 39

CRYPTOGRAPHIC MACHINES CHARACTERIZED BY A FINITE LAB-TRANSFORM (FLT)

CROSS-REFERENCE TO RELATED CASES

This application claims the benefit of: and is a continuation-in-part of patent application Ser. No. 15/442,556 filed on Feb. 24, 2017, which claims the benefit of and is a continuation-in-part of patent Ser. No. 15/244,985 filed on Aug. 23, 2016. Application Ser. No. 15/244,985 claims the benefit of Provisional Patent Application 62/209,331 filed on Aug. 24, 2015. This application claims the benefit of Provisional Patent Application 62/902,350 filed on Sep. 18, 2019. Patent application Ser. No. 15/244,985 claims the benefit and is a continuation-in-part of patent application Ser. No. 14/975,841 filed on Dec. 20, 2015. Patent application Ser. No. 15/442,556 claims the benefit and is a continuation-in-part of patent application Ser. No. 14/752,997 filed on Jun. 28, 2015, which is a continuation-in-part of and claims the benefit of Ser. No. 14/324,217 filed on Jul. 6, 2014 now U.S. Pat. No. 9,100,166 issued on Aug. 4, 2015, which is a continuation of Ser. No. 13/118,767 filed on May 31, 2011 now U.S. Pat. No. 8,817,928 issued Aug. 26, 2014, which claims the benefit of provisional patent application No. 61/350,247, filed Jun. 1, 2010. Patent application Ser. No. 15/442,556 also claims the benefit of provisional patent application No. 62/299,935 filed on Feb. 25, 2016. Patent application Ser. No. 15/442,556 claims the benefit of U.S. Provisional Patent Application No. 62/435,814 filed on Dec. 18, 2016. Patent application Ser. No. 15/442,556 claims the benefit of U.S. Provisional Patent Application No. 62/455,555 filed on Feb. 6, 2017. This patent application claims the benefit and is a continuation-in-part of patent application Ser. No. 16/532,489 filed on Aug. 6, 2019. This patent application claims the benefit and is a continuation-in-part of patent application Ser. No. 16/172,584 filed on Oct. 26, 2018. Application Ser. No. 16/172,584 claims the benefit and is a continuation-in-part of patent application Ser. No. 14/975,841 filed on Dec. 20, 2015. Patent application Ser. No. 14/975,841 claims the benefit and is a continuation-in-part of patent application Ser. No. 14/622,860 filed on Feb. 14, 2015 now U.S. Pat. No. 9,218,158 issued on Dec. 22, 2015. Patent application Ser. No. 14/622,860 claims the benefit and is a continuation in part of patent application Ser. No. 14/064,089 filed on Oct. 25, 2013. Patent application Ser. No. 14/064,089 claims the benefit and is a continuation-in-part of patent application Ser. No. 12/952,482 filed on Nov. 23, 2010. Patent application Ser. No. 14/064,089 claims the benefit and is a continuation-in-part of patent application Ser. No. 12/980,504 filed on Dec. 29, 2010 now U.S. Pat. No. 8,577,026 issued on Nov. 5, 2013. All of the above mentioned patent applications and issued patents are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Aspects of the present invention relate to machine cryptography. Data exchange between computing devices often takes place over communication channels that are not secure. Furthermore, networked devices are often a (unintended) gateway to the management, control and security of the network and devices attached to a network, wherein the network is often connected or part of a public network such as the Internet and may provide access to a bank account or access to a house, a garage, a car, a refrigerator, a camera, a thermostat, a cell phone, a tv device, a tablet, a PC, an industrial facility, the electricity network or other utility network, radar installation, or any other computing device that is enabled to communicate. It is important to guard against unauthorized access of connected devices and to keep the information that is exchanged as private as possible.

Cryptographic procedures performed by machines of authentication, public and private key generation and distribution, encipherment and decipherment rely on public and standard procedures wherein at least one aspect is user specific, but the steps of a procedure are known, including logic functions and/or logic circuits that are used. Many cryptographic procedures are for instance published as standards by the National Institute of Standards and Technology (NIST) of the US Department of Commerce. The advantage is that some of the best procedures are made publicly available. Because such procedures are so widely used they are also widely studied and susceptible to ever improving attacking procedures. Because the published security procedures are recognized as being among the best available, the general user is generally unable to develop a new procedure that is better than the standard ones.

Colloquially one may say that a computer performs logic. However, logic per se is a human activity and a device does not perform logic. A computing device performs a physical switching operation in accordance with a switching table that may be represented by a truth table as applied in logic. Accordingly, the logic or truth tables as used in binary logic are a model of the physical device. This allows a binary switching device to be modeled by Boolean expressions as discovered by Shannon and described in the Master Thesis by Claude Elwood Shannon, entitled A Symbolic Analysis of Relay and Switching Circuits and marked as Submitted in Partial Fulfillment of the Requirements for the Degree of Master of Science from the Massachusetts Institute of Technology 1940, which is incorporated herein by reference. Rather than talking about switching, it is common to say that a computer performs logic, rather than: a computing device operates in a manner that can be described, represented or modeled by Boolean expressions. To prevent any uncertainty, logic herein means machine logic or machine switching technology. Herein a physical state of a machine is modified. Logic states or symbolic states as in human reasoning or arithmetic do not occur in a machine. States like 0 and 1 (or any symbolic state) do not physically exist in a machine but are represented by physically displaying a character that means 0 or 1 on a screen or a medium. There is no anthropomorphic awareness inside a machine of any symbolic meaning of signals. Similarly, entering a "symbol" by for instance activating a key of a computer input device, is merely a generating of one or more signals. A computer for instance does not know that 7 is greater than 6 and has to be instructed to process signals representing 6 and 7 in accordance with that aspect.

It will increase security of a computing device when one can modify existing machine procedures and devices in an unpredictable or hard to predict way that would make attacks on security procedures harder to be successful while maintaining strong aspects of known security and cryptography programs and procedures.

Accordingly, novel and improved methods and devices are required that use difficult to predict parameters in modifying standard cryptographic methods and devices.

SUMMARY OF THE INVENTION

In accordance with an aspect of the present invention a device to provide one or more signals on a communication channel is provided, comprising: a processor and a memory coupled to the processor, wherein the processor is capable of executing programmed instructions stored in the memory to perform the steps: receiving a message and processing the message in an n-state symbol format with n greater than 4 or n greater than 8; processing the message in the n-state format in accordance with a modification of a cryptographic method, the cryptographic method being selected from the group consisting of an encryption, a decryption, a Diffie-Hellman key exchange, a message digest generation, an elliptic curve cryptographic operation, a digital signature generation, a message authentication code (MAC) generation, wherein the modification is characterized by a Finite Lab Transform (FLT) of an n-state computer operation into a Finite Lab Transformed (FLTed) n-state computer operation, the n-state computer operation is selected from the group consisting of a modulo-n addition, a modulo-n multiplication, an addition over finite field GF(n), a multiplication over finite field GF(n) and an n-state multiplication all with n greater than 4 or greater than 8 and with a zero-element being 0 and a one-element being 1; wherein the FLTed n-state computer operation is different from the n-state computer operation and the FLTed n-state computer operation is not characterized by the group consisting of: a modulo-n addition, a modulo-n multiplication, an addition over finite field $GF(n=q^p)$ with q a prime number and p greater than 1 and determined by an irreducible polynomial of degree p over GF(q), a multiplication over finite field $GF(n=q^p)$ determined by an irreducible polynomial of degree p over GF(q), p bitwise XOR operations with p being greater than 3; and providing the one or more signals generated in accordance with the modification of the cryptographic method on the communication channel.

In accordance with an aspect of the present invention a cryptographic apparatus is provided to generate one or more signals, comprising: an n-state switching circuit with n greater than 2 with a first input and a second input and an output that is characterized by a first n-state switching table wherein the first n-state switching table determines an n-state output state of the n-state switching circuit based on first and second n-state input states, each n-state state being a representation of one or more signals; the first n-state switching table being characterized by a Finite Lab Transform (FLT) of a second n-state switching table; the second n-state switching table being characterized by an n-state switching operation selected from the group consisting of: a modulo-n addition, a modulo-n multiplication, an addition over finite field GF(n), a multiplication over finite field GF(n) and an n-state multiplication all with n greater than 4 and with a zero-element being 0 and a one-element being 1; the first and second n-state switching table differ in at least one n-state output state and the first n-state switching table is different from an n-state switching table representing an n-state operation selected from the group consisting of: a modulo-n addition, a modulo-n multiplication, an addition over finite field $GF(n=q^p)$ with q a prime number and p greater than 1 or p greater than 2 and determined by an irreducible polynomial of degree p over GF(q), a multiplication over finite field $GF(n=q^p)$ determined by an irreducible polynomial of degree p over GF(q), an n-state consecutive multiplication; p bitwise XOR operations; the cryptographic apparatus is configured to perform a cryptographic operation selected from the group consisting of: an encryption, a decryption, a Diffie-Hellman key exchange, a message digest generation, an elliptic curve cryptographic operation, a digital signature generation, a message authentication code (MAC) generation; and an output of the cryptographic apparatus that provides the one or more signals created with the n-state switching circuit.

In accordance with a further aspect of the present invention a cryptographic apparatus is provided, wherein the first n-state switching table has a one element that is not 1 and/or has a zero element that is not 0.

In accordance with yet a further aspect of the present invention a cryptographic apparatus is provided, wherein the first n-state switching table represents a modified modulo-n multiplication.

In accordance with yet a further aspect of the present invention a cryptographic apparatus is provided, wherein the first n-state switching table represents a modified multiplication over a Finite Field $GF(n=2^p)$.

In accordance with yet a further aspect of the present invention a cryptographic apparatus is provided, wherein the cryptographic apparatus performs an Advanced Encryption Standard (AES) encryption or decryption as described in a Federal Information Processing Standard (FIPS) Publication that is modified with the n-state switching circuit.

In accordance with yet a further aspect of the present invention a cryptographic apparatus is provided, wherein the cryptographic apparatus performs a message digest generation as described in a Federal Information Processing Standard (FIPS) Publication that is modified with the n-state switching circuit.

In accordance with yet a further aspect of the present invention a cryptographic apparatus is provided, wherein the cryptographic apparatus performs a digital signature generation as described in a Federal Information Processing Standard (FIPS) Publication that is modified with the n-state switching circuit.

In accordance with yet a further aspect of the present invention a cryptographic apparatus is provided, wherein the cryptographic apparatus performs a Rivest-Shamir-Adleman (RSA) operation that is modified with the n-state switching circuit.

In accordance with yet a further aspect of the present invention a cryptographic apparatus is provided, wherein the cryptographic apparatus performs an elliptic curve cryptography (ECC) operation that is modified with the n-state switching circuit.

In accordance with yet a further aspect of the present invention a cryptographic apparatus is provided, wherein the cryptographic apparatus is a networked computer.

In accordance with yet a further aspect of the present invention a cryptographic apparatus is provided, wherein the cryptographic apparatus is a smartphone.

In accordance with yet a further aspect of the present invention a cryptographic apparatus is provided, wherein the cryptographic apparatus is a chipcard. A chipcard is usually a standard-size plastic debit card or credit card which contains an embedded microchip as well as a traditional magnetic stripe. The chip encrypts information to increase data security when making transactions at stores, terminals, or automated teller machines (ATMs). Chipcards may also be applied in access/opening systems. A chipcard may be read through direct contact or wirelessly.

In accordance with yet a further aspect of the present invention a cryptographic apparatus is provided, wherein the cryptographic apparatus is a door opener.

In accordance with yet a further aspect of the present invention a cryptographic apparatus is provided, wherein n is greater than 255.

In accordance with yet a further aspect of the present invention a cryptographic apparatus is provided, wherein the n-state switching circuit is a first n-state circuit with a first n-state inverter at each of the first and second outputs and with a second n-state inverter at the output, the first and second n-state inverters not being represented by identity.

In accordance with yet a further aspect of the present invention a cryptographic apparatus is provided, wherein n is greater than 2^100.

In accordance with another aspect of the present invention a method for generating cryptographic signals is provided, comprising: providing on a first input of an n-state switching circuit with n greater than 2 or n greater than 4 one or more signals representing a first n-state symbol; providing on a second input of the n-state switching circuit one or more signals representing a second n-state symbol; generating on an output of the n-state switching circuit one or more signals representing an n-state output state of the n-state switching circuit, the n-state switching circuit is characterized by a first n-state switching table, the first n-state switching table determining the n-state output state of the n-state switching circuit based on first and second n-state input states, each n-state state being a representation of one or more signals; wherein the first n-state switching table being characterized by a Finite Lab Transform (FLT) of a second n-state switching table; the second n-state switching table being characterized by an n-state switching operation selected from the group consisting of: a modulo-n addition, a modulo-n multiplication, an addition over finite field GF(n), a multiplication over finite field GF(n) and an n-state multiplication all with n greater than 4 or greater than 8 and with a zero-element being 0 and a one-element being 1; and the first and second n-state switching table differ in at least one n-state output state and the first n-state switching table is different from an n-state switching table representing an n-state operation selected from the group consisting of: a modulo-n addition, a modulo-n multiplication, an addition over finite field GF(n=q$^p$) with q a prime number and p greater than 1 or p greater than 2 and determined by an irreducible polynomial of degree p over GF(q), a multiplication over finite field GF(n=q$^p$) determined by an irreducible polynomial of degree p over GF(q), an n-state consecutive multiplication; p bitwise XOR operations; and performing by a cryptographic apparatus of which the n-state switching circuit is a part, a cryptographic operation selected from the group consisting of: an encryption, a decryption, a Diffie-Hellman key exchange, a message digest generation, an elliptic curve cryptographic operation, a digital signature generation, a message authentication code (MAC) generation; and outputting on an output of the cryptographic apparatus the one or more cryptographic signals created with the n-state switching circuit.

In accordance with yet another aspect of the present invention a method for generating cryptographic signals is provided, wherein the first n-state switching table has a one element that is not 1 and/or has a zero element that is not 0.

In accordance with yet another aspect of the present invention a method for generating cryptographic signals is provided, wherein the n-state switching circuit is a first n-state circuit with a first n-state inverter at each of the first and second outputs and with a second n-state inverter at the output, the first and second n-state inverters not being represented by identity.

In accordance with yet another aspect of the present invention a method for generating cryptographic signals is provided, wherein the cryptographic apparatus is one selected from the group consisting of: a computer, a smartphone, a chipcard, an ATM-machine, a device connected to the Internet, a Near Field Communication (NFC) device.

DESCRIPTION OF THE DRAWINGS

FIG. 1 is a diagram of a device that modifies a switching operation in accordance with various aspects of the present invention;

FIGS. 2, 3, 4 and 5 are screenshots of a switching table generated by a computing device in accordance with one or more aspects of the present invention;

FIG. 6 is a screenshot of computer instructions that modify a switching table in accordance with one or more aspects of the present invention;

FIG. 7 is a screenshot of a switching table generated by a computing device in accordance with one or more aspects of the present invention;

FIG. 10 illustrates an 8-state switching table that characterizes a switching device in accordance with an aspect of the present invention;

FIGS. 11 and 12 illustrate n-state switching tables with n=8 that characterize switching devices in accordance with an aspect of the present invention;

FIG. 14 is a screenshot of a computer program listing that performs a Finite Lab-transform in accordance with one or more aspects of the present invention; and FIGS. 15, 16, 17, 18, 19 and 20 are screenshots of n-state switching tables generated by a programmed processor.

FIG. 21 shows a screenshot of a Matlab® program that performs steps in accordance with one or more aspects of the present invention;

FIG. 22 shows modified n-state switching tables that are generated and realized on a switching device in accordance with one or more aspects of the present invention;

FIG. 23 shows screenshots of related Matlab programs that perform steps in accordance with one or more aspects of the present invention;

FIG. 24 shows screenshots of related Matlab programs that perform steps in accordance with one or more aspects of the present invention;

FIG. 25 illustrates a 15-state switching table;

FIGS. 26 and 27 illustrate 15-state switching tables in accordance with one or more aspects of the present invention;

FIGS. 28 and 29 illustrate FLT modified devices in accordance with one or more aspects of the present invention;

FIG. 30 illustrates 8-state switching function tables in binary and decimal representation;

FIG. 31 illustrates FLTed 8-state switching function tables;

FIG. 32 is a block diagram of digital signature devices;

FIGS. 33 and 34 are diagrams of 8-state shift registers with feedback;

FIG. 37 illustrates 9-state switching tables;

FIG. 38 illustrates a 17-state switching table; and

FIG. 39 illustrates a table of reversible 16-state inverters.

DESCRIPTION OF THE INVENTION

Figures 1, 2, 3:
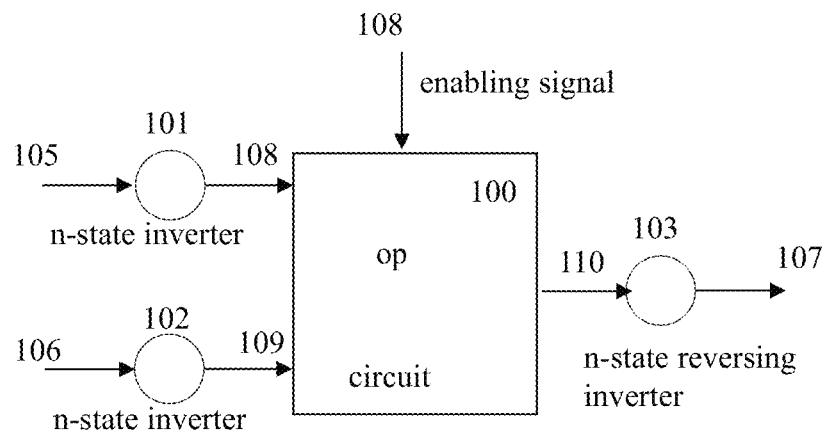

Embodiments of the present invention are directed to application of new n-state switching devices and the functions they perform in cryptographic machines. A cryptographic machine is a processor or processor-type device, such as a Field Programmable Gate Array (FPGA), digital circuitry with discrete digital switching components, memory with stored programs and limited functional circuitry (micro-programmed device), an ASIC or any other digital circuitry, that is enabled or configured to process signals that represent data and to generate signals being cryptographic data and to decrypt data. Cryptographic data include, but is not limited to encrypted data, a digital signature, an authentication, a public key, a message digest or hash, a Cyclic Redundancy Code (CRC), scrambled data. In general cryptographic data is encoded data of which the original data from which it is derived is not easy to determine. Security or cryptography procedures include: generating and distributing public keys, authenticating messages, creating message digests or hash functions, generating digital signatures, enciphering and deciphering messages and others. A message herein is digital data that is represented by one or more signals. Signals are generated by a device and are received by a device. Data as processed by cryptographic devices are commonly represented in binary form. Transmission of signals can be wired or wireless. Signals can for instance be an electrical, a magnetic, an electromagnetic, or an optical signal or a state of a material, including quantum-mechanical states. Signals may also be a mechanical signal such as a state of a device or a presence or absence of a material. Signals may be modulated and may be converted from one form into another. Most data signals are in some form designated to represent binary data. Data signals are often represented or described by symbols. Both the signals and their descriptive symbols can be binary or non-binary or a combination thereof. For instance a QAM-n signals with n>2 are generated by devices. A QAM-n signal may be characterized by a discrete state of phase and/or amplitude in a constellation. In 64-QAM or QAM-64 each state may be characterized by or transmit 6 bits. ASCII characters such as in an alphabet may include at least 26 different lower case symbols. These symbols can be further described or represented by bytes of 7 or 8 bits. Internally a computing device uses the byte, but on a display 26-state symbols (lower case characters) are used.

The terms logic function, binary logic function, n-state logic function, switching function, binary switching function, n-state switching function and the like are used herein. These functions are performed by physical circuits and thus the term "function" is fully intended to mean the same as a physical device and/or an electrical and/or electronic and/or optical and/or magnetic circuit or any other physical device that performs the function or performs in accordance with the function. In binary devices, the binary signals are commonly represented as LOW and HIGH and may be represented as 0 and 1 or 1 and 2, or any other representation that is convenient. An n-state function may apply a signal that assumes one of n-states. An n-state representation may further be a word of k-state representations. For instance a 256-state signal may be formed by a word of 8-bits, wherein the 8 bits may be formed by 8 binary signals that each may be one of a physical signal LOW or HIGH, wherein LOW may be a signal of 0V plus or minus 0.5V and HIGH may be a signal of 5 V plus or minus 1 V. Thus ultimately an n-state representation is a representation or labeling of a physical state of a device, for instance by a signal that is received.

Fundamental to digital circuits such as processors, FPGAs and memories is that they are state machines or switching machines. For their useful purposes, digital circuitry changes a physical state, based on an input signal and provides an output signal due to a new state. Commonly, states of devices are characterized by their input and output signals and are represented by binary states, commonly indicated as "high" and "low" when discussed in a physical sense and commonly labeled as "1" and "0." The "0" and "1" are merely labels for true signals. It is understood herein that switching devices characterized by states "0" and "1" are physical devices that switch between physical states. A two input device that switches from state "0" to "1", for instance may change from physical state "ground" to +4.9 Volt. The device may be a logic "AND" gate and the change may take place because two inputs are placed in state "1". The literature sometimes as operational representation of the AND gate that the product of two input states is the output state, like a multiplication 1*1=1. It is to be understood that this is a human representation that does not correctly describe the physical reality of the AND gate. The physical reality is that 4.9 V on a first input and 4.9 V on a second input will generate 4.9 V on the output. No mathematical multiplication takes place inside the device. One of ordinary skill would realize that 4.9*4.9 is not 4.9.

The meaning of the term switching table herein means a table that labels physical states with symbols. The symbols correspond with measurable and detectable physical states. A switching table means herein also that it is realized or implemented on a physical device including a combinational circuit or a memory. Cryptographic devices generally operate on bits or words of bits. A bit herein means a binary signal that can assume one of two states. The use of the symbols "0" and "1" only indicate that a signal is "low" or "high" using signal levels that are common in the computer and switching devices industry. For convenience n-states are used in numerical form, usually in origin 0 in [0, 1, 2, . . . n−1] or in programs like Matlab in origin 1 in [1, 2, 3, . . . n]. It is to be understood that each of n states corresponds to a real physical state that may be a word of binary signals.

Accordingly, n-state switching tables herein correspond to physical switching and n-state switching devices and are physical devices. None of the devices herein performs any arithmetical operation, even though for convenience arithmetical terms may be used.

One aspect of the present invention relates to the use of non-binary or n-state inverters which can be reversible or non-reversible. An n-state inverter is characterized by n symbols of which each can assume one of n-states. For convenience a numerical representation is used running from 0 to (n−1) or from 1 to n. An n-state inverter is assumed to have n possible input states. Each input generates an output. The n-state inverter is represented by the vector expression: [0 1 2 . . . n−1]→[a0 a1 a2 . . . an−1]. The left side represents the possible input states and the right side the output, wherein a0 is the output state generated by input state 0, a1 is the output state generated by input state 1, a2 is the output state generated by input state 2, and an−1 is the output state generated by input state n−1. The states of a0, a1, a2, . . . an−1 are selected from states 0, 1, 2, . . . n−1 and can be all different, in which case the inverter is reversible or at least two output states are the same, in which case the inverter is non-reversible.

An example of a reversible 4-state inverter is [0 1 2 3]→[2 0 3 1] in which input state 0 generates output state 2; input state 1 generates output state 0; input state 2 generates output state 3 and input state 3 generates output state 1. An example of a non-reversible 5-state inverters is [0 1 2 3 4]→[2 2 3 1 3]. Both input states 0 and 1 generate output states 2. It is impossible in that case to determine from the output state what the input state was. The reversing n-state inverter reverses the n-state inverter back to [0 1 2 . . . n−1]. The reversing inverter of 4-state inverter [0 1 2 3]→[2 0 3 1] is [0 1 2 3]→[1 3 0 2].

There are $n^n$ n-state inverters of which n! are reversible including the identity. There are over 16 million 8-state inverters of which 40,320 are reversible and includes [0 1 2 3 4 5 6 7]→[0 1 2 3 4 5 6 7] which is the identity 8-state inverter. The number of reversible inverters becomes very large when n increases. For n=16 there are over $2*10^{13}$ reversible inverters. Accordingly, the probability to predict an n-state inverter or to analyze data to determine use of an n-state inverter becomes extremely low.

Cryptography and error correction codes commonly uses functions that determine a finite field or Galois Field GF(n). The functions that determine the Galois field are generally called the addition and multiplication. There is often no visible relation between "normal" or radix-n addition and multiplication and Galois Field addition and multiplication for extension fields of Galois Fields. All Galois Fields have a neutral element escn for the operation "addition" designated by "scn" so that scn(ak,escn)=ak. Such neutral element is also called the "zero element" herein. Its connection with the second operation which is usually called multiplication or "mn" is that operation mn(ak,escn)=escn. One may use the Galois Field GF(5) wherein the addition operation is "sc5," the modulo-5 addition. The neutral element or zero element esc5 is 0. The multiplication operation "m5" is the modulo-5 multiplication, wherein multiplication of any element with esc5=0 provides 0. The operation "mn" also has a neutral element emn so that mn(ak,emn)=ak. For the multiplication m5 over GF(5) the neutral element em5 is 1. The inventor found that this aspect of using field operations over GF(n) facilitates cryptanalysis and that modification of the finite field GF(n) into an alternate finite field aGF(n) with modified addition and multiplication and modified zero and neutral elements makes cryptanalysis much harder. These aspects are disclosed in for instance U.S. patent application Ser. No. 12/952,482 filed on Nov. 23, 2010, which is incorporated herein by reference ('the 482 application').

How to create an alternate finite field aGF(n) from GF(n) with reversible n-state inverters was disclosed earlier by the inventor in U.S. patent application Ser. No. 14/064,089 filed Oct. 25, 2013 (the "089 application") to which the instant disclosure claims benefit, and is repeated here to provide context. Now referring to FIG. 1, a switching table representing the n-state function "scn" or "mn" represented as 'op' is stored in a circuit 100 that may be an addressable memory, with two inputs and one output. Different realizations of switching tables are possible as one of ordinary skill in the art knows, for instance as combinational circuitry or as memory. In a memory the input states represented by signals on inputs form the address of the memory where upon the output state is stored. The circuit 100 has two inputs 108 and 109 which may determine the address of memory elements that outputs its content on output 110. Reversible n-state inverter 101 with input 105 is connected to input 108 of circuit 100. N-state inverter 102 which is identical to inverter 101 with input 106 is connected to input 109. The output 110 of circuit 100 is connected to n-state inverter 103 with output 107. N-state inverter 103 preferably reverses inverter 101 back to the identity state [0 1 2 . . . n−1]. An input 108 on the circuit may be enabled to receive an enabling signal to make sure that circuit 100 is ready to provide appropriate output.

A first realization of an n-state inverter is by storage of the inverter output states in an addressable memory wherein an input state forms an address in the memory that is activated and the output is the inversed state stored at the memory address. A second realization is by way of a combinational binary circuit. One can for instance define the input and output states as binary words in a Karnaugh map and construct a combinational binary circuit on that basis as is known in the art. A third realization is on a processor with a memory. For instance in Matlab one defines a 4-state inverter as a 1 by 4 array, which may be called inverter 'invert4'. For example a Matlab instruction is: invert4=[4 3 2 1]. Matlab works origin 1. Assume one variable 'input1' has the value 3 or: input1=3. Matlab then inverts 'input1' to 'invinput1' in accordance with inverter invert4 by the instruction: invinput1=invert4(input1). The result is invinput1=2. And thus the input is inverted with an inverter.

A device may receive a signal representing a 256-state signal to be processed, for instance in accordance with a 256-state inverter. The received signal is demodulated and otherwise processed to provide for instance an 8-bit byte to an inverter execution that generates the inverted 8-bit byte. The inverted 8-bit byte may be used for further processing by the processor or may be processed to be displayed on a screen by the processor. An example of this is provided for instance on line 2 of program screen shot 600 of Matlab program in FIG. 6.

The device illustrated in FIG. 1 transforms the n-state switching table that characterizes the device between inputs 108 and 109 and output 110 to a device with a transformed n-state switching table that characterizes the device between inputs 105 and 106 and output 107. The terminology is used herein that the original n-state switching table as stored and realized in memory or realized in a circuit is 'transformed' to a new or Finite Lab-transformed (FLTed) n-state switching table that characterizes the device in FIG. 1 between 105, 106 and 107. This is also intended to mean that the device that implements or is described by 'op' is FLTed. The inventor herein applies his prerogative to be his own lexicographer. A modification of a circuit characterized by an n-state switching table in accordance with FIG. 1 as well as the modification of the n-state switching table is called herein a Finite Lab-transform or FLT. Also the term Lab-transform may be used herein.

A FLTed n-state switching table is a first n-state n by n switching table transformed by using identical n-state reversible inverters to transform first and second inputs to the first n-state n by n switching table and transforms the output with a reversing inverter to the n-state reversible inverter that combined with the n-state reversible inverter forms an n-state identity inverter. An input to a table is an index or address of a row or a column of a 2-dimensional n by n table. For convenience a top input of a 2-input device such as in FIG. 1 corresponds with a row index of an n-state switching table and a bottom input corresponds to a column index of the n-state switching table. One is again reminded that inputs on a device receive a signal, not a symbol or a state. The symbol or state indication is merely used for convenience to represent that a symbol represents a signal and that different symbols indicate different signals.

The switching table implemented by circuit 100 performs an operation that may be called 'op' for convenience or 'sc' for addition or 'm' for multiplication. One of ordinary skills knows that with known techniques, such as Karnaugh map, the switching table can be performed by a combinational digital circuit.

The effect of the device of FIG. 1 is that de addition and multiplication over GF(n) are modified in such a manner that the new operations also define a finite field which is called aGF(n). As an illustrative example a modification of a finite field GF(8) with 8-state inverter inv8:[0 1 2 3 4 5 6 7]→[2 3 4 5 6 7 0 1] and reversing inverter rinv8: :[0 1 2 3 4 5 6 7]→[6 7 0 1 2 3 4 5] is provided. FIG. 2 shows switching table 200 of sc8 as stored in memory and display on a screen of which FIG. 2 is a screen shot. The processor is controlled by Matlab® and all output matrices are in origin 1. To interpret 8-state table switching 200 in elements [0 1 2 3 4 5 6 7] a number 1 should be subtracted from the table elements. One can see that 0 (displayed as 1) is the zero element of sc8. FIG. 3 displays a screen shot of 8-state multiplication switching table m8 in origin 1. Herein 0 is the zero element (1 in the table) and 1 is the neutral multiplication element (2 in origin 1). As a reminder: a modified addition over aGF(n) continues to have the properties of an addition and a modified multiplication over aGF(n) continues to have the properties of a multiplication, be it with possibly different zero-and one- or neutral elements.

Figures 4, 5:
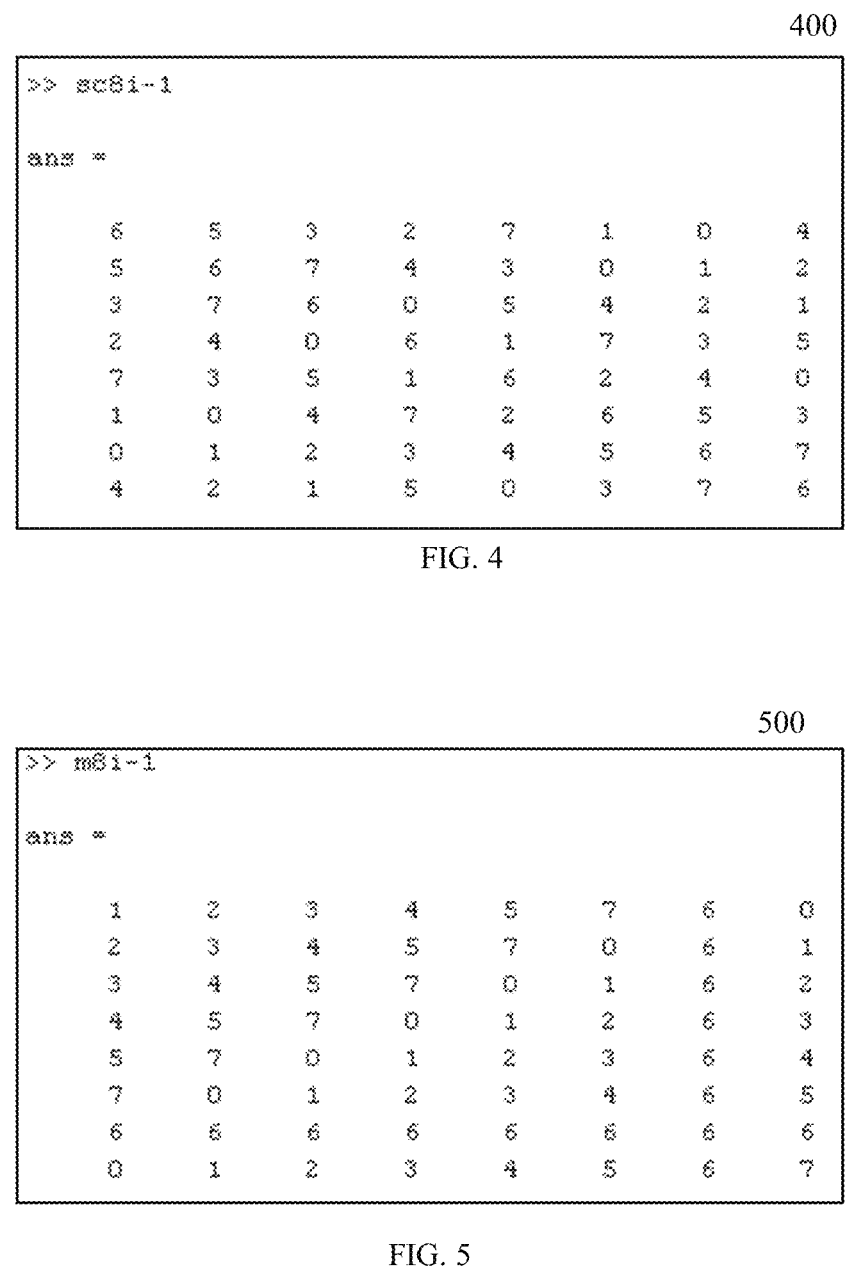

The 8-state switching table 400 in FIG. 4 shows a screenshot of the modified switching table 200 in origin 0. One can see that the element 6 is the zero element of switching table 400. FIG. 5 table 500 shows the 8-state switching table of m8i in origin 0 which is the modified table of m8. Herein element 6 is the zero element and 7 is the neutral element. One can test some of the finite field properties of aGF(8) (associativity and distributivity). FIG. 6 provides a screenshot 600 of the Matlab program that configures and enables the processor to realize the device of FIG. 1 in this 8-state example.

All operations that can be performed over a finite field GF(n) can be performed over the alternate finite field aGF(n). Furthermore, a modified addition of the alternate field GF($n=2^p$) is also the subtraction over the alternate finite field. In accordance with an aspect of the present invention the properties of the alternate finite field aGF(n) are kept confidential. For instance a cryptographic method applies one or more additions and/or multiplications over a standard finite field GF(n). A standard finite field GF(n) has as zero element for the addition 'scn' and the multiplication 'mn' the element 0. Thus scn(ak,0)=ak and mn(ak,0)=0 and the one element of the multiplication is 1 and thus mn(ak,1)=ak over a standard finite field. From the previous 8-state example it should be clear that sc8i(ak,6)=ak and m8i(ak,6)=6, while m8i(ak,7)=ak. The alternate finite field is characterized by a zero element not being 0 and one element not being 1.

FIG. 6 illustrates a Lab-transform of 8-state functions sc8 and m8 which are an addition and a multiplication over GF(8) FLTed with inv8=[2 3 4 5 6 7 0 1]+1 (origin 1), wherein sc8 and m8 are provided as illustrated in screenshot 200 in FIG. 2 and screenshot 300 in FIG. 3, respectively. An n-state Lab-transform for an n-state switching table is provided in accordance with an aspect of the present invention in in screenshot 6300 in FIG. 14 in a general Matlab function labtransform(table,invert). A processor executing the instructions of this function is provided with an n by n n-state switching table 'table' and an n-state inverter 'invert.' Lines 10 and 11 determine 'n' from the dimensions of 'table.' Lines 18-21 determine the reversing (to identity) inverter of 'invert.' Lines 24-31 perform the Lab-transform and the FLTed table 'tableinv' is outputted in line 32.

Screenshot 7000 in FIG. 21 shows a Matlab program listing that generates an 11-state switching table in accordance with (eoffset-indexrow-indexcolumn) mod-11 and an n-state switching table in accordance with (indexrow*indexcolumn) mod-11. These 11-state switching tables are FLTed in accordance with 11-state inverter invert 11=[6 9 4 2 1 11 8 7 10 3 5]. The FLTed 11-state switching tables are shown in FIG. 22 screenshots 7101 and 7102. The switching tables in FIG. 22 are in origin 1.

Many different modifications are possible, including those where the zero element remains 0 but the one element is not 1 or wherein the one element is 1 but the zero element is not 0. For instance the inverter [0 1 2 3 4 5 6 7]→[0 2 3 4 5 6 7 1] keeps the zero element as 0 but modifies the one element to 7. One may also change the field with an n-state inverter that keeps the zero element 0 and the one element 1.

As illustrative examples of the Lab-transform the following modified 8-state switching functions are provided. The 8-state reversible inverter zz1=[3 1 5 7 2 0 4 6] is applied upon the table of 5300 in FIG. 11 and table 6400 of FIG. 15 with a Lab-transform, resulting in tables 6500 and 6501, respectively in FIG. 16. The 8-state reversible inverter zz2=[0 3 5 7 2 1 4 6] is applied upon the table of 5300 in FIG. 11 and table 6400 of FIG. 15 with a Lab-transform, resulting in tables 6502 and 6503, respectively in FIG. 16. In the above illustrative cases either state 0 or 1 is left unchanged. In on embodiment of the present invention both state 0 and state 1 are transformed by an n-state inverter applied in an n-state Lab-transform. The 8-state reversible inverter zz3=[6 3 5 7 2 0 4 1] is applied upon the table of 5300 in FIG. 11 and table 6400 of FIG. 15 with a Lab-transform, resulting in tables 6601 and 6602, respectively in FIG. 17. Table 5400 of FIG. 12 illustrates another modified 8-state switching table.

An n-state switching table may be characterized by scn (a,b)=(e-a-b) mod-n, wherein a and b are row and column index, respectively, and e is an offset term mod-n (thus 0, 1, . . . , n–1) is self-reversing. That is if c=scn(a,b) then a=scn(c,b) and b=scn(a,c). An example is provided in table 5200 of FIG. 10. Table 6700 in FIG. 18 is a screenshot of an 8-state switching table generated from a table characterized by (7-a-b) mod-8 that is FLTed with zz=[6 3 5 7 2 0 4 1]. Any FLTed n-state self-reversing switching table is also self-reversing. Any FLTed n-state reversible switching table is also reversible. Any FLTed non-associative n-sate switching function is also non-associative. In certain cases it is advantageous to apply non-associative n-state switching functions, as it forces a particular order of signal processing by devices. In the alternative it is also true that any FLTed n-state associative switching table is also associative.

Screenshot 6800 in FIG. 19 shows an 8-state switching table that is a FLTed table characterized as a mod-8 addition switching table. The switching table characterized as a mod-8 addition is reversible, commutative and associative. The modified switching table in 6800 has also these properties. Any FLTed n-state associative reversible switching table is also associative and reversible. Screenshot 6900 in FIG. 20 shows an 8-state switching table that is an FLTed table characterized as a mod-8 multiplication switching table. The switching table characterized as a mod-8 multiplication is not reversible. The modified switching table in 6900 has also this property. Any FLTed n-state associative and not-reversible switching table is also associative and not-reversible. The same applies to a set of switching tables that have distributive properties. When FLTed, the transformed set of distributive switching tables and/or operations also have distributive properties.

In accordance with one or more aspects of the present invention the FLTed n-state switching table is realized in a physical circuit being an addressable memory, a combinational circuit or a programmable processor with memory or storage.

It has been established that a Lab-transform (FLT) as illustrated in FIG. 1 leaves certain properties of the Lab transformed switching table intact. The FLT is a property preserving transformation. The meta properties of one or more FLTed switching tables are the same as the meta properties of the original (untransformed) switching tables. Meta properties include number of switching states, commutativity, associativity, reversibility, self-reversibility, having a neutral element 'e' so that op(a,e)=a and a zero element 'z' so that ap(a,z)=z, repeatability up(a,ak)=e, invertibility so that ep(a,a$^{-1}$)=e and distributivity of two switching tables. The terms 'op', 'ap', 'up' and 'ep' are shorthand for an n by n switching table and apply to any n-state element.

Performing a Lab-transformation on its face appears to be counter-intuitive. That is: modifying inputs with identical n-state inverters and then inverting back the output result of an operation on the modified inputs with an n-state inverter that reverses the inverter at the inputs to identity, may appear to be establishing an identity operation. One may incorrectly believe that such a transformation would leave the original operation or table unaffected. But that is clearly not the case. One may try other transformations. For instance inverting the output result with the same inverter or with a different inverter that does not reverse the inverter at the inputs and it will generally not preserve the meta-properties of a table or operation.

The specific states associated with a meta property of a switching table and/or switching operation may be changed by the Lab-transform. In particular the neutral states 'e' and 'z' may change in state, though neutral states still exist. This is illustrated in an 8-state switching table 400 in FIG. 4 with neutral element state '6' which is a Lab-transform of another 8-state switching table with neutral element '0'. One may say that the original 8-state switching table 'sc8' has property sc8(a,a)=1 and the FLTed table has sc8i-1(a,a)=6 or sc8i=7. The FLTed table is still associative, reversible (self-reversing) and commutative and is distributive in relation to table m8i in table 500 in FIG. 5. The state of the neutral element has been modified by the Lab-transform, but the both the untransformed and FLTed switching tables have a neutral element.

N-state switching tables provide labels or states of an output signal as a result of one or more input signals which are also labeled as states. Each one of n states corresponds to one of n different signals. But the state itself does not necessarily reflect the value or magnitude of its corresponding signal. For design and representation purposes, one commonly uses numeric symbols [0, 1, 2, . . . , (n-1)] as states. The numbers are commonly consecutive in order. Until a meaning is assigned to a signal, the switching table only indicates how different input signals generate an output signal. The physical meaning is provided by a device. For instance activating a key on a keyboard of a computer generates one or more signals. The symbol on the key that is activated may be 'a.' The physical signal generated by the activated key may be a generated scancode which in some PCs may be scancode hex 1E, which in binary is [00011110]. After accepting a scancode, a processor may convert the scancode to a standard ASCII representation which for the symbol 'a' is the 8-bit representation [01100001].

No matter what specific realization technology is used, all n-state switching tables can be represented with states ranging from 0 to (n-1). In accordance with an embodiment of the present invention each symbolic state in an n-state switching table corresponds to an actual signal characteristic. The characteristic may be a binary characteristic, expressed as L and H or 0 and 1, but are understood to correspond to a word of signals. Accordingly, an n-state switching table refers to an actual switching device that may be a combinational circuit or a memory circuit or a circuit in a processor. Transducers at input and/or output of a device determine what the physical meaning is of a signal that is represented entirely or in part by an n-state symbol. Processing of signals in accordance with different n-state switching tables in general will lead to different outputs. Accordingly, cryptographic devices provided in accordance with one or more aspects of the present invention are physical switching devices and n-state switching tables are a representation of a physical device. Methods provided in accordance with one or more aspects of the present invention are switching processes performed by physical machines.

In accordance with various aspects of the present invention novel switching devices, characterized by novel n-state switching functions create novel computing devices with circuitry that is believed not to be previously available and/or used to realize novel machines. The novel digital circuitry is characterized by n-state switching functions that are believed to be previously unknown. In accordance with various aspects of the present invention, the thus realized or implemented novel n-state switching functions/devices are applied for performing cryptographic operations. A novel computing machine is configured in accordance with various aspects of the present invention to be a novel cryptographic machine. The cryptographic machine may be a dedicated or customized computing device or a programmable and/or programmed computing device. The novel functional capability may be realized as memory stored function tables, as combinational circuitry, or as micro-programmed instructions or functionality or any other physical configuration that is characterized by the novel n-state switching tables. In any case, the novel cryptographic machines are machines that process discrete and/or digital signals and generate digital and/or discrete signals.

A cryptographic machine herein is a computing machine that implements and executes an n-state switching function to perform a cryptographic operation. The cryptographic operation has as its purpose to provide security of exchange and/or storage of data. This is part of the very important aspect of cyber-security. Cryptographic operations include encryption and decryption of data, hashing or generating message digests of data, generation of secure passwords and keywords, authentication and validation of data, securing access to devices, data and applications and other aspects that help in securing storage and exchange of data.

It is well known that computers are under attack of malfeasants and unauthorized persons and machines to either change, access, remove, steal or render ineffective data or the machine(s) they reside on. Many cryptographic methods, applications, machines and standards exist that operate in a satisfactory manner. However, continuing attacks, facilitated by increasingly powerful computing devices require design of improved cryptographic machines and methods. An additional problem is the looming appearance of Quantum Computers that may pose a threat to cryptographic methods that currently are deemed secure. Aspects of the invention assume that current cryptographic machines and methods are fairly secure and that it is beneficial if these methods and machines can be upgraded or improved while re-using the properties that make them acceptable in current or even previous use.

Aspects of the current invention pertain, but are not limited, to the following cryptographic methods and machines: 1) encryption and decryption of data, to encipher and decrypt data. One of the most widely used encryption methods is or is based on the Advanced Encryption Standard (AES)published as Federal Information Processing Standards Publication 197 (FIPS 197), November 2001, National Institute of Standards and Technology; Gaithersburg, Md. which is incorporate herein by reference. AES is a symmetric key encryption. Other symmetric encryption methods are Triple-DES (3DES or TDEA in FIPS 800-67), Data Encryption Standard (DES FIPS 46-3, October 1999) which are also incorporated herein by reference. Other symmetric encryption includes methods like RC4, Blowfish, Twofish, IDEA, etc. These are all discrete or block-ciphers. A continuous operation of enciphering and deciphering can be achieved with stream ciphers and with continuous scramblers/descramblers such as shift register based machines. Using a two-input reversible n-state switching function is a way to continuously encrypt a message against a keyword. A long keyword can be generated by a random or pseudo-random sequence generator. Asymmetric keys are generated between machines using preferably intractable switching processes, such as Rivest-Shamir-Adleman (RSA) and Elliptic Curve Cryptography (ECC) methods. In many cases direct encryption of an entire message using asymmetric encryption is prohibitive in resource requirement (like processor time). Often, asymmetric encryption is used to generate a keyword.

2) key generation. Using intractable processing steps (steps that are extremely difficult to reverse from a result to its origin) public keys are generated and transmitted over potentially not secure channels. In combination with one or more private keys an encryption key and a decryption key is generated. RSA and ECC are examples of key generating techniques. Another technique is the Diffie-Hellman technique.

3) hashing or message digest techniques. A representative sequence of symbols is generated from data such as a message. Preferably it is impossible or at least very hard to reverse the sequence to the original message. Furthermore, it should be difficult to track how exactly a modification in a message changes the output sequence. Furthermore, preferable each message, even with minor differences, generates a unique message digest. In some applications the restrictions in hashing methods are not as stringent. For instance, one may apply a relatively simple Cyclic Redundancy Code (CRC). Current secure message digest methods are described in Secure Hashing Algorithm. Secure Hash Algorithm 1, or SHA-1, was published in 1995 as FIPS PUB 180-1 by NIST and is incorporated herein by reference. SHA-1 is no longer considered to be secure. SHA-1 is superseded by SHA-2 which comes in different formats. See FIPS PUB 180-2 by NIST published August 2002, which is incorporated herein by reference. FIPS 180-2 specifies 4 hashing methods: SHA-1, SHA-256, SHA-384 and SHA-512. FIPS PUB 180-2 has been superseded by FIPS-PUB 180-4 published on August 2015 by NIST which now specifies SHA-1, SHA-224, SHA-256, SHA-384, SHA-512, SHA-512/224 and SHA-512/256 and is incorporated herein by reference. Another hashing method called SHA-3SHA-3 STANDARD: PERMUTATION-BASED HASH AND EXTENDABLE-OUTPUT FUNCTIONS was published in August 2015 by NIST as FIPS PUB 202 which is incorporated herein by reference.

4) digital signature. The Digital Signature Standard (DSS) is published by NIST in July 2013 as FIPS PUB 186-4 and is incorporated herein by reference. It specifies methods for digital signature generation that can be used for the protection of binary data (commonly called a message), and for the verification and validation of digital signatures. FIPS PUB 186-4 includes a) Digital Signature Algorithm (DSA), b) RSA digital signature, and 3) Elliptic Curve Digital Signature Algorithm (ECDSA).

5) message authentication codes (MACs). To check the integrity of information transmitted over or stored in an unreliable medium. Mechanisms that provide such integrity checks based on a secret key are usually called message authentication codes (MACs). Typically, message authentication codes are used between two parties that share a secret key in order to authenticate information transmitted between these parties. Keyed-Hash Message Authentication Code (HMAC) is specified by NIST in FIPS PUB 198-1 published in July 2008 which is incorporated herein by reference.

The theoretical background of cryptographic methods may assume to be known to persons of ordinary skill. A fairly complete explanation of cryptographic methods and machines is provided in Paar et al, Understanding Cryptography, Springer-Verlag, Berlin 2010 which is incorporated herein by reference.

A common thread in all of the above methods and devices is that "known" switching functions and thus known switching devices, be it binary or non-binary, are used. That is either XOR functions, addition over a binary field $GF(2^p)$, multiplications over a binary field $GF(2^p)$, additions and/or multiplications over finite field $GF(n)$, additions and/or multiplications modulo-n are used. Combined with published specifications of these methods, security depends largely on the intractability of applied methods. However, as computers or networked computers become more powerful, successful attacks on previously secure cryptographic methods become more likely. One popular way to improve security, such as in RSA, is to use larger keywords, which are now preferably over 4000 bits long. This puts higher time demands on processing data and is not desirable.

A benefit of current cryptographic methods is that they have been well studied and that vulnerabilities are well studied. It is beneficial if one could change one or more elements of these methods that improves security without affecting established security.

Because known functions are used, it is beneficial if one can change at least one switching function and the device that perform that function, while keeping important properties of those functions, but rendering outcomes more unpredictable. In a preferred embodiment a modification of a switching function is kept private and confidential to designated machines or devices and/or users of machines.

What are the changes that are provided in accordance with aspects of the present invention? One change is a modification in accordance with the FLT as illustrated in FIG. 1 of an addition and/or a multiplication over $GF(n)$ for n being prime or broader an addition modulo-n and/or a multiplication modulo-n. For n being prime, addition and multiplication over $GF(n)$ is the same as addition modulo-n and multiplication modulo-n. However, the reverse is not true. An addition or multiplication modulo-n is not always an operation over GF(n). In RSA for instance, multiplications modulo-n are performed that are not operations over GF(n). As an example see the switching table characterized by a multiplication modulo-15 (n=15 is a product 3*5) in FIG. 25.

It is explicit that all operations provided herein are machine operations. Switching operations like XOR are sometimes represented by addition modulo-2 while the AND operation is characterized by a modulo-2 multiplication. However, the XOR and AND function herein (and other operations) are actually switching devices or devices that switch between physical states based on input signals. As explained above, the numerical states that are often applied to characterize the switching tables are human representations of actual physical states. The states 0 and 1 as such do not exist in the machine. This may be a source of confusion. To prevent any misinterpretation it is explicit intended that any characterization of a function/device by a mathematical operation is fully intended to represent a physical operation, not a mental mathematical one. One should consider embodiments of the present inventions to be comparable to 'machine arithmetic' or 'computer arithmetic.' The subject of designing machines that perform operations characterized as arithmetic is taught in Gerrit A. Blaauw Digital System Implementation, Prentice Hall, Englewood Cliffs, N J, 1973 and Kai Hwang, Computer Arithmetic, principles, architecture and design 1979, John Wiley and Sons, which are both incorporated herein by reference. Accordingly, any operation mentioned herein is fully intended to be a machine operation, even when represented by an arithmetical expression. For instance, an addition over $GF(2^p)$ can be represented by a switching table, but may physically be a circuit of p XOR devices. Modulo-n circuitry commonly includes integer based arithmetic instructions that are optimized for a processor architecture. An example for integer multiplication on an Intel® processor is provided in Ozturk et al, Large Integer Squaring on Intel® Architecture Processors, January 2013, Intel Corp. downloaded from https://www.intel.com/content/dam/www/public/us/en/documents/white-papers/large-integer-squaring-ia-paper.pdf and which is incorporated herein by reference.

In general terms like addition, multiplication, exponentiation and the like are associated with mental or human steps. The terms point to an awareness of steps in performing these operations and one can determine where things went wrong if an incorrect answer was generated by a human. In machine arithmetic all steps are predetermined and automatic based on properties of circuits. No numbers exists within a machine and there is no awareness or meaning on what is being performed by machines. Any meaning of results is only provided by humans who interpret symbols displayed on a screen for instance by expressing signals into something that can be interpreted by humans. The terms addition, multiplication, exponentiation and the like as used herein are to be used in the sense of a computer operation or a machine operation, not as an abstract human calculation. When a term such as addition, multiplication, exponentiation, inversion, subtraction, multiplicative inverse and the like are used, they are all meant to refer to n-state computer operations. In the same sense polynomials mentioned herein are intended to represent one or more signals represented by the coefficients of the terms of the polynomials.

In computers, signals generated by circuits are used to activate pixels on a display or characters on a printer or a particular cathode in a Nixie-tube. Similarly, entry signals are entered that represent a symbol. For instance a keyboard key has a symbol 8 and when activated generates a signal. Commonly an entered number consists of two or more digits. A circuit is required to represent the complete number. Internally in the processor a switching process takes place, that because of the input and output representation looks like a calculation. In an anthropomorphic interpretation, it is often said that a computer functionally performs a calculation. Technically that is not true. The processor by itself has no awareness of numbers and meaning of numbers. Technically a computer or processor is configured in hardware to perform a switching operation that can be characterized by "calculation." While it functionally looks like a calculation, physically there are many different ways to configure the hardware to "perform" the particular calculating operation. Many of these switching operations are known: like carry ripple adder, carry-save adder, carry predict adder and so on. The herein provided switching operations characterized as Finite Lab-transform (FLT) is novel and is not previously known. The FLT or FLTed switching operation is fully intended as a description of a physical operation.

FIG. 25 illustrates the 15-state switching table that characterizes the device that operates in accordance with a modulo-15 multiplication. FIG. 26 illustrates the table of FIG. 25 FLTed in accordance with inverter inv15=[0 1 3 4 5 6 7 8 9 10 11 12 13 14 2]. On its face, the table of FIG. 26 appears to be similar to the table of FIG. 25, however only the rows/columns representing the zero-element and one-element (0 and 1) are identical. All other rows and columns are different. Effectively, when FIG. 25 may be considered as potentially representing an arithmetical operation, the table of FIG. 26 does not have that property. There is no known arithmetical operation in accordance with FIG. 26. Still, the table of FIG. 26 has some of the important properties of FIG. 25: it is commutative, it is associative, it has a zero-element 'z' for which op(z,a)=z for all 'a' and it has a one-element 'e' for which op(e,a)=a for all 'a' and wherein 'op' is a switching operation represented by an n-state (in this case 15-state) switching table. Thus, while the FLTed switching table in FIG. 26 is no longer a meaningful arithmetical operation (being in the unmodified form a mod-15 multiplication), a circuit characterized by the FLTed table performs meaningful switching operations, being a modification of an input signals to an output signal with a device that has advantageous properties.

Even stranger, or more unpredictable is the 15-state switching table illustrated in FIG. 27. This switching table can be generated by the FLT of the table of FIG. 25 in accordance with FIG. 1 using inv15=[3 4 5 1 6 7 8 9 0 10 11 12 13 14 2]. This switching table does not even have the appearance of any valid arithmetical operation. The zero-element herein is 8 with op(8,a)=8 for any 15-state symbol 'a' and the one element is 3 with op(3,a)=a, with 'op' representing the device that operates in accordance with the table of FIG. 27. Despite the 'strange' appearance of the table, properties of the table of FIG. 27 are largely the same as the ones of FIG. 25, in particular associativity. This means that $(a^k)^p$ is the same as $(a^p)^k$ and wherein ak is performing (k−1) consecutive operations 'op'. For instance a5 in general is meant to be a*a*a*a*a when * represents a modulo-n multiplication or addition. However herein a5 is: op(a,(op(a,op(a,(op(a,a)))))). Or, a circuit performs a1=op(a,a), and then a2=op(a,a1), and then a3=op(a,a2) and finally a4=op(a,a3). Thus, the inventor has developed a method to maintain important properties of switching circuits and a method (the FLT) to create modified switching circuits.

In accordance with an aspect of the present invention, n-state switching circuits are provided characterized by an FLT of a switching table represented by a modulo-n multiplication or modulo-n addition and wherein the n-state switching table resulting from the FLT is not characterized by a modulo-n multiplication or modulo-n addition. The value of 'n' herein is preferably greater than 7, or greater than 8, or greater than 15, or in one embodiment greater than 63, or in one embodiment greater than 255, or in one embodiment greater than 1023 and or in one embodiment greater than 1,000,000. In one embodiment of the present invention n is greater than 2^100.

An important class of switching circuits in cryptographic machines is the class of circuits characterized by finite extension fields $GF(n=p^q)$ with p prime and q greater than 1 or q greater than 2. Extension finite fields $GF(p^q)$ are characterized by irreducible polynomials of degree q with terms that are from the finite field GF(p). This is well documented in the literature. Operations of circuits are generally described in terms of polynomial arithmetic. That is, either the addition or the multiplication over $GF(n=p^q)$ is defined as an operation modulo—the irreducible polynomial. There are several ways to generate extension finite fields. As an example the binary case will be provided. In a first approach an addition over $GF(2^q)$ an element of the field is represented by q bits. Two elements of the field are "added" by bitwise XORing of the bits of the two words. This illustrates that an addition over $GF(2^q)$ is both a description of an operation as well as a physical circuit. The multiplication of two words of q bits is determined by creating a full binary product of two binary words and then determining the remainder of the product modulo the binary word formed by the coefficients of the irreducible polynomial.

A second way to define operations over for instance $GF(2^q)$ is by determining the consecutive states of a shift register with feedback characterized by an irreducible polynomial which preferably is a primitive polynomial. The consecutive states of the shift register are equivalent to consecutive states of the field. Determining decimal equivalents requires thus a substitution of a word of bits with its decimal position in the sequence of states of the shift register. The multiplication is a simple adding of positions. Multiplication of 4 with 7 in GF(16) is an addition of 7 starting with 4 modulo-16. So 4+7 is (4+7)–1 mod-16 is 10 and multiplication of 8 and 9 is (8+9)–1 mod-16 is 1. A disadvantage of this type of operation is its predictability.

Even though determining irreducible polynomials is not simple, one may say that it is known. As a consequence one may say that finite fields $GF(p^q)$ directly determined from operations known as multiplication and addition modulo-irreducible polynomials are known. There are a great but finite number of irreducible polynomials. It is again pointed out that all these fields have to be generated separately using polynomial arithmetic. This is not a simple operation, as illustrated in U.S. Pat. No. 10,277,403 Issued on Apr. 30, 2019 to Hoffstein et al. ("Hoffstein") which is incorporated herein by reference. FIGS. 2 and 3 of Hoffstein illustrate how two isomorphic fields $GF(5^5)$ are generated by two different irreducible polynomials. Hoffstein further discloses a polynomial transformation F(y) (which is preferably kept secret) that transforms one finite field (in x-space) into a second finite field. This transformation transforms elements of the finite field to elements of another (isomorphic) field. It does not directly generate the related operations which have to be determined separately. Furthermore, Hoffstein taches that zero is mapped to zero and one is mapped to one. Such a mapping is a necessary consequence of using irreducible polynomials as fields generated from irreducible polynomials have 0 as zero element and 1 as one-element. Furthermore, the literature teaches that it is difficult to construct explicit mappings between isomorphic finite fields. One is referred to Bill Allombert, Explicit Computation of Isomorphisms Between Finite Fields, in Finite Fields and Their Applications 8, pages 332-342 (2002) which is incorporated herein by reference. In fact, Hoffstein et al, A signature scheme from the finite field isomorphism problem, downloaded from eprint.iacr.org/2018/675.pdf which is incorporated herein by reference, describes the problem as a "hard problem."

The FLT can easily generate operations in alternate finite fields of the same cardinality and does so by transforming the operations using n-state inverters at inputs and its reversing inverter at an output as illustrated in FIG. 1. For instance there are two extension finite fields over $GF(n=2^3)$. The related irreducible polynomials are $I:x^3+x^2+1$ and $II:x^3+x+1$. The operation characterized as multiplication from I is FLTed into the operation characterized by II by using the inverter inv8=[0 1 3 2 5 4 6 7]. Thus using the FLT it is not required to first map the fields and then determine the operations. The FLT allows to create operations over extension finite fields that can be generated from irreducible polynomials. Furthermore, the FLT allows also to create operations over finite fields that have no equivalent to irreducible polynomial generated operations and thus are complete novel. For instance using inv81=[0 1 3 2 4 5 6 7] with the FLT generates a switching table that is not generated by an irreducible polynomial as known in the literature. The binary case $GF(2^q)$ is used herein as illustrated example. The above of course applies to all finite fields $GF(p^q)$ with p being a prime number and q>1.

It is again pointed out that irreducible polynomials of degree q with factors selected from GF(p) are known. One can use these to generate operations over $GF(n=p^q)$. However, to create the relevant switching tables one has to perform operations modulo the irreducible polynomials. The FLT in accordance with FIG. 1 only requires the use of reversible inverters to create circuitry that operate in accordance with FLTed switching tables to modify a circuit. It is also again emphasized that using an addressable memory and/or combinational circuitry physical circuitry is fully determined by the n-state switching tables.

In some cases, it may be possible or even beneficial to store an entire n-state switching table in a memory as an actual switching device. However, in many cases the required memory size in most cryptographic applications may be too large. The required size of an n-state switching table is k=ceiling($log^2$ n) times $n^2$ for binary memory. In AES as defined in FIPS PUB 197 operations take place on bytes of 8 bits. This means that n=256 and k=8. Thus, a 256-state switching table requires 8*256*256 bits or around 65k bytes. Storage of 1000 different 256-state switching tables requires 65 M bytes. One can also store 256 different 256-state inverters in 65k bytes. For resource constrained devices, for instance IoT devices, using stored inverters may be more advantageous than storing complete switching tables.

Cryptographic methods using modulo-n like operations are known, but not modifications as disclosed in accordance with various aspects of the present invention. Accordingly, all FLT n-state switching functions derived from descriptions characterized as a modulo-n arithmetical operation are believed to be novel. It does not matter if these FLTed created devices use inverters or have stored FLTed switching tables or use rule-based inverters.

There are 30 irreducible polynomials of degree 8 and with coefficients in GF(2). Despite this set of possible operations over GF(256) it is believed that most if not all additions over GF(n=$2^p$) for n being 256 and n greater than 256 are realized by p bitwise XOR operations, with n=$2^p$. AES FIPS-197 in steps SubBytes( ), MixColumns( ) and AddRoundKey( ) uses operations based on irreducible polynomial m(x)=$x^8$+$x^4$+$x^3$+x+1. Any of the 3 steps performed with an FLTed operation that is different from the one based on m(x) and different from an addition characterized by 8 bitwise XOR operations is novel. It is novel when the FLTed 256-state switching table is stored and it is novel when realized with explicit inverters as shown in FIG. 1. For relatively small values for 'n' the n-state inverters can be 'absorbed' into the switching table. That is, the effects of the inverters are included in the resulting switching table, as for instance illustrated in FIG. 4 and FIG. 5 and in the FLT as illustrated in FIG. 14.

For n=256 there are 30 irreducible polynomials of which m(x) in AES is one. Each of these polynomials creates a finite field defined by operations wherein the zero-element is 0 and the one-element is 1. Operations of each of these finite fields can be generated from an FLT of the operations of the finite field defined by m(x). The FLT allows for generation of operations in finite fields that cannot be generated by known irreducible polynomials. Such operations are called herein 'absolute unique' operations. These include operations for which the zero-element is 0 and the one-element is 1 but all other generated states are different from states generated by operations based on irreducible polynomials.

Operations over GF(n=$p^q$) wherein a zero-element is not 0 and/or a one-element is not 1 can also not be generated by irreducible polynomials and thus are also 'absolute unique.' 'Absolute unique' operations related to finite extension fields GF($p^q$) are operations that have the major properties of a finite field operation but cannot be performed using irreducible polynomials. The irreducible polynomials are generally irreducible polynomials of degree q with coefficients over GF(p). 'Absolute unique' operations related to finite fields GF(p) with p prime are operations that have the major properties of modulo-n addition and multiplication but are not the modulo-n addition or modulo-n multiplication. These major properties pertain to addition and multiplication over a finite field and include: completeness, commutative, associative, distributive, zero-element, one-element, and existence of inverse except for zero-element in multiplication. Furthermore, an 'absolute unique variation' of modulo-n multiplication is defined herein for all n not being prime. The multiplication mod-n when n is not prime has certain terms that are not reversible. For instance 1*2 mod-6 and 4*2 mod-6 are both 2. Thus, a multiplier in multiplication mod-n that has a factor in common with n is not reversible. A multiplier in multiplication mod-n that has no factor in common with n (relative prime) is reversible. A FLTed multiplication mod-n is an 'absolute unique variation' of the multiplication when it is an n-state switching operation not identical to a characterization by a mod-n multiplication but with its major properties.

Illustrative Examples of FLTed Cryptographic Machines and Methods

Encryption/Decryption

Block encryption and decryption require reversible n-state switching operations. In general those operations are binary XOR operations, often operated on words of k bits, called bitwise XORing and can be represented as an addition over GF($2^k$). In accordance with an aspect of the present invention, an operation/device of k bitwise XORing is replaced by an operation/device characterized by an FLTed $2^k$-state switching table. In one embodiment of the present invention the unmodified cryptographic device performs in accordance with the AES FIPS PUB 197 specification. In accordance with an aspect of the present invention, the FLT is applied to the AddRoundKey( ) step in AES wherein bitwise operations take place on Nb bytes, commonly with Nb=4 thus a word of 32 bits. In one embodiment of the present invention an FLTed addition operation is applied to parts of a 32-bit word, for instance 4 FLTed 256-state operations are applied to words of 8 bits (a byte) within the word of 32 bits. In one embodiment of the present invention, the same FLTed 256-state operation is applied to each byte (against a keyword or part thereof). However, because many different FLTs are possible, one may also realize and apply 2 or more different FLTed 256-state additions. One may also apply different FLTed operations in different rounds of AES.

Decryption of AES requires an operation that reverses the encryption. The addition over GF($2^k$) is self reversing. Thus one may apply the same FLTed operation in the decryption step. The AddRoundKey( ) step in AES is a pure bitwise operation and no other operations, for instance characterized by an n-state multiplication is required in this particular step. That means that for instance associativity in this particular step is not required, but only reversibility and if one does not want to keep track of order, self reversibility is required. In accordance with an aspect of the present invention an operation/device characterized by an addition over GF($2^k$) can be replaced by a self-reversing n=$2^k$-state operation/device. For instance by an operation/device characterized by out=(offset-in1-in2)mod-n or an FLTed version thereof.

Another step or series of steps in AES that are modified in accordance with an aspect of the present invention is SubBytes( ).

SubBytes( ) is a non-linear byte substitution using a substitution table or S-box which is reversible. AES defines as (5.1) in FIPS PUB 197 that:

$b'_i = b_i \oplus b_{(i+4)mod8} \oplus b_{(i+5)mod8} \oplus b_{(i+6)mod8} \oplus b_{(i+7)mod8} \oplus c_i$, wherein bi is a bit in a byte that is the multiplicative inverse of the corresponding input byte and ci is a bit in byte [0 1 1 0 0 0 1 1]. A 16 by 16 256-state matrix is provided in the AES standard for the S-box and the corresponding inverse S-box.

One property of the S-box is that no input byte has itself as a transformed result. In effect, the S-box is a reversible 256-state inverter in matrix representation. There are at least (255)! reversible 256-state inverters that have no symbol common in corresponding positions with identity. There are many ways to generate appropriate 256-state inverters for the above SubBytes( ) step. The literature provides a number of proposals for such modifications. The generation of these 256-state inverters is facilitated by the limited size of the bytes, being just 8 bits. This makes it easy to store an actual 256-state inverter in memory and a rule-based inverter as defined in AES is not required.

To modify AES in accordance with the FLT, a following novel modification of the S-box is proposed. The 256-state inverter to determine the FLT of the multiplication over GF($2^8$) is the S-box of FIPS-197. The FLT is applied to generate the multiplication over GF($2^8$). In this case one may store the generated FLTed 256-state switching function. The one-element in the FLTed switching function is 9 or '09'. The multiplicative inverse in the FLT modified switching function is determined by finding the column index for the row index that has as output the one-element '09'. The first 10 multiplicative inverses in decimal representation of the FLTed switching function are: [169 241 109 165 118 239

73 25 66 9 . . . ] as compared to the 'traditional' multiplicative inverse which has as first 10 elements: [0 1 141 246 203 82 123 209 232 79 . . . ].

Applying the same affine transformation as dictated in AES SubBytes( ) section 5.2 of [5] generates the new S-box. The first 10 elements of the new S-box are: in decimal form [232 38 220 108 244 109 67 117 154 132 . . . ] or in hexadecimal [E8 26 DC 6C F4 6D 43 75 9A 84 . . . ]. The new S-box has no elements in common with the old one. However the new S-box has one element in common with identity and that is element 203 or inputs 'C' and 'B' will generate 'CB'. For relatively small n some checking is beneficial if a modified S-box is used multiple times.

Another step that lends itself to application of the FLT is in MixColumns( ) of AES.

MixColumns( ) applies addition and multiplication over GF(256) in a matrix operation as specified in (5.6) in FIPS 197. Expression (5.6) applies the matrix as shown in decimal form in the following table:

| 2 | 3 | 1 | 1 |
|---|---|---|---|
| 1 | 2 | 3 | 1 |
| 1 | 1 | 2 | 3 |
| 3 | 1 | 1 | 2 |

The invMixColumns( ) operation applies a 4-by-4 matrix as in (5.10) in FIPS 197 and as shown in the following table.

| 14 | 11 | 13 | 9  |
|----|----|----|----|
| 9  | 14 | 11 | 13 |
| 13 | 9  | 14 | 11 |
| 11 | 13 | 9  | 14 |

Each matrix operates on an input of 4 bytes to generate 4 output bytes. The matrix in FIPS-197 is provided in hexadecimal notation. It is easier to program in decimal notation, and the matrices of (5.6) and (5.10) in FIPS 197 are provided above in decimal (256-state) notation.

The MixColumns( ) operation has 4 256-state inputs (4 bytes) multiplied over GF(256) with the above matrix to generate 4 output bytes. The inverse of the operation is invMixColumns, wherein the 4 output bytes of MixColumns are multiplied in GF(256) with an inverse of the matrix of MixColumns as shown above.

One may apply different modifications of this operation in accordance with the FLT. A first FLT modification is to modify only inputs and outputs with an n-state inverter and the reversing inverter without modifying the multiplication itself. This is illustrated in FIG. 28.

The MixColumns( ) operation as described in (5.6) in FIPS 197 is left unchanged while the input bytes in0, in1, in2 and in3 are modified by 256-state inverter 'inv' and the output state bytes out0, out1, out2 and out3 are modified by 256-state inverters 'rinv' as illustrated in FIG. 28. As an illustrative example use the 256-state inverter formed by a multiplication 173 modulo-256 (173 being co-prime to 256) followed by an addition 66 modulo-256.

In a more elaborate modification, the addition over GF(256) and the multiplication over GF(256) in MixColumns( ) are replaced by the FLT of these operations with the 256-state inverter as explained above. The FLTed operations have a different zero-element (which is now 81 instead of 0) and a different one-element (which is now 118 instead of 1). For illustrative purposes the same MixColumns matrix of FIPS 197 is applied. The reversing matrix is now of course different from the one provided in FIPS 197. The new reversing matrix can be determined with Cramer's rule, wherein standard addition and multiplication are now the FLTed operations. The appropriate reversing table for the FLTed invMixColumns is shown below.

| 26  | 254 | 132 | 150 |
|-----|-----|-----|-----|
| 150 | 26  | 254 | 132 |
| 132 | 150 | 26  | 254 |
| 254 | 132 | 150 | 26  |

Assuming an input of 4 bytes being represented in decimal form as: [2 26 57 63] then:

a) the standard (known) MixColumns( ) procedure will generate [44 66 43 91];

b) the FLT of the unmodified MixColumns as illustrated in FIG. 28 will generate as output: [120 14 187 127];

c) the MixColumns( ) procedure wherein the individual addition and multiplication are modified will generate as output [13 54 252 121].

For illustrative purposes the above examples are in AES. Other encryption and decryption methods are known. These are all also modified in accordance with aspects of the present invention. Almost all, if not all, block encryption methods and devices apply bitwise XOR switching and are thus modified and modifiable as described above. A further example is for instance the encryption/decryption Twofish, which is currently in use. Twofish is described in Schneier et al, Twofish: A 128-Bit Block Cipher, 1998, downloaded from https://www.schneier.com/academic/paperfiles/paper-twofish-paper.pdf which is incorporated herein by reference. Twofish also uses bitwise XORing, which can be FLTed. Furthermore, Twofish applies what is called a Pseudo-Hadamard Transform (PHT) which is described as an=(a+b)mod 232 and bn=(a+2*b)mod 232. Reversal is achieved by a=(2*an−bn)mod 232 and b=(bn−an)mod 232. In accordance with an aspect of the present invention each of the operations is FLTed in accordance with an inversion rule (for instance a multiplication mod-232 with a first constant followed by an addition mod-232 with a second constant as illustrated in FIG. 1. In a further embodiment of the present invention the operations+−mod 232 and *mod 232 and −mod 232 are FLTed. As a result of the FLT, (2−1) may not be 1. Assume that the FLT of +−mod 232 is ⊕, of *mod 232 is ⊛ and −mod 232 is ⊖. Then: an=a⊕b, bn=a⊕(2 ⊛ b), and a=(2⊖1)−1 ⊛ (2 ⊛ an⊖bn) and b=(2⊖1)−1 ⊛ (an⊖bn). The term (2⊖1)−1 is the inverse of (2⊖1) relative to the ⊛ operation so that (2⊖1)−1 ⊛ (2⊖1) generates the one-element.

A further operation in Twofish that is FLTed is the Maximum Distance Separable or MDS matrix. This matrix in Twofish is provided below in decimal form.

| 1   | 239 | 91  | 91  |
|-----|-----|-----|-----|
| 91  | 239 | 239 | 1   |
| 239 | 91  | 1   | 239 |
| 239 | 1   | 239 | 91  |

In Twofish an input of 4 bytes is processed with the MDS matrix in accordance with a matrix multiplication to generate 4 output bytes. The operations in Twofish characterized by addition and multiplication over GF(256) are defined by irreducible polynomial $x^8+x^6+x^5+x^3+1$. In accordance with an aspect of the present invention the operations defined by addition and multiplication over GF(256) are replaced by a 256-state FLT of these operations.

Other encryption/decryption methods and devices exist and it is fully contemplated that they be modified in accordance with the FLT.

Public Key Cryptography

Public key cryptography transmits a public key over a potentially insecure transmission channel. However, one or more machines keep a secret or private key so that data exchange over the insecure channel is substantially secure. The exchange may be limited to creating a secure keyword, as in Diffie-Hellman, or true encryption, as in RSA (named after Ron Rivest, Adi Shamir and Leonard Adleman) or Elliptic Curve Cryptography (ECC). Often RSA and ECC are used to generate a common keyword and is not used to encrypt an entire message. For instance a common keyword is generated that is used in AES encryption. Accordingly, cryptographic methods listed in this section are not intended to be limited to this section but may be applied in other cryptographic applications. ElGamal and Cramer-Shoup are examples of asymmetric key encryption that are modified in accordance with a FLT of an n-state switching operation.

Diffie-Hellman

Diffie-Hellman (DH). A toy example of DH is provided in Wikipedia, Diffie-Hellman key exchange, URL: https://en.wikipedia.org/wiki/Diffie%E2%80%93Hellman_key_exchange. In this example p=23, g=5 with a=4 and A=gamod-p=54 mod-23=4. Also b=3 and B=gbmod-p=53 mod-23=10. Further, s1=Abmod-23=43 mod-23=18 and s2=Bamod-23=104 mod-23=18. The expression ga means g*g*g* . . . *g, in (a−1) operations *, which in this case is the multiplication modulo-p. Important in DH is the associativity of the multiplication operation.

A FLT of modulo-p multiplication leaves associativity intact. Use inverter inv23=[8 3 15 22 116 18 2 14 21 10 5 17 1 13 20 9 4 16 0 12 7 19] to FLT the multi-plication modulo-23. The use of an inverter may change the generator elements. The input to the FLTed DH, should also be a generator element. The input element prior to inversion by inverter inv23 can be determined by the reversing inverter of inv23 which is rinv23=[19 13 7 1 17 11 5 21 0 16 10 4 20 14 8 2 18 12 6 22 15 9 3]. From rinv23 one can see that g=5 is generated from input gi=11. Maintaining the same values of a=4 and b=3 and now gi=11 the elements of the public key are Ai=17 and Bi=10 and the common calculated key (s1i or s2i) is 6.

RSA. An example of RSA is provided in the original RSA Patent U.S. Pat. No. 4,405,829 to Rivest et al, issued Sep. 20, 1983, which is incorporated herein by reference. Herein p=47, q=59, n=2773, d=157 and e=17. The reduced totient λ(46,58) is 1334. Mod(157*17,1334)=1. Message m=89 encrypted with e=17 (me mod-2773) will generate c=2453. Decrypting with cd mod-2773 will recover m=89.

Create inverter inv2773 from a multiplication with 599 mod-2773 followed by an addition 87 mod-2773. The FLT of the modulo-2773 multiplication with this inverter will create a novel 2773-state switching function. Performing the RSA encryption of m=89 with the new switching function but still with e=17 will generate c=1803. Decrypting c=1803 with the new function and still using d=157 will recover m=89.

MHk. Merkle-Hellman knapsack. An illustrative example of MHk is provided in Paar, Christof, Pelzl, Jan: Understanding Cryptography, Chapter 9, Springer Verlag, Heidelberg, (2010). A binary message 'm' has a word of bits: e.g. m=[0 1 1 0 0 0 0 1]. A superincreasing sequence 'w' is created for instance as w={2, 7, 11, 21, 42, 89, 180, 354}. The sum of the sequence is 706. Select a number 'q' greater than the sum, for instance q=881, and a number 'r' between [1,q] for instance r=588. A sequence β is generated by multiplying each element in 'w' by r mod-q: β={295, 592, 301, 14, 28, 353, 120, 236}. Each bit in message 'm' is multiplied by the corresponding number in β and the thus generated numbers are accumulated into a sum 1129 which is the encryption of 'm'. Decryption includes multiplying 1129 by r−1 mod-q which will create 372 and 372 is analyzed based on the superincreasing sequence 'w'.

In one approach, MHk is modified by an FLT based on inverter inv881. This inverter is created by a multiplication 599 mod-881 followed by an addition 87 mod-881. It is still desirable to work with superincreasing sequence 'w'. In order to make sure that the core of the procedure works with 'w', one has to determine the reverse inversion of 'w' (called 'wri') at the input. This is achieved by applying rinv881 to 'w' to generate wri=[622 119 69 825 122 856 159 627] at the input of the FLT modified MHk procedure. The device has to generate a public key β which in the FLT modified procedure is achieved by using the factor r=588 and combining this with each element of 'wri' through the FLT of multiplication m881 (modulo-881 multiplication) with inverter inv881. This will generate βFLT=[529 234 879 289 812 682 599 24]. This is different from the original β=[295 592 301 14 28 353 120 236]. As in the original example, the 3 terms corresponding to message bits being 1 are accumulated, but not with '+' but the FLT of '+'. This will generate tsum=724.

Decryption is the multiplication of tsum=724 with the FLT multiplicative inverse of r=588, which is $r^{-1}$=6. And the result of tsum*$r^{-1}$=402. The result 402 in the FLTed operation is the rinv881 of the actual sum. Accordingly, the actual sum is inv881(402) which is 372, which can be analyzed with the original superincreasing sequence.

Elliptic Curve Cryptography (ECC). At least two approaches of using FLT can be applied in Elliptic Curve Cryptography (ECC). In one approach, an ECC operation is FLTed in its entirety. This may be called 'simple FLT' of ECC and is illustrated in FIG. 29.

Processing of data in ECC based Diffie-Hellman key exchange, includes calculation of k(mP) and m(kP) points on an Elliptic Curve to arrive at the common point on the curve. Because the inverters inv1 and rinv1 cancel each other out, the output of the first stage can be used as the input of the second stage. To make sure this works, one has to determine a generator element (x,y) on the curve and determine (i1,i2) that can be shared as part of a public key. Stage kP is illustrated in 7411 in FIG. 29 and stage mP is illustrated in 7412 in FIG. 29.

A much more involved and probably more secure modification of an ECC procedure is using FLTed primitive switching operations to determine points, point additions and point doubling on a curve. That is, replace the addition, subtraction and multiplication over Finite Fields GF(n) by FLTed operations. Paar in Understanding Cryptography provides a 17-state toy example of an Elliptic Curve in GF(17) using curve E: $y^2x^3$+2*x+2 (mod-17). Using generator point (x,y)=(5,1) 18 points on the curve are generated with 19P=O as added neutral point. Paar also provides a Diffie-Hellman (ECDH) example with base-point P=(5,1) and private keys kA=3 and kB=10 to create common point (13,10). The points on the curve include (0,6) and (0,11) and (5,1) and (5,16).

Select an inverter inv17=[8 1 11 4 14 7 0 10 3 13 6 16 9 2 12 5 15] and corresponding rinv17=[6 1 13 8 3 15 10 5 0

12 7 2 14 9 4 16 11]. From rinv17 it is seen that the new zero-element is 6 and the one-element remains 1. Furthermore, the formula for the curve now becomes: E_flt: $y^2=x^3\oplus(13\otimes x)\oplus13$. That is because, as seen in rinv17, rinv17(2)=13. The operations $\oplus$ and $\otimes$ are the FLTed addition and multiplication over GF(17), respectively in accordance with inv17. This FLTed curve also has 18+1=19 points and include points (5,2) and (5,10) which are not on the original curve. For point addition and point doubling, the known formulas are applied, after being FLTed.

For point doubling on the original curve a factor s=(3*x12+a)/2*y1 is determined. In the FLT the operations + and * are FLTed into $\oplus$ and $\otimes$. Furthermore the factor 3 becomes rinv17(3)=8 and 2 becomes rinv17(2)=13. Using basepoint (5,2) one can generate the 17 other points on the FLTed curve. Using kA=4 and kB=9 generates 4(9(5,2))=(15,11) and 9(4(5,2))=(15,11). In this example rinv17(1)=1, which means that the multiplicative inverses in the FLTed multiplication are determined relative to 1.

The same FLT approach can be applied to a Koblitz curve, an elliptic curve over a binary field, for instance over GF(32). Use the curve $y^2+x*y=x^3+a*x+b$ with a=1 and b=1. The finite field GF(32) is generated by: addition over GF(32) by bitwise XORing and the multiplication over GF(32) modulo $x^5+x^2+1$. This generates a curve with 21+1 points. The known formulas for point doubling and point addition in binary elliptic curves will be used as for instance taught in Rabah, Kefa, Elliptic Curve Cryptography over Binary Finite Fields GF(2m), Information Technology Journal, January 2006, DOI: 10.3923/itj.2006.204.229 which is incorporated herein by reference.

ECDH of point (8,23) on the curve using kA=4 and kB=9 will generate point (14,7). Modify by FLT the addition and multiplication over GF(32) with inverter inv32=[8 18 28 6 21 15 1 27 2 24 22 12 31 5 11 17 25 3 13 23 4 30 16 10 19 9 7 29 14 20 26 0]. The reversing inverter is rinv32, with rinv32(0)=31, the new zero-element and rinv32(1)=6, the new one-element to determine the multiplicative inverse. The new FLTed curve has as parameters a=rinv32(1)=8 and b=rinv32(1)=8 and has also 21+1 points. The point doubling and point addition formulas are modified in accordance with the FLT. In the thus FLTed ECDH of base point P=(3,10) on the FLTed curve with kA=4 and kB=9 will generate common point (24,5) with intermediate points (0,12) and (16,27) from kAP and kBP, respectively.

Cryptographic Hashing/Message Digest

To illustrate the FLT in hashing applications, the SHA-2 standard, published as Specification for the Secure Hash Standard (SHA-2), Federal Information Processing Standards Publication 180-2, August 2002. (FIPS PUB 180-2) and incorporated herein by reference, will be used. There are many hashing/message digest algorithms. Virtually all apply bitwise XOR operations on words of k bits. A purpose of the application of k XORs is to enter or capture message data from which a hash value has to be generated. Bitwise XORing of words of bits is a vital part of additional steps in known SHA algorithms, such as the sponge mechanism in SHA-3.

One may want to modify a hash procedure to generate a new, unknown result from a same input, compared to the original hash procedure. This can be used for instance to detect if a man-in-the middle attack is in play. One may also modify a defined hash procedure to increase unpredictability of a hash value of a message. Or, a hashing procedure may be modified to create a different type of crypto currency mining.

Bitwise XORing often takes place in hashing on words with a large bit-count, like 32, 64, 512 or even higher. Depending on how powerful a processor is, or the need for more security, a word of k bits may be divided in multiples of p bits, for instance in bytes of 8 bits. The bytes (or words of p bits) are treated as $2^p$-state symbols. The addition over $GF(2^p)$ which represents bitwise XORing of p bits, can then be FLTed as for instance explained above, as related to AES.

Procedures like SHA-2 and also SHA-3 also include processing that change out-puts. These processes can be FLTed, while leaving a basic structure in place. For instance SHA-256 as described in FIPS 180-2 requires bitwise operations on words of bits in accordance with section 4.1.2 in FIPS 180-2: $Ch(x,y,z)=(x\hat{} y)\oplus(x\hat{} z)$ and $Maj(x,y,z)=(x\hat{} y)\oplus(x\hat{} z)\oplus(y\hat{} z)$. (see equations (4.2) and (4.3) in sections 4.1.2 of FIPS 180-2). These expressions have 3 variables.

Instead of a bit, an n-state equivalent of words of p bits will be considered herein. As illustrative example, words of 3-bits as 8-state symbols are considered. That is: instead of considering bit wise operations on AND and XOR operations, a device operating on 3-bit words, or 8-state operations which are called AND8 and XOR8, will be created and later modified by an FLT.

FIG. 30 7501 illustrates the creation of the switching table for AND8 in binary form by bitwise AND operations of 3 bits in corresponding positions in the input words. Table 7502 shows the equivalent decimal representation. Application of 8-state inverter inv8=[6 5 7 4 3 1 0 2] in an FLT to AND8d will generate AND8dFLT in 7601 in FIG. 31, with the binary representation in 7602 in FIG. 31.

Replacement of AND8 with AND8FLT provides a significant change in output. The 3-bit example has been provided to give an impression what the FLT modification can do in changing an output of an operation. Clearly, the change is significant compared to the original bit-wise AND. Similar changes are applied to the XOR operation, using the same or a different 8-state reversible inverter in the 8-state case. For instance in the 256-state case, bitwise operations upon 8 bits will be modified: $Ch(x,y,z)=(x\hat{} y)\oplus(x\hat{} z)$ will become Ch(X,Y,Z)=(X AND256flt Y) XOR256flt (X AND256flt Z), wherein X, Y and Z are 256-state inputs of 8-bit words and AND256flt and XOR256flt are the FLTed variants of the 256-state representations of bit-wise operations on words of 8 bits.

One application of message digests or hashing values is a Merkle tree, disclosed in U.S. Pat. No. 4,309,569 to Ralph Merkle issued on Jan. 5, 1982 which is incorporated herein. In accordance with an aspect of the present invention a Merkle tree is formed by using a message digest or hashing method/device that has at least one n-state function/device modified by an FLT. In accordance with an aspect of the present invention an FLTed Merkle tree is formed wherein at least one top of a branch is assigned an n-state inverter to be applied to an FLT of a hashing/message digest. In accordance with an aspect of the present invention an FLTed Merkle tree is formed wherein at least one node in the Merkle tree is assigned an n-state inverter to be applied to an FLT of a hashing/message digest.

Digital Signatures

Digital signatures are described in Paar's Understanding Cryptography and in FIPS PUB 186-4. The methods to generate and check digital signatures include several cryptographic steps which are described above. For reference purposes a block diagram in FIG. 32 illustrates generating and checking a digital signature. In one embodiment a message 'm' is applied to a message digest generating device 7701 which provides the message digest to a cryptographic device 7702. In general, the cryptographic device 7702 is an encryption device such as an RSA encryption, an Elliptic Curve encryption or an ElGamal signature device or any other device that preferably uses asymmetric encryption. The message and its signature are transmitted over a physical communication channel to a receiver with a message digest generator 7703 to generate a message digest from the received message. The generated message digest is then processed with decryption device 7704 with a public key corresponding to the private key. The decrypted digital signature shall be identical to the locally generated message digest to be verified.

In some explanations a digital signature is generated from the message instead of a hash value. This is deemed to be insecure and it is better to generate a digital signature from a hash value or message digest of a message. No matter how a digital signature is generated, in accordance with an aspect of the present invention the generating of a digital signature is modified by applying an FLT to at least one n-state switching function/device wherein an n-state switching function/device may include binary operations and/or devices. There are many digital signature schemes and include the schemes as listed in website https://en.wikipedia.org/wiki/Digital_signature which is incorporated herein by reference.

Message Authentication

Message Authentication Codes (MACs) are similar to digital signatures, with at least one difference that signing and verification take place with the same key. There are many different MAC applications. In general they use hashing and/or encryption steps, which may all be modified with an FLT. Sometimes different hashing methods are applied to a message, as in Transport Layer Security (TLS). These may also be modified with an FLT. FIPS PUB 198-1, The Keyed-Hash Message Authentication Code (HMAC), 2008 which is incorporated herein by reference, is an example of a MAC standard. UMAC or Universal Message Authentication Code applies families of hashing functions, which may be modified with an FLT. UMAC is described in Black et al. UMAC: Fast and Secure Message Authentication, August 199, Advances in Cryptology—CRYPTO '99. Lecture Notes in Computer Science, vol. 1666, Springer-Verlag, 1999, pp. 216-233, which is incorporated herein by reference.

Cryptographic processes are sometimes called cryptographic primitives or primitives for short. This is different from n-state switching functions which are part of a cryptographic process and which may be called switching primitives. Exchange of signals over a network often involves multiple and different cryptographic processes, they may require authentication, signatures and/or encryption. For instance secure information exchange over the Internet is achieved by using Transport Layer Security 1.2 (TLS version 1.2), which defines various cryptographic operations, such as digital signing; stream cipher encryption; block cipher encryption; authenticated encryption; and public key encryption. Several primitive cryptographic steps are applied in TLS 1.2: The Transport Layer Security (TLS) Protocol Version 1.2, August 2008, rfc5246 at https://tools.ietf.org/html/rfc5246 which is incorporated herein by reference. This version is obsoleted by version 1.3 known as rfc8446 at https://tools.ietf.org/html/rfc8446 which is incorporated herein by reference.

An implementation of TLS requires a cipher suite of cryptographic operations. For instance in certain versions of MS Windows a TLS cipher suite was configured with a single string such as: TLS_ECDHE_ECDSA_WITH_AES_256_GCM_SHA384_P384 as described in https://docs.microsoft.com/en-au/windows/win32/secauthn/cipher-suites-in-schannel which is incorporated herein by reference. In accordance with an aspect of the present invention one or more cryptographic steps that are part of TLS are modified in accordance with an FLT.

One or more cryptographic operations are applied in device based operations that involve a bank-card and ATM-card, a credit-card, a debit-card. a smart card, a chip card, an ePurse or any card-based financial or order transaction related card. An example of a widely used card-based system is the EMV based card. The standards for EMV card technology is managed by EMVCo, LLC. with a listed office in Foster City, Calif. Cryptographic operations on EMV based cards are explained in White Paper EMV Key Management-Explained, CRYPTOMAThIC, downloaded from https://www.cryptomathic.com/hubfs/docs/cryptomathic_white_paper-emv_key_management.pdf and which is incorporated herein by reference. A more general overview of cryptographic transactions, including card based cryptography is provided in a slide-set: Benaloh, et al. Practical Aspects of Modem Cryptography, 2016, downloaded from https://courses.cs.washington.edu>courses>slides>lecture6 which is incorporated herein by reference.

It is impossible to list all possible cryptographic applications herein and their different cryptographic primitives. In accordance with an aspect of the present invention at least one cryptographic primitive is modified with an FLT in a practical application of cryptographic methods, operations or devices.

In accordance with an aspect of the present invention at least one n-state switching primitive characterized by an n-by-n switching table which may also be called an n-state 2-input/one output switching device or an n-state 2-input/one output switching function is modified with an FLT in a practical application of a cryptographic method, operation or device.

In accordance with an aspect of the present invention, an n-state FLTed switching primitive may be characterized by one of the following: 1) a representation of a modulo-n addition or modulo-n multiplication or a modulo-n subtraction FLTed based on an n-state inverter that is not identity; 2) a representation of an addition or multiplication or subtraction over a finite field GF(n) with n being prime FLTed based on an n-state inverter that is not identity; 3) a representation of an addition or multiplication over an extension finite field $GF(n=2^p)$ with p greater than 1, FLTed based on an n-state inverter that is not identity and wherein the FLTed operation is not characterized by an addition or multiplication over $GF(n=2^p)$ determined by a irreducible polynomial of degree p with coefficients in GF(2); 4) a representation of an addition or multiplication or subtraction over an extension finite field $GF(n=q^p)$ with q a prime greater than 2 and p greater than 1, FLTed based on an n-state inverter that is not identity and wherein the FLTed operation is not characterized by an addition or multiplication or subtraction over $GF(n=q^p)$ determined by a irreducible polynomial of degree p with coefficients in GF(q); 5) an n-state operation characterized by an expression (e-i1−i2) mod-n wherein e, i1 and i2 are selected from 0, 1, . . . (n−1), the expression being FLTed into an operation that is not characterized by an expression (e-i1−i2)mod-n wherein e, i1 and i2 are selected from 0, 1, . . . (n−1); 6) an n-state operation characterized by the expression prod(i1,i2,n)=mod ((i1+i2−1),n)+(((i1+i2−1)>=n)*1) for n>0 and prod(0,0,n)=0, FLTed based on an n-state inverter so that the FLTed expression is not characterized by the expression prod(i1,i2,n)=mod((i1+i2−1),n)+(((i1+i2−1)>=n)*1) for n>0 and prod(0,0,n)=0; 7) any n-state operation characterized by a zero-element 0 that is FLTed in an n-state operation wherein 0 is an outcome but is not the zero-element; 8) any n-state operation characterized by a one-element 1 that is FLTed in an n-state operation wherein 1 is an outcome but is not the one-element.

Streaming Ciphers

FIG. 33 illustrates in 7800 an 8-state shift register with feedback in Fibonacci configuration. The function sc8 is an addition over GF(8). The device '*2' is an 8-state inverter characterized by a multiplier factor 2 from the multiplication over GF(8), which in this case is [0 2 4 6 3 1 7 5]. The device has 3 shift register elements: SRE1, SRE2 and SRE3, each enabled to hold and shift an 8-state signal. The shift register is under control of a clock. Running the device for 511 cycles will generate a maximum-length (ML) sequence of 8-state symbols. The ML character of the output can be checked by calculating an auto-correlation of the 511-symbol sequence, which will be flat with a single peak. The content [SRE1 SRE2 SRE3] of the shift register is a word of 3 8-state elements. After each shift, the shift register has a unique content that will repeat after 511 shift steps. Accordingly, the consecutive contents [SRE1 SRE2 SRE3] form a sequence of pseudo-random non-repeating of 511 8-state elements. The device is a pseudo-random number generator. The start of the sequence depends on the initial content of [SRE1 SRE2 SRE3]. In this example starting with initial state [2 5 0] of [SRE1 SRE2 SRE3] of 8-state symbols the first seven 8-state symbols generated are [1 6 5 5 7 2 3]. This corresponds to the following 7 states of the shift register [SRE1 SRE2 SRE3]: [2 5 0], [1 2 5], [6 1 2], [5 6 1], [5 5 6], [7 5 5] and [2 7 5]. The content of the shift registers is unique for 511 cycles. The content [0 0 0] will not be generated as being the forbidden state. The content of the shift registers thus is a sequence of 511 numbers in [1,511].

Figure 34:
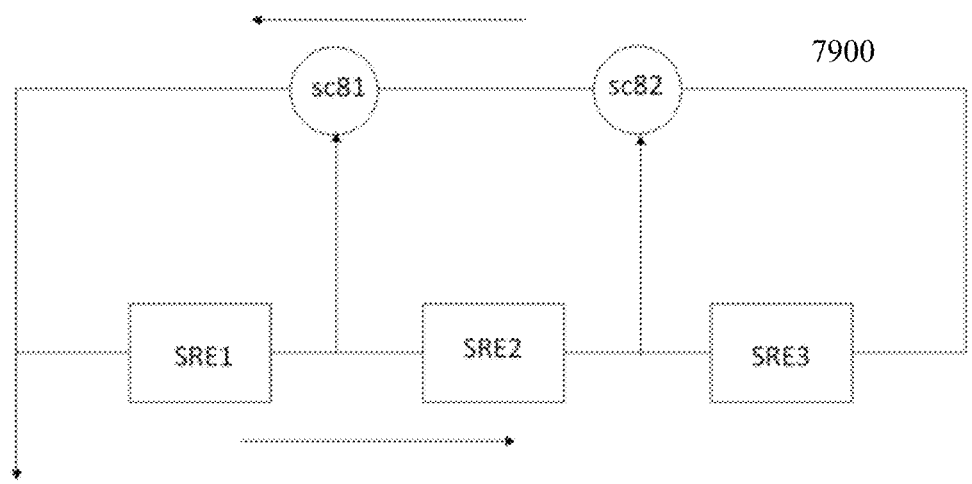

Different pseudo-random number generators can be formed by applying an FLT. To facilitate an FLT, one may want to reduce the inverters into the switching functions to create equivalent single representative function sc81 and sc82, as illustrated in 7900 in FIG. 34. One may then replace sc81 and sc82 with an FLTed modification of these functions, by applying for instance inverter inv8=[6 5 7 4 3 1 0 2] which generates sc81m and sc82m. Replacing sc81 with sc81m and sc82 with sc82m and running the modified device for 511 cycles will again generate a 511 element 8-state ML sequence and a unique sequence of words of 3 8-state symbols as shift register content. The first seven output elements generated are [7 6 0 5 5 2 2] and the first 7 corresponding contents of the shift register are [2 5 0], [7 2 5]. [6 7 2], [0 6 7], [5 0 6], [5 5 0] and [2 5 5], each representing a radix-8 decimal number.

This is a simple modification that allows a series of different random number generators to be created using a single proto-type device that is modified. This is simpler than developing a random number generator from scratch each time. However, one is cautioned that the FLT may change the forbidden state of the shift register. That forbidden state is [0 0 0] in the original device and is [6 6 6] in the FLTed device. If one wants to use the device for purposes wherein all consecutive numbers in a range are included (such as a transposition), one should add the forbidden state to the generated numbers.

While a feedback shift register in Fibonacci configuration is shown, the modification may also be applied to a feedback register in Galois configuration. The shift register device 7900 may be used in a continuous scrambler type device by providing the output signal of 7900 to a reversible n-state function or device. Reversibility is required for decryption or descrambling.

One may also insert a reversible n-state switching device 'sc' in the feedback shift register as illustrated in FIG. 49 and FIG. 51 of U.S. patent application Ser. No. 14/622,860 to Lablans filed on Feb. 14, 2015 which is incorporated herein by reference, to create a continuous scrambler or stream cipher.

Pseudo-random sequence generators are useful in different applications: in cryptographic applications, in computer simulations, in object selection, in testing of computer chips (BIST), noise simulation, gaming, pseudo-random MRI sequences The FLT may be applied in modifying error-correcting coding such as Reed Solomon codes. The FLT may also be applied in generating or mining crypto-currency or digital currency which is a proof-of-work currency. For instance Bitcoin uses SHA-2 for mining and Ethereum uses Keccak as proof-of-work approach. These proof-of-work applications/devices may also be modified in accordance with one or more FLTs.

As disclosed herein, the FLT may be used to modify an n-state switching function device in different practical application which include: 1) a block oriented cryptographic application; 2) a continuous or streaming cryptographic application; 3) generation of pseudo-random sequences; 4) error-correcting coding; 5) proof-of-work applications including digital currency.

In accordance with an aspect of the present invention two devices in communication with each other over a physical channel apply a cryptographic application that applies or is modified by an FLT. In one embodiment of the present invention, both devices apply identical n-state switching function(s)/device(s) that are FLTed with an n-state inverter that is known or stored or available on both devices. One may assume that the channel is not secure. In one embodiment of the present invention the n-state inverters are distributed to devices in a physically secure way, for instance on a memory or storage device. A communication channel may be an external channel that connects to an external device. A communication channel may also be an internal channel in a device that connects for instance to a storage device or a device that stores data. The data may be obtained from external sources. Data exchange over a channel may require signal processing, including modulation, demodulation, error correction, amplification and the like. All required steps for proper and error-free data exchange over a communication channel are assumed to be performed as is known to one of ordinary skill in data transmission and data exchange.

A message herein are signals representing one or more symbols. A message may be general data, it may represent text, image or sound, a state of a device or any other meaning. A message may be received externally to be processed. It may also be generated internally on a computing device and provided to a processor to be processed in accordance with a cryptographic method. A message may be available as a stream or sequence of bits or in the form of k-state signals. In general processors operate on bits or words of bits. Before applying FLT methods as disclosed herein, data is prepared and presented in an n-state format. For instance, a sequence is split up in words of 8 bits or bytes. In other cases, data may be prepared to be interpreted and processed in modulo-n format.

Figure 13:
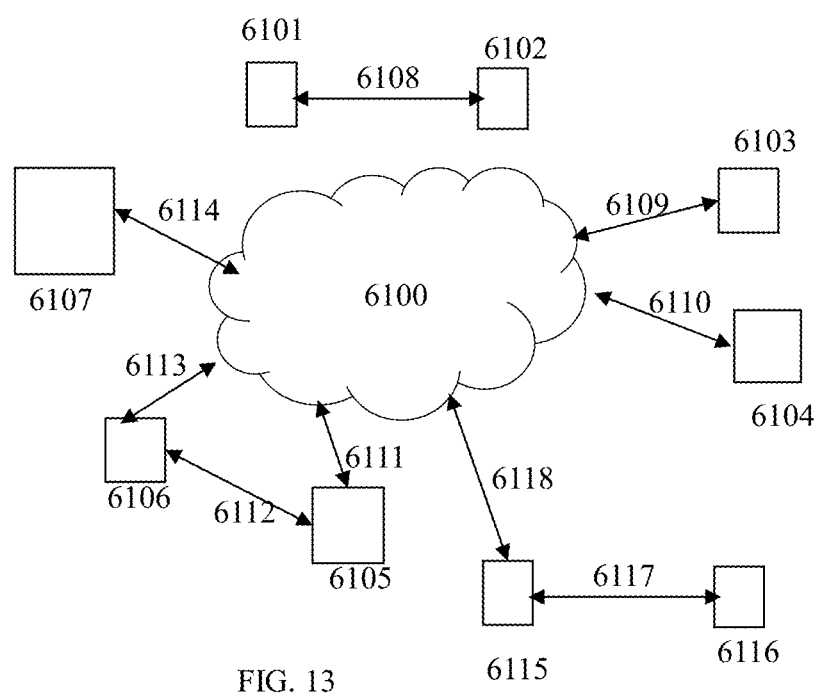
FIG. 13 illustrates network configurations in accordance with various aspects of the present invention.

A public-key infrastructure (PKI), as is known in the art, provides the aspects to distribute and manage cryptographic elements to secure exchange of data. These aspects are known and for instance described in Kiran et al., PKI Basics—A Technical Perspective, 2002, downloaded from http://www.oasis-pki.org/pdfs/PKI_Basics—A_technical_perspective.pdf and which is incorporated herein by reference. FIG. 13 illustrates a network with networked computers. Herein a server 6107 may provide PKI related data to connected devices. In accordance with an aspect of the present invention, one or more n-state inverters and related ID codes of the inverters are distributed from a PKI server to participants via a communication channel, such as the Internet or any other wired or wireless channel. Each n-state inverter, which may be represented by 'p' bits, has associated with it a unique identifying ID code. An identifying ID code is preferably smaller in bitsize than the n-state inverter it identifies. A length of an uncompressed n-state inverter is determined by the value of 'n'. However, one may also set an n-state inverter by a rule. The rule needs to include the value of 'n' and the factors in the rule. For instance an n-state inverter rule of an n-state element 'i' may be set as inv=(fac*i) mod-n+offset mod-n. The rule in that case has a size of at least 3 times the bitsize of n if one only transmits the elements of the rule. In that case, an ID of factors of a rule may be longer than the factors of a rule. Preferably, a structure or appearance of an ID is meaningless to the actual structure or factors of an n-state inverter or an n-state inverter rule. An n-state inverter rule is preferably realized on a programmable processor that is enabled to perform Big-Integer calculations. The circuit that performs such calculations may be a dedicated machine logic circuit or may be part of the Arithmetic Logic Unit (ALU) of a processor. Specific opcodes may be used to instruct the ALU to perform the rule of an n-state inverter. The ALU combined with the instruction set establishes a circuit that performs the n-state inversion and thus is physically an n-state inverter. One may use rule based n-state inverters for any n being 2 or greater. Preferably rule based inverters are applied for large values of n for instance for n=1,000,000 or larger or for n being represented by 100 bits or n=2^100 or larger.

A distribution of n-state inverters may also take place by distribution/storage on physical media, such as memory stick, chips, magnetic media, optical media and the like. For instance a set of n-state inverters and their IDs may be loaded on a chip of a chipcard or on a smartphone and also be loaded on a computer or computer server. The IDs may be assigned to be uniquely coupled to n-state inverters based on an identity of a specific user or end device. A server connecting to a specific computing device has one or more n-state inverters that uniquely correspond to n-state inverters on the device or assigned to the user.

Thus two devices that connect and that recognize or ID each other, or one device recognizes or IDs the other one, have one or more n-state inverters with IDs that correspond to each other and preferably are the same. Both devices may have a plurality of n-state inverters with IDs that correspond. In accordance with an aspect of the present invention a plurality of n-state inverters has assigned to the individual inverters an order assigned to it. The order may be determined by a numerical value derived from an ID or an order in which the n-state inverters are stored or any other type of order. Furthermore, not all stored inverters need to have the same 'n.' For instance a first inverter may be an n1-state inverter, while another inverter may be an n2-state inverter. Furthermore any n-state inverters has at least n!−1 different reversible inverters if one excludes the identity.

Accordingly, two devices may store and apply at least k different reversible inverters, or rules for reversible inverters that can be activated by a processor by being retrieved based on an ID and implemented for execution. After being used at least once, or being superseded by an inverter of a different order, an ID and thus its corresponding inverter or inverter rule may be disabled for use or being removed. Disabling may happen by changing a field associated with an ID or by overwriting the stored inverter or inverter rule by all zeros for instance which will be recognized by a processor to be an invalid or unusable field. Similarly, the ID may be changed by replacing one or all bits by zeros, indicating to the processor that a corresponding inverter is invalid. Thus, based on the above, two computing devices that are connected, possible through a network, through wireless contact or through galvanic contact have the same reversible inverters that uniquely match with the same or a matching ID. In one embodiment, a third computing device has a list of IDs of inverters of the two computing devices, but preferably not the inverters. This third computer may instruct one computing device or both to activate an inverter based on an ID. The one computing device may then provide the second computing device with the ID of the to be activated inverter.

Whatever approach is used, one has two computing devices in connection with each other over a channel that may be insecure and enabled to exchange data, each computing device having activated a specific n-state inverter to be applied in an FLT, the specific n-state inverter being substantially unknown to the outside world, at least unknown to unauthorized devices.

Accordingly, when a first computing device transmits the ID of the inverter to the corresponding second device, the second device "knows" which inverter to activate, while the outside world is unable to identify the inverter. The confidentiality of the n-state inverter allows to use smaller chunks of data to maintain security (such as keywords or modulus of operations) while maintaining a similar level of security, or achieve a higher level of security with the same amount or size of cryptographic operations.

In accordance with an aspect of the present invention, a selection of a modification of an n-state switching function is based on content of a key-word. For instance: AES symmetrically applies a keyword of 128, 192 or 256 bits. A predetermined section of an AES keyword of a number of bits, for instance 200 bits or 100 bits of 75 bits or 50 bits or 32 bits is designated as related to an n-state inverter to modify by FLT an n-state operation in AES. Furthermore, one section in the keyword may be designated to indicate which operation in AES is modified, such as SubBytes( ), MixColumns( ) and AddRoundKey( ). Yet another section may indicate which round is to be modified. To further obfuscate the modification, one may scramble the section of a keyword for determining a modification. For instance, one may want to select one out of a billion 256-state inverters or 256-state inverter rules for an FLT. These rules may be stored in an order in a memory or on a storage medium. To identify one out of a billion inverters requires an ID of at least around 30 bits. One may scramble 30 ID bits with for instance a 30 bit LFSR being a sequence generator. For instance, a keyword of 256 bits is used. Bits 11-16, when representing a value between 16 and 48, indicate that an addition over GF(256) in AddRoundKey( ) is to be modified by an FLT with a 256-state inverter. The ID of the inverter (or inverter rule) is based on bits 21-50 in the 256-bit keyword. A shift register of an LFSR is loaded with the 30 bits and the LFSR is run for k cycles. The number k may be previously agreed upon or may be included in for instance positions 31-35 of the keyword. The LFSR may be run for instance for k=19 cycles and the resulting content of the shift register is the actual ID of the inverter which may be retrieved from memory or storage device. Furthermore, one may provide IDs of configurations of LFSRs that are selected based on a content of one or more bits in a keyword or in an accompanying message.

This 'hiding' of information in the keyword prevents accessing of a previous AES modification. It provides the capability to almost 'ad hoc' modify encryption and decryption with no or almost no opportunity to have an effective attack by a malfeasant. Instead of using the actual keyword, which may be used several times, one may exchange a specific 'modification' key word that instructs both encryptor and decryptor which changes are to be implemented. With a sufficient number of different changes that preferably are not repeated, it will be very hard to determine for an attacker which changes are to be made.

Similar changes may be applied in key-exchange methods and devices like Diffie Hellman and RSA. One may include a modification code in a public key or as part/interpretation of a public key or add a modification code as part of a public key.

Aspects of cryptographic operations relate to the type of operation (RSA, DH, AES, SHA-2, DSS, MAC, etc) and the switching operation that is being modified. Some of the aspects, such as for which operation the inverter is used, which switching operation s modified, the number of exponentiations, and other aspects, may be predetermined prior to distribution of inverters and included in additional fields apart from an ID that will tell a processor which method to apply, which parameters to use to generate a useful result. This may include a definition of the basic switching function to be modified. This may be a modulo-n operation. It may also be an operation over an extension finite field.

The confidentiality of the n-state inverter and thus of the FLTed operation based on this inverter makes it exchange cryptographic data that is usually kept confidential. For instance a simple FLTed Diffie Hellman method may include as public data: an ID of an inverter (which allows determinations or setting of n), a generator element g and a value k for exponentiation. Both computers determine gk= (g ⊛ g ... ⊛ g) with ⊛ being the FLTed basic operation to generate a common keyword. More security can be achieved by also keeping k confidential and shared. The highest level of security is achieved by following the common rules of public/private key.

All parameters of a cryptographic operation may be stored and retrievable under an ID. The only information for executing the cryptographic method is at least the ID of the inverter and the data that is processed in accordance with the cryptographic method.

In one embodiment of the present invention one wants to initiate a session between computers that is short-lived or ephemeral. That is, the generated cryptographic data is valid for a short period of time. After use, the parameters will not be used again and new ID and parameters will be activated. For instance access to a structure such as a car or a garage or even to an ATM machine or an Internet-of-Things (IoT) device is a temporary or one-time event with a specific ID. For instance, a common keyword is generated by a first and a second computing device, a first device transmits that keyword to a second device, the second device also calculates that keyword and determines if a keyword received from a device is identical to the locally generated keyword. If so access is provided to a car, by activating or unlocking a lock in a car, or a garage door opener motor is activated to open the garage door, access is provided to a computer, a database or an ATM machine or a barrier is unlocked. A door may be opened from a smartphone. However, a door opener may also be a dedicated device such as a fob or a separate device that is activated by a user. In other cases a door opener may be a Near Field Communication (NFC) device. As long as the ID or inverters/parameters are unpredictable, the cryptographic application serves its purpose for its one time use. After use, the ID and other data are disabled in both devices preventing its use or re-use. One may reactivate IDs and inverters during an update. A new and unpredictable ID and inverters will be activated for a next cryptographic operation, by a processor stepping through an order of IDs. An IoT device is a device connected to the Internet with a processor or processing equipment enabled to receive and transmit data over the Internet. Processing capabilities in an IoT device are at least used to generate and/or process cryptographic signals.

The situation is different for long term cryptographic use, such as encryption of confidential documents and messages that need to be held confidential for years to come. In that case it is best to transmit as little cryptographic information as needed and only essential parameters are disclosed. Because parameters are known to both computers, one may further limit parameters in a public key by presetting one or more of those parameters in combination with the n-state inverter under a unique ID.

In accordance with an aspect of the present invention at least one n-state inverter is stored, saved or made accessible in each of two computing devices to be used in an FLT. In accordance with an aspect of the present invention at least 2, preferably more than 10, even more preferably more than 100, even more preferable more than 1000, even more preferably more than 100,000 and most preferably more than 1 million different inverters and/or different rules for applying an inverter are stored and/or made accessible on and for a computing device.

In one embodiment, for instance in case of creating access to a device under control of one computing device, both keys in a DH scheme are distributed, as the n-state inverter is kept secret.

The individual Lab-transform by mod-n multiplication modification and steps in accordance with one or aspects of the present invention are provided in Matlab function screenshots 7300, 7301 and 7302 in FIG. 23. The main Matlab function is labtransform_indiv_mod(i1,i2,k,plus,n) in 7300. The inputs are numbers i1 and i2, mod-n, the number k with which all numbers are multiplied mod-n and an offset plus which is added to the product mod-n. The inversion takes place in Matlab function ruleinv(i,k,plus,n) by Matlab instruction on line 6 in screenshot 7301. The reversing rule involves multiplication by the inverse of k which is kinv so that k*kinv=1. The inverse kinv is determined by a Matlab function modinvn on line 6 in 7302. This function executes Matlab standard function [a,b,c]=gcd(k,n) which returns the inverse as 'b'. In lines 7 and 8 the position in the inverter as vector is determined where r+plus mod n is 0 which is used in line 8 to calculate the reversing offset x in the reversing inverter. ((k*x)+plus) mod-n=0→(k*x) mod-n=(-plus) mod-n→(kinv*k*x) mod-n=kinv*(n-plus), because kinv*k=1: →x=kinv*(n-plus), which is the offset at the first position of the reversing inverter. The reversing inverter is thus the multiplier kinv mod-n with an offset x, as is determined in line 9 of 7302. This particular Lab-transform works for all values of n being a prime number.

In accordance with an aspect of the present invention a Lab-transform is provided for what is called a consecutive n-state multiplication. A consecutive n-state multiplication is characterized by the expression prod(i1,i2,n)=mod((i1+i2−1),n)+(((i1+i2−1)>=n)*1) for n>0 and prod(0,0,n)=0. Table 3200 in FIG. 7 shows part of a 27-state switching table that is characterized by the expression in provided for consecutive n-state multiplication. This operation is reversible, associative and has an inverse for which op(i,i$^{-1}$)=1, when the multiplication is represented as operation op. The inverse i$^{-1}$ of i is: i$^{-1}$=1 for i=1 and i$^{-1}$=(n−i+1) for i>1. The attractive property of this operation is that it can be applied for any n, being prime or not-prime. Unfortunately, all states are very predictable, which may make it less attractive for cryptographic operations by itself. The operation may become more attractive if it is modified in a hard detect and unpredictable way by applying a Lab-transform. For relative small numbers (such as n=256) there are sufficient unpredictable 256-state inverters that can be stored and used. In applications such as RSA, Diffie Hellman and large number elliptic curve it is preferable that a rule based inversion and its reversing inversion rule are used.

It is noted that the n-state consecutive multiplication over an n-state finite field GF(n=2$^p$) is known and one may call this also a logarithm based n-state multiplication. The development of the addition and multiplication over GF(n=2$^p$) is based on an LFSR and is explained in Bernard Sklar, Reed-Solomon Codes, 33 pages, downloaded from http://ptgmedia.pearsoncmg.com/images/art_sklar7_reed-solomon/elementLinks/art_sklar7_reed-solomon.pdf which is incorporated herein by reference.

Figure 15:
Figure 16:

A valid multiplication over GF(n=2$^p$) that may be derived from an irreducible polynomial of degree p over GF(2) can be FLTed into an n-state consecutive multiplication. For instance, 8-state switching table 6405 in FIG. 15 represents the multiplication over GF(n=2$^3$) based on irreducible polynomial x$^3$+x+1 over GF(2). Table 6400 can be derived from 6405 by an FLT with 8-state inverter [0 1 4 6 5 2 3 7]. Furthermore, table 6405 can be derived from 6400 by an FLT with 8-state inverter [0 1 4 3 7 5 6 2]. Preferably, a resulting n-state switching table that is the result of an FLT of an n-state switching table is not characterized by an n-state consecutive multiplication characterized by prod(i1,i2,n)=mod((i1+i2−1),n)+(((i1+i2−1)>=n)*1) for n>0 and prod(0,0,n)=0, wherein n is either a prime number or n=q$^p$, with q prime and p being greater than 1. A resulting n-state switching table may be the result of an FLT of an n-state switching table representing an n-state consecutive multiplication for n being prime, as long as the resulting n-state switching table is different from the n-state switching table and the resulting n-state switching table is not representing a modulo-n multiplication for n is prime.

The same applies for other operations over GF(q$^p$) with q being a prime 3 or greater and p being greater than 1. Switching tables representing 3-state multiplications over GF(n=3$^2$) are provided in FIG. 37. Table 3700 is based on irreducible polynomial x$^2$+1 over GF(3), table 3701 is based on irreducible polynomial x$^2$+x+2 over GF(3) and table 3702 represents a 9-state consecutive multiplications. All these 9-state switching tables can be derived from each other via an FLT. For instance the table 3701 can be derived from 3700 by FLT with inv9=[0 1 2 4 5 3 8 6 7]. Table 3702 can be derived from 3700 by FLT with inv9=[0 1 4 6 7 2 8 3 5].

Preferably no n-state switching devices represented by n-state switching tables based on irreducible polynomials of degree p over GF(q) with n=qc and q is a prime greater than 2 or a prime being 2 or greater and p greater than 1 or p greater than 2 are used in a cryptographic device as an FLTed device. Furthermore, preferably no n-state switching devices represented by n-state switching tables being an n-state consecutive multiplication are used in a cryptographic device as an FLTed device.

Herein, an FLT of an operation with certain meta-properties will maintain those properties after the FLT. The following definition of operations herein and their meta-properties is provided next:

An addition over a finite field GF(n): 1) the operation is closed; 2) the operation is reversible; 3) the operation is commutative; 4) the operation is associative; 5) a zero element z exists so that the addition operation (called 'op' for example) has the property op(z,a)=a for all a in Matlab notation; 6) each element 'a' in the finite field has an inverse 'a$^{-1}$' so that op(a,a$^{-1}$)=z.

A multiplication over a finite field GF(n): 1) the operation is closed; 2) the operation is reversible for all elements not being a zero-element; 3) the operation is commutative; 4) the operation is associative; 5) a zero element z exists so that the multiplication operation (called 'mul' for example in Matlab notation) has the property mul(z,a)=z for all a; 6) a one-element 'e' exists, so that mul(e,a)=a for all 'a'; 7) each element 'a' in the finite field except 'z' has an inverse 'a$^{-1}$' so that mul(a,a$^{-1}$)=e; 8) the multiplication and addition distribute.

In the common literature the zero-element of an addition over a finite field GF(n) is 0. That is when z=0: a+0=a, for each element a in the finite field and '+' representing the addition. As provided herein, it is not required for the zero-element to be 0. Accordingly, operations that meet the above requirements, even with a zero-element not being 0, still are additions over a finite field. To distinguish from common finite fields, one may call FLT generated operations additions over an alternate finite field, which is still a finite field.

Bitwise operations with p XOR devices is a known addition over a finite field GF(n=2$^p$). A word of p bits represents an n-state element from the finite field and corresponding bits of 2 words of p bits are XORed to generate a word of p bits which is also an element of the finite field. More in general, a number of extension finite fields GF(n=q$^p$) are determined by irreducible polynomials of degree p with coefficients in finite fields GF(q). Addition and multiplication tables are determined by adding and multiplying polynomials representing elements of the extension finite field modulo the irreducible polynomials. Addition takes place by adding coefficients of corresponding powers of terms in the polynomials as elements of GF(q) (thus as modulo-q addition). Furthermore, multiplication is achieved by multiplying the coefficients of the terms over GF(q) (modulo-q), determining the power of the new terms as a result of adding the exponents of the multiplier and multiplicand term and determining the remainder of this multiplication modulo the irreducible polynomial. The irreducible polynomials include, because of the modulo-q operation will create operations with zero-element 0 and one-element 1. Another operation over a finite field includes the n-state consecutive multiplication.

Elements of extension finite fields GF(n=q$^p$) are established by operations limited by irreducible polynomials of degree p with coefficients of finite field GF(q) addition and multiplication of the coefficients are done in accordance with addition and multiplication over GF(q).

It is a purpose of applying the FLT to create n-state switching functions that were unknown prior to the disclosure and related cases or could not be derived using known methods. One may then substitute in known and/or standard and/or specified machine cryptographic methods/devices one or more specified n-state operation (a modulo-n addition or multiplication or an addition and/or multiplication over an extension finite field) with a circuit defined by an FLT of a standard function. Because meta-properties of the original and FLTed n-state switching tables are identical, one circuit may be replaced by the FLTed one without modifying a flow or steps of the operations. Such a modification is novel and its application also. It is presently unknown in the art of cryptography to replace basic n-state switching functions with FLTed ones.

A purpose of the modification is to make results of an FLTed cryptographic machine less predictable while still using known and proven process flow. For low values of n, one may still want to try to run through all potential FLTs in a brute force attempt to attack signals generated by an FLTed cryptographic method. For at least that reason it is preferred to apply FLT for n-state switching circuits with n preferably greater than 4, more preferably greater than 8, more preferably n greater than 32, even more preferably n greater than 255.

It is shown herein that isomorphic operations over an extension finite field $GF(q^p)$ defined by an irreducible polynomial can be FLTed into another operation over $GF(q^p)$ also defined by an irreducible polynomial. The original operations and the isomorphic ones defined by irreducible polynomials all have zero-element 0 and one-element 1. Such an FLT may not be fatal but is undesirable. Because irreducible polynomial methods are known an attack may be based on first going through operations based on different irreducible polynomials. Preferably one should avoid FLTs that emulate that isomorphism for operations with zero-element 0 and one-element 1 and generate n-state switching functions that are known or that may be derived from known methods. Accordingly, one may want to avoid any FLT that will generate: 1) a modulo-n addition and/or modulo-n multiplication; 2) an n-state consecutive multiplication as described earlier; 3) an addition and/or multiplication over $GF(q^p)$ with q a prime and p greater than 1 with zero-element 0 and one-element 1 that is derived from an irreducible polynomial of degree p with coefficients in $GF(q)$. Also avoided as modified switching table are additions over $GF(2^p)$ represented by p bitwise XOR operations and similarly symbol-wise modulo-q additions of individual symbols in words of q-state symbols.

One must necessarily start an FLT based on an existing operation. So one FLTs an existing n-state operation into a novel n-state operation. Results of FLT operations wherein the zero-element is not 0 and/or the one-element is not 1 are believed to be unique.

The following are included in additions over finite fields: 1) modulo-n additions for n being prime; 2) representations of p bitwise XOR operations for $n=2^p$; 3) operations based on The steps that are executed on a processor or by a combinational circuit are illustrated in FIG. 24 in screenshots 7400, 7401, 7402 and 7403. Screenshot 7400 illustrates the body of this individual n-state Lab-transform on inputs i1 and i2 with modification with factor k and offset 'plus'. On lines 6 and 7 of 7400 the instructions rule_inv_cons provide the inversion of inputs i1 and i2, respective, which is detailed in 7401. The inverted inputs are processed in accordance with the consecutive n-state multiplication on line 8 of 7400 and detailed in 7403. The result of that operation is reverse inverted on line 10 of 7400 by rule_rinv_consec as detailed in 7402. The operation of 7402 determines the inverse of k, named kinv on line 6 of 7402 and determines a relative shift of the consecutive n-state multiplication with kinv on line 8 and then performs that shifted multiplication on line 13 of 7402, thus completing the Lab-transform of 7400.

The consecutive n-state multiplication, which is an associative operation and has an inverse, can be applied for any value of n, not only for n is prime. The modulo-n addition can also be modified in accordance with the Lab-transform of 7400. However, the combination of a modulo-n addition and the consecutive n-state multiplication does generally not constitute a finite field or an extension of a finite field. In order to establish a finite field $GF(n)$ for n is prime, one should use both the mod-n addition and mod-n multiplication. To establish an extension finite field $GF(q^p)$ with q a prime number, one may use the herein provided consecutive n-state multiplication in combination with an addition over $GF(q^p)$. If one uses the consecutive n-state multiplication in $GF(q^p)$ then it is required to match ordered states of a corresponding polynomial representation (or states of a corresponding n-state generating shift register with feedback) to generate the addition over $GF(q^p)$. For instance state [1 0 0 0] in a 16-state maximum length shift register with feedback may be the first state of the 15 states that this device generates. In that case, if one uses consecutive 16-state multiplication, [1 0 0 0] represents state 1 and not the "actual" decimal representation (which is 8) of the binary content. It has been shown elsewhere that a corresponding meta-state can be determined from a content of a shift register. For very large numbers this may be time consuming. The time limitation can be eased by storing intermediate states of the shift register and the corresponding meta state.

For very large numbers $q^p$ which are generally numbers $2^p$, or binary fields, one may use common binary representation and calculate multiplication products on a polynomial basis.

Rapid architectures for binary polynomial multiplications are known and may be applied in combination with using common bit-wise XORing for the addition. Fast multiplication over a finite field, including over a binary finite field is known and is described in "Fast Software Exponentiation in $GF(2^k)$, C. Koc and T. Acar, Proceedings, 13th Symposium on Computer Arithmetic, T. Lang, J.-M. Muller, and N. Takagi, editors, pages 225-231, Asilomar, Calif., Jul. 6-9, 1997, Los Alamitos, Calif.: IEEE Computer Society Press." and "Efficient Finite Field Computations for Elliptic Curve Cryptography, Wangchen Dai, University of Windsor, Ontario, Canada, 2013" which are both incorporated herein by reference.

In one embodiment of the present invention a number of n-state inverters is generated off-line and stored in a particular order. Pairs of n-state inverters are generated and stored on at least 2 devices that will exchange key data. At least one rule, for instance time or number of times used based, is stored on each machine to make sure that the 2 devices apply the same data, such as curve domain parameters and n-state inverters. In one embodiment of the present invention a device has access to at least 10, more preferably to at least 100, even more preferably to at least 1000, even more preferably to at least 100,000, even more preferably to at least 1,000,000 and most preferably to at least 100,000,000 reversible n-state inverters or inversion rules. In accordance with an aspect of the present invention a specific n-state inverter is only used in one complete cryptographic operation such as coding, decoding, authentication, access control and the like. Once a cryptographic operation is completed, access to the used n-state inverter or a corresponding rule is disabled. In one embodiment of the present invention use of a previously used n-state inverter is only enabled after all other available n-state inverters have been applied.

Figure 8:
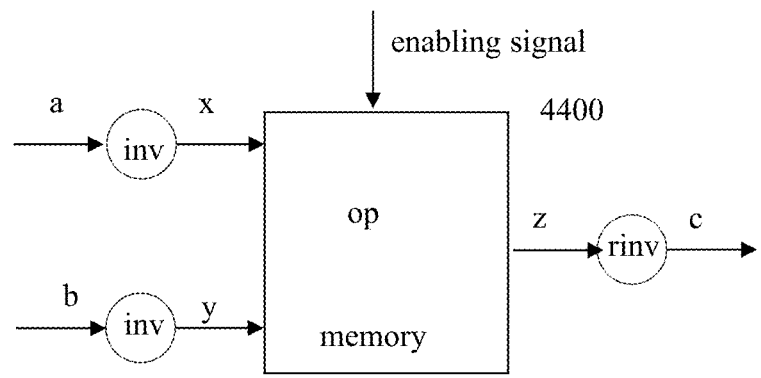
FIG. 8 illustrates a device that modifies a switching table in accordance with an aspect of the present invention.

In most cases for calculations an additive and/or a multiplicative operation is required. This can be performed by applying the rules of FIG. 1 which involve the inversion 'inv', its reversing inversion 'rinv' and the operation 'op.' To illustrate the operation symbolically the figure of FIG. 1 is used as 4400 in FIG. 8 with symbolic representations rather than numerals. The top input is provided with a signal representing state 'a' and is inverted by 'inv' into 'x'. The bottom input is 'b' which is inverted by 'inv' into 'y' and processed by 'op' to generate 'z' which is reversed inverted by 'rinv' into 'c'. One is reminded that inv(rinv(x))=x. It is known (from standard multiplication and addition) that op(x,y)=z. It is also known that if 'y' is the multiplicative inverse of 'x' and 'op' is the standard multiplication over GF that op(x,y)=1 and that op(x,y)=0 if 'op' is the addition over GF and 'y' is the additive inverse of 'x' that op(x,y)=0. The standard inverses can be determined through known operations such as the extended Euclidean algorithm for the multiplicative inverse and the complement rule as explained earlier for the additive inverse.

For the multiplicative inverse of 'a' when 'op' is a modular multiplication: $x*y=1 \rightarrow inv(a)*inv(b)=1 \rightarrow inv(a)*inv(b)*inv(b)^{-1}=1*inv(b)^{-1} \rightarrow inv(a)= 1*inv(b)^{-1} \rightarrow rinv(inv(a))=rinv(inv(b)^{-1}) \rightarrow a= rinv(inv(b)^{-1}) \rightarrow a=rinv(y^{-1})$. The term $y^{-1}$ is the multiplicative inverse of x=inv(a) which is determined via the extended Euclidean algorithm. A similar approach is applied for the additive inverse. The reversing inverter is determined by interchanging the position (or index) of a symbol in the inverter with its value.

A preliminary unique signal or unique code may be applied to activate a particular configuration as described earlier. The design and use of unique and basically unpredictable codes has been explained in U.S. Pat. No. 9,100,166 issued on Aug. 4, 2015, which is incorporated herein by reference.

In an illustrative 'toy' example with very small numbers a configuration over a finite field GF(p=29) is activated with r=11 and $r^{-1}$=8. Devices 1 and 2 send public data c(r,k1)=8 and c(r,k2)=23 to each other, so c1=m29(r1,k1) and c2=m29 (r1,k2). Accordingly, k1=m29($r^{-1}$,8)=m29(8,8)=6 and k2=m29($r^{-1}$,23)=m29(8,23)=10. The operation m29 in this illustrative example is the multiplication modulo-29. Based on (k1, k2) the key m29(6,10)=2 is generated if a multiplication over GF(29) is used to generate the key.

In accordance with an aspect of the present invention, a reversible inverter inv29=[5 6 0 8 9 10 11 12 13 14 15 16 17 18 19 20 21 22 23 24 25 26 27 28 7 12 3 4] is used to modify the finite field GF(29) into alternate finite field aGF(29) according to rules illustrated by FIG. 1. An analysis of inv29 shows that the this inverter is created by two steps: most elements are created from the identity by adding 5 to each element or by shifting all elements rotationally 4 positions to the left, 0 becomes 5, 1 becomes 6, etc., with 2 important exceptions: element 2 (counting from origin 0) is now 0 (should be 7 if only shifted), and the 7 has gone to where the 0 would have been and element in position 24 is now 7. The 1 is now in position 25 and is the one or neutral element. By breaking up the adjacency of 0 and 1 the zero and one element are no longer adjacent. A program merely has to check the use of elements 2 and 7 to apply a specific inversion (2→0 and 24→7) and for all other elements the "add 5" rule can be applied.

The inverting inventor rinv29 or inv29 is rinv29=[2 25 26 27 28 0 1 24 3 4 5 6 7 8 9 10 11 12 13 14 15 16 17 18 19 20 21 22 23]. It is already known that elements 0, 2, 7 and 24 are special cases. All other elements can be reversed back with rule "subtract 5 or add 24 mod-29" with exception rule 0→2 and 7→24. In software inversion rules as explained above are very simple software loops.

The use of a specific configuration determined by an n-state inverter and corresponding reversing inverter may depend on a condition. A configuration may also be a limited time use configuration, which may be one time or multiple times after which a used configuration is removed or disabled in the list of configurations on a device. A specific configuration ID refers to the same configuration on the first and the second device.

A description of ECDSA can be in the article "The Fundamentals of an ECDSA Authentication System" by Bernhard Linke of Maxim Integrated, dates May 16, 2014, downloaded from http://pdfserv.maximintegrated.com/en/an/TUT5767.pdf and which is incorporated herein by reference. This reference relates to part DS28E35 called Deep-Cover Secure Authenticator of Maxim Integrated of San Jose, Calif. Other devices with ECC and ECDSA functionality are devices ATECC508A and ATECC108A of Atmel of San Jose, Calif.

The article "The Elliptic Curve Digital Signature Algorithm (ECDSA) by Johnson et al, Certicom Research, 2001, downloaded from http://cs.ucsb.edu/~koc/ccs130h/notes/ecdsa-cert.pdf also provides a description to ECDSA and is incorporated herein by reference.

It is noted that the final determination of $s=k^{-1}*(z+r*dA)$ med n, with n the order of the elliptic curve requires a modulo-n addition and modulo-n multiplication. These operations are modified by a Lab-transform in accordance with an aspect of the present invention.

The cryptographic methods and devices as provided herein are realized by programmable processors with memory or combinational circuitry possibly with memory where convenient or a mixture thereof. There are always at least two computing devices that communicate data by signals, which may be wired or wireless. A computing device may be a computer, a mobile computer, a phone, a tablet, a portable and mobile device with a processor, a smart card, a chip card or any other computing device with processing capability and an interface to communicate with another device.

A chipcard may be applied in an access system or an automatic teller machine (ATM) or to a card reader to perform or complete a transaction. Application may be in exchange of messages such as in e-mail, transactional applications such as placing a purchase, placing an order, obtaining money from a machine, access control, executing a transaction or any operation wherein information is kept confidential or a source or message has to be authenticated or authorized or indicated as not having been modified when it left its source. In accordance with an aspect of the present invention one or more of the methods and devices provided herein are applied to an exchange of data between two devices. In accordance with an aspect of the present invention one or more of the methods and devices provided herein are applied to sending and/or receiving of data from a computing device. In accordance with an aspect of the present invention one or more of the methods and devices provided herein are applied to sending data from a website displayed on a display of a computing device.

Figure 9:
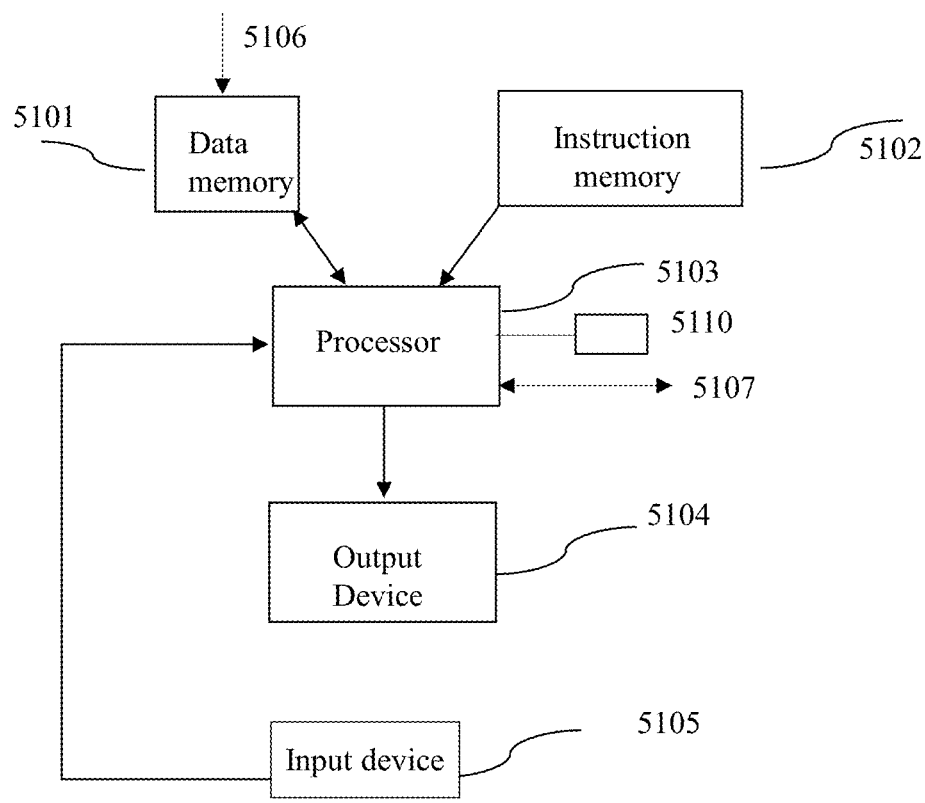
FIG. 9 is a block diagram of a computing device in accordance with an aspect of the present invention.

A system illustrated in FIG. 9 and as described herein is enabled for receiving, processing and generating data. The system is provided with data that can be stored on a memory 5101. Data may be obtained from a sensor or may be provided from a data source. Data may be provided on an input 5106. The processor is also provided or programmed with an instruction set or program executing the methods of the present invention is stored on a memory 5102 and is provided to the processor 5103, which executes the instructions of 5102 to process the data from 5101. Data, such as an image or any other signal resulting from the processor can be outputted on an output device 5104, which may be a display to display data or a loudspeaker to provide an acoustic signal. The processor also has a communication channel 5107 to receive external data from a communication device and to transmit data, for instance to an external device. The system in one embodiment of the present invention has an input device 5105, which may be a keyboard, a mouse, a touch pad or any other device that can generated data to be provided to processor 5103. The processor can be dedicated hardware. However, the processor can also be a CPU or any other computing device that can execute the instructions of 5102. The processor 5103 in some embodiments has integrated or connected to it communication circuitry 5110 with a customized physical interface. A customized interface may be a connector, an antenna, a reader or read/write interface or any other physical interface to transmit and/or receive signals to or from an external device. Accordingly, the system as illustrated in FIG. 9 provides a system for data processing resulting from a sensor or any other data source and is enabled to execute the steps of the methods as provided herein as an aspect of the present invention.

Aspects of the present invention can be advantageously used for and in devices that belong to a controlled community. A controlled community herein means that two devices are instructed, either by locally stored data or from a shared computing device, which cryptographic method to use and how a modified n-state switching function or device is to be determined. Preferably such information is kept confidential between two devices and, if needed, a server. In accordance with an aspect of the present invention, such data is available from a secure server over a secure communication channel. A computing device herein is a device that contains at least one digital device that generates one or more signals in accordance with at least one switching table. The digital device may be but is not limited to a processor, a controller, a memory or storage device such as RAM, DRAM, Flash memory, ROM, PROM, ePROM, disk drive or any other data storage device, combinational circuitry, integrated circuits, FPGA, PLA and the like. Illustrative examples of a computing device include but are not limited to any computer, a desktop computer, a server computer, a blade computer, a processor, a controller, a laptop computer, a tablet computer, a smartphone, a chip card, a smart card, an RFID, a FPGA, a phone, an opening device such as a FOB, a TV set, a media player. A computing device may be a stand-alone device. A computing device may be part of a system wherein the computing device provides and/or receives and/or processes signals such as data signals.

Several computing device community configurations are illustrated in FIG. 13. FIG. 13 has a communication network 6100. Network 6100 may be a single network such as a wireless or wired network or a combination of networks such as the Internet. The network may be a switched network or a packet based network, a private network or a public network or a virtual private network or any other communication network that enables connection of 2 computing devices and of 3 or more computing devices. In one configuration two computing devices 6101 and 6102 with communication circuitry to transmit, receive or transmit/receive signals are provided. The communication circuitry of 6101 and 6102 can transmit signals over a channel 6108. The channel 6108 is identified as a double arrow. This indicates that the channel is bi-directional, but it does not necessarily mean that 6101 and 6102 do both have to transmit and receive, though they may. For instance 6101 is an opening device or a smartcard or any other transmitting device and 6102 is a computing device that is part of an access mechanism that is being activated by one or more signals from 6101. Device 6101 for instance has cryptographic circuitry that generates opening signals that have to be detected and decrypted by 6102. For that application wherein each device has the appropriate instructions and data stored to complete an authenticated transaction, like opening. In one embodiment of the present invention there is thus only one way transmission by 6101 and receiving of data by 6102. The channel is a direct channel, like a wireless or wired or Near Field Communication (NFC) channel, a USB connection, a Bluetooth connection or any other direct connection. For the transaction itself no other channel is required. The devices 6101 and 6102 may have other communication capabilities, such as equipment to connect to network 6100, but are not shown. Devices 6101 and 6102 have different modified n-state switching functions stored on local memory. These may be updated from time to time.

Devices 6101 and 6102 may also perform some mutual authentication or for instance key exchange. In that case 6108 is a dual use (send and receive) channel and the devices 6101 and 6102 both have send a receive equipment. The same applies to devices 6103, 6104, 6105, 6106, 6107 and 6115 and 6116 and communication channels 6109, 6110, 6117, 6118, 6111, 6112, 6113 and 6114.

Computing devices 6103 and 6104 communicate with each other via channels 6108 and 6110 via network 6100. Cryptographic n-state switching functions may be stored locally and may be provided by secure server 6107 which is connected to network 6100 via channel 6114.

Device 6115 and 6116 communicate directly via a channel 6117. Device 6115 is also able to communicate with secure server 6107 via channel 6114. Devices 6105 and 6106 can directly communicate with each other over channel 6112 and with server 6107 via 6100 over channels 6111 and 6113, respectively. As needed 6105 and 6106 can also communicate via 6111 and 6113 via network 6100. Any of the communication channels, even though illustrated by double sided arrows may be single direction as dictated by practical circumstances.

For instance devices 6115 and 6116 communicate directly via 6112 to complete a transaction, such as withdrawing money from an ATM 6115 machine with a smartcard 6116 and 6115 uses 6118 for verification from 6107 via network 6100. Assume 6116 to be a chipcard or smartcard which is connected to 6115. During an established connection 6116 can be updated with additional or replacement modified n-state switching functions.

Computing devices can be mobile or fixed. For instance 6103 and 6104 are two computing devices that are connected to the Internet, for instance 6103 is a computer, such as a PC, a smartphone, a tablet and 6104 for placing an order and 6104 is a server for processing the order. For instance 6103 is a computing device which may be a server, a PC, a smartphone, a tablet and the like to monitor and/or control an IoT (Internet of Things) device 6104 with a processor such as a camera, a medical device, a security device such as a lock or fire monitor, a thermostat, an appliance, a vehicle or any other IoT device.

Many transactions between computing devices are unique and ephemeral and require one time protection, access, authentication. It is in many cases bad security practice to re-use all the same security parameters. The use of different modified n-state switching tables conforms nicely with security requirements and prevents or at least minimizes the use of dictionary tables and rainbow tables. In accordance with an aspect of the present invention two devices apply not only different modified n-state switching tables but also different cryptographic methods. For instance two devices are configured with at least 2 different hashing methods, for instance at least SHA-3 and MD5. Condition based, the devices select one of the pre-programmed hashing methods and apply modifications as provided herein. This makes cryptanalysis much more difficult. In accordance with an aspect of the present invention the message digest that is generated is padded that makes it hard to determine from size alone which method was used.

In other cases, such as in exchange or storage of information, it is important to protect confidentiality of information. The use of different encryption methods, such as at least 2 different methods, such as AES and 3DES, each method being modified as provided herein makes cryptanalysis much more difficult.

Illustrated examples have been provided using Matlab to describe devices. A processor programmed with instructions and that receives signals on an input and generates signals represented data on an output is a device. Matlab is a convenient way to describe the device. Matlab is a script that is interpreted or compiled into executable code that together with a hard coded instruction set on the processor forms a dedicated computing machine that is a customized, usually electronic, switching machine or structure. Other switching mechanisms are known and include optical switching and quantum-mechanical switching devices.

Matlab programs have been provided herein as illustrated examples and with results generated by a computer running Matlab. The Matlab programs were run under Matlab 7.1 on a Dell Inspiron 660 with Intel® Core™ i3-3240 CPU @3.40 GHz with 8 GB memory and a 64-bit Operating System under Windows 7 Home Premium.

In accordance with an aspect of the present invention, the device characterized by a FLTed switching table is used in a cryptographic device operated completely or substantially in accordance with a published standard. Substantially in this requirement means that one of ordinary skill in cryptography recognizes that over 50% of operating steps comply with a cryptographic standard. Standards include but are not limited to the following published standards or updated versions thereof: SP 800-67, Revision 1, Recommendation for the Triple Data Encryption Algorithm (TDEA) Block Cipher, 2012; FIPS PUB 46-3 Data Encryption Standard (DES), FIPS PUB 180-4 Secure Hash Standard (SHS) 2015 defines the SHA family; FIPS PUB 186-4 Digital Signature Standard (DSS) 2015; FIPS PUB 202 SHA-3 Standard: Permutation-Based Hash and Extendable-Output Functions, 2015; FIPS PUB 198-1, The Keyed-Hash Message Authentication Code (HMAC), 2008; FIPS PUB 197—Advanced Encryption Standard, (AES), 2001; RSA Laboratories PKCS #1 v2.2: RSA Cryptography Standard, Oct. 27, 2012; RSA Laboratories PKCS #3: Diffie-Hellman Key Agreement Standard Revised Nov. 1, 1993; The Elliptic Curve Digital Signature Algorithm (ECDSA), Johnson et al. 2001, Certicom Corporation 2001; Standards For Efficient Cryptography SEC 1: Elliptic Curve Cryptography, version 2, Certicom Research, 2009; OpenPGP Message Format, Memo, Callas et al., 2007, RFC4880, downloaded from https://tools.ietf.org/html/rfc4880; which are all incorporated herein by reference.

The Lab-transform as provided herein modifies existing cryptographic methods and apparatus and/or provides novel cryptographic methods and apparatus. It is believed that underlying approaches of cryptography are known to one of ordinary skill and well documented in technical literature and standards. However, all aspects related to FLT modified devices are novel.

A FLTed n-state switching table has a similar meaning as a binary switching table (such as XOR, AND, NAND, etc.) or of a Karnaugh switching table or map which are realized in a circuit that is a memory circuit, a combinational circuit or any other circuit that processes signals. Relationship between realization of digital devices (realization) and functional description of these devices (implementation) is explained in Digital System Implementation by Gerrit A. Blaauw, Prentice Hall, Englewood Cliffs, N J, 1973 which is incorporated herein by reference.

The terms "2-input/output" and "2-input/single output" are used herein. This indicates a minimum configuration wherein a device has at least 2 inputs and one output and is characterized at least by an n by n matrix wherein one index (for instance row index) represents a state of first input and another index (for instance column index) represents a state of a second input and a content of the matrix defined by the two indices defines a state of the output.

Cryptography devices are used at signal transmitting and signal receiving devices. In certain cases the transmitting devices perform encryption and the receiving devices perform decryption. In other cases both side devices perform the same operation such as hashing of a message. In other cases transmitting and receiving devices perform complementary operations, such as in some public key operations. The herein provided embodiments expressly include a transmitting side cryptographic device and a receiving side cryptographic side. In one embodiment of the present invention, data is stored in encrypted form on a storage device or memory. The encryption/decryption is only known to a device that is authorized to store the data and to retrieve the data. In one embodiment of the present invention a device that is authorized to store data is enabled to encrypt the data while devices that are entitled to retrieve data are enabled to decrypt the data. In symmetric encryption such as AES, security is provided by a keyword. The encryption and decryption are in many respects identical. In 3DES and AES for instance, decryption uses encryption in reverse order.

One problem that may increase the time for execution on a processor is multiple execution or exponentiation of an n-state switching function. In one embodiment of the present invention, one may reduce the n-state switching table of an FLTed switching function as illustrated in FIG. 1 into a single switching table. This reduction process for inverters at inputs has been explained by the inventor in U.S. Pat. No. 7,643,632 issued to Lablans on Jan. 5, 2010 which is incorporated herein by reference. A final step to modify an n-state switching table in accordance with an FLT is to substitute the output states 'z' as shown in 4400 in FIG. 33 in accordance with inverter 'rinv.' The process seems to be counter-intuitive, because at its face 'rinv' reverses back the effect of 'inv.' However that is not true as the FLTed switching table is generally different from the original one.

Repeated FLTed Operations (Exponentiation)

Exponentiation in cryptography is repeated application of an operation, such as addition or multiplication. One issue is then if exponentiation of FLTed functions leads to repeated execution of the FLT for the individual function, thus creating a much slower overall operation in methods that apply exponentiation like RSA and Diffie-Hellman.

Figure 35:
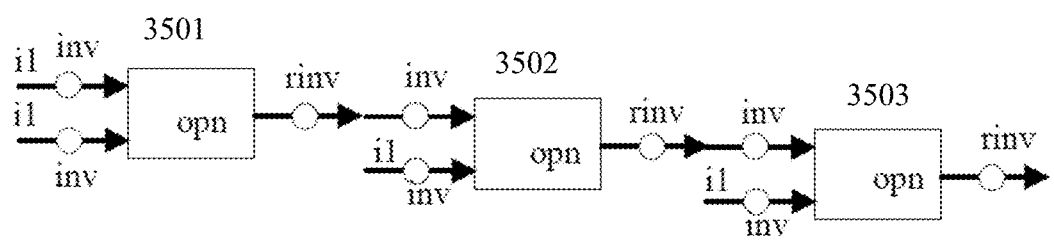
FIGS. 35 and 36 are diagrams of devices provided in accordance with one or more aspects of the present invention.

It turns out that the basic structure of the FLT leads to considerable simplification of exponentiation of FLTed functions. The exponentiation of an operation 'opn' FLTed with inverter 'inv' and its reverse 'rinv' as (i1)4 is illustrated in FIG. 35.

Figure 36:
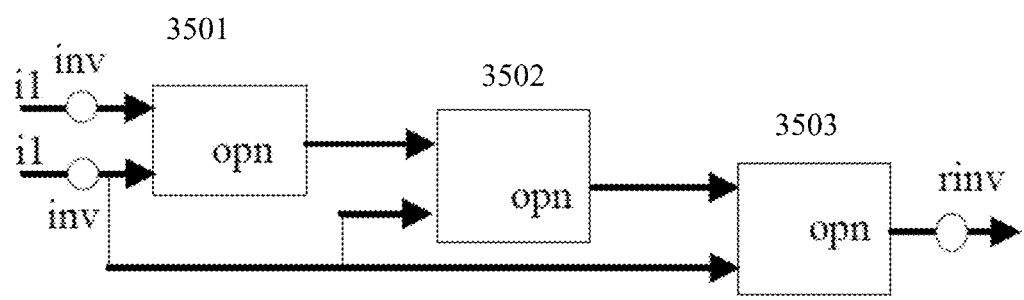

There are two simplifications that can be applied. One—the inverse of input i1 or inv(i1) is determined at the beginning of the exponentiation and can be stored and does not have to be recalculated. Second, the reversing inverter rinv at the output is followed by an inverter inv at the input of the next stage. However inv(rinv(i1))=i1 because in combination rinv and inv form identity. This leads to the simplified structure as shown in FIG. 36.

The FLT is a property preserving transformation that preserves important or meta-properties of a switching table. Devices use or implement the same switching function represented by the same FLTed n-state switching table. An FLT is preferably held secret to a group of at least 2 devices that communicate over a communication channel. Switching devices characterized by FLTed n-state switching tables are part of a cryptographic machine or a machine or computer that performs a cryptographic method. The cryptographic method that applies the FLT is at least as secure as the non-modified method, with the FLT providing additional security. A brute force attack on the FLTed method has to fully perform the method to compare results. Accordingly an n-state FLT (one that uses n-state inverters) with at least k different possible n-state switching functions from a standard switching functions, improves the security of a modified cryptographic method with a factor k. Assume a complexity O(n) associated with an n-state cryptographic method. Complexity may depend on for instance number of rounds in a method, the size of n, the size of a keyword, etc. By using one of k FLTs one may also reduce the complexity of a method (reduce number or rounds, reduce size of keyword, reduce n) and still achieve at least the same level of security as the original method.

In one embodiment of the present invention one or more cryptographic communities are formed that apply an agreed upon one or more n-state inverters for a cryptographic method, preferably for a limited time.

For very large values of n (like for 100 decimal digits or greater) the use of inverter rules rather than stored inverters is preferable. One rule, provided above, is y=a*x+b mod-n. Because an FLT may likely only be attacked by brute force by evaluating a complete message, such a rule may already be sufficient. Other rule based reversible n-state inverters are possible. One such other rule is: use multiplications/additions mod-(m) as a source for inverters with m>n. For instance select a multiplication factor k mod-(n+1) wherein k is relative prime to (n+1). This means that the row of the multiplication k in a switching table of multiplication mod-(n+1) has all unique elements. However, it contains a number related to (n+1) in origin 1 or to n in origin 0. Working in origin 1 (index runs from 1 to n+1; index would run from 0 to n in origin 0, all for n+1 multiplication): there are two possible variations of the row: 1) the number related to (n+1) occurs in row at index smaller than (n+1); or (n+1) occurs in position (n+1) in a row representing the multiplication.

If (n+1) occurs at index smaller than (n+1) in a row, it means that at index position (n+1) in a row a number occurs that is smaller than (n+1). In that situation the number (n+1), assumed to be in position p<n+1 is replaced by number q in position (n+1). As a consequence positions 1:n in the modified row now all have numbers (or states) smaller than (n+1) or are all numbers in the range 1:n. Accordingly, the new row is a reversible n-state inverter.

If (n+1) occurs at position (n+1) all numbers in row in position 1:n are smaller than n+1 and thus is the row from 1:n is automatically a reversible n-state inverter. A process of creating 16-state reversible inverters from a multiplication modulo-17 is illustrated in FIG. 38 and FIG. 39. FIG. 38 shows an origin 1 17-state switching table derived from multiplication mod-17. FIG. 39 shows a table of rows of 16-state reversible inverters derived from the table of FIG. 38 by replacing state 17 with the last state of the corresponding row of FIG. 38.

One may determine the replacements also numerically. That is: in a row representing a multiplication k modulo-17, the value 16 at position p is replaced by the value at position 17. For instance, the row representing multiplication with factor 7 (row 8 in FIG. 38) the position for 16 origin-0 or 17 origin-1, occurs when 7*x mod-17=16 or x=16*7$^{-1}$. One may calculate with the extended Euclidean algorithm (EEA) that 7$^{-1}$ mod-17=5. Thus x=5*16 mod-17=12. One may also look in the table of FIG. 38 for which value of x mg17(8, x)=17 (being in origin 1). That value is 13 origin-1 or 12 origin-0. Furthermore: 7*16 mod-17=10 (or 11 in position 17 in row 8 of FIG. 38). This means that the value 17 in row 8 at position 13 is replaced by value 11 in FIG. 39.

For determining the reversing 16-state inverter one may use the common method of reversing, wherein the position of an element of the reversing inverter is the state of the n-state inverter and the state of the element in the reversing element is the position of the element in the original inverter. For large values of n an n-state inverter rule has to be applied. In that case, wherein the rule was multiplication by k mod-(n+1) the reversing rule is multiplication by k$^{-1}$ mod-n+1. Thus, in the above example, wherein the rule was multiplication with 5-mod-17 the reversing inverter is multiplication by 5$^{-1}$ mod-17. 5$^{-1}$ mod-17 is 7. In the reversing inverter, the element 16 occurs at: 5$^{-1}$*y mod-17=16 or for y=12. The last element of the row associated with multiplication by 7 is 7*16=10. Following the same rules of exchange the value 16 at position 12 is replaced by value 10 as the reversing element.

One may apply the same approach as explained above for a modification based on rule: y=a*x+b mod(n+1). The value (n+1) or any (n+k) for determining n-state inverters in origin-1 are exceptions that have to be detected and replaced in order to create a valid n-state inverter. For n being very large (tens of digits) the chance of generating a value (n+1) becomes very small. A potential (and presumably minor) disadvantage of using the above inverter rule is a small but perhaps not desirable number of processor cycles to detect a value n or greater and to determine the alternative value that should be substituted. In one embodiment of the present invention, exception values may be pre-calculated and stored, for instance by a central computer or server that may distribute rules and exceptions to participating computing devices. Distribution may take place through a network or through physical devices such as portable and/or pluggable memories (such as memory sticks or storage devices). Furthermore, the above rule approach is not limited to bumping up to values (n+1). One may bump up to values (n+k) with k being in a range preferable from 2 to 10, more preferably from 10 to 50, or even greater than 50. One is reminded that in certain applications such as Diffie-Hellman, RSA and others, n is very large and even with k=50 the chance of generating an exception is very small. One may minimize the risk at values of k by selecting rules that have a minimal number of exceptional states in the first n positions.

In some cases duplication of FLT results occur. That is: seemingly different n-state inverters may generate from a particular switching table an identical switching table. This is generally not desirable. The duplication effect appears from simulations to be most significant for additions over $GF(n=2^p)$ and much less so for other values of n and for multiplications. This duplication effect is most serious wherein an FLT results in a switching table that is identical to its original one. This can easily be prevented by selecting an inverter for an FLT that has no elements common in corresponding positions with identity or has at least a transformation of its zero-element. There are at least $(n-1)!$ of those n-state inverters. It is also undesirable that two different n-state inverters generate from an n-state switching table by FLT the same switching table but different from the original.

A simple test can detect such undesirable transforms, so they can be removed. In one embodiment and especially for n being large, like having 50 digits, one may do one or more tests. A first test is applying two inputs i1 and i2 to an n-state operation 'op' with as result r1. Like op(i1,i2)=r1. The FLT of 'op' is 'opf'. One then determines opf(i1,i2)=f. If rf=r1, then the specific FLT is not used. Preferably some intelligence is applied to the test. For instance an FLT that leaves the zero-element unchanged in an addition over $GF(2^p)$ will leave the result of the operation with i1=i2 unchanged, but does not mean that the FLTed function is identical to the original one. Furthermore, especially if identical parameters are used in subsequent FLT modified operations, one should check that identical parameters will not generate identical results in operations that use different FLTs. The chance for that is extremely small. However, good cryptographic practices should remove any FLT that would increase risk of successful attack.

Simulations on a computer indicate that for larger values of n, like n greater than 16 or n greater than 32, the relative significance of duplications greatly diminishes as to be insignificant for larger numbers of n. It seems that unique FLTs occur at a rate of $(n-k)!$, wherein k is a fraction of n. For n=16 duplications of additions $GF(2^{16})$ are about 1 in $10^7$ and less than 1 in $10^{11}$ for n=32. These numbers are even better for multiplications.

Number of duplications for n is prime are very small. For n=7 addition duplications are 5 and just 1 multiplication. For n=11 there are 9 duplications of additions and 3 for multiplications. For n=13 duplications of additions occur about 11 times and multiplications duplicate about 3 times. That is while 13! is about $6*10^9$ so he effect is negligible. Furthermore, duplications do not occur in rule based inverters as described herein.

For n being very large, the effects of moving from n to at least n+1 are significant. One preferably should use representative values of inputs and factors that are greater than square root of n to see significant changes in inverters.

Preferably, n-state inverters or n-state inverter rules to be applied in an FLT are held confidential to preferably the participating devices in application of the FLT and possibly a central authority or computer device that may generate and/or distribute the inverters. Preferably a large but finite number of different n-state inverters is generated and tested on uniqueness etc. before being distributed and/or installed on a device that will use the inverters for FLT. In one embodiment there are at least 1000 different inverters, or at least 100,000 different inverters or at least 1,000,000 different inverters or more than 1,000,000 inverters that are stored (either in its entirety or as a rule) in a memory/storage on a device. The inverters and/or rules are stored and/or used in a specific order. Each inverter and/or rule are provided with a unique code that identifies a specific inverter or rule. Preferably such a code is meaningless to the outside world and has only meaning to participating devices. A device that participates in communication with another device may provide a unique code to another participating device to inform which inverter or rule will be used. In one embodiment a remote authority or server may instruct participating devices about the to be used FLT.

Different forms of synchronization of FLTs may be used and are fully contemplated. Preferably a specific FLT or inverter or inverter rule is used for a limited time, after which the specific inverter or inverter-rule is disabled or access to it is disabled. One may overwrite an identifying code with for instance all 0 or all 1 digits to make it irretrievable as a valid code. One may also overwrite the entire stored inverter and ID code with all 0s or any pattern that makes it unusable as an inverter. In another embodiment a non-usage code may be attached to an inverter, making the processor skip or ignore the inverter or inverter rule.

Generating off-line at least a billion unique or even 100 billion unique n-state inverters is fairly easy and would just take some time and storage space. One could then make a smaller selection from the generated inverters or inverter rules and provide them each with a unique code that appears to be random in order to the outside world. It thus creates extremely secure cryptographic communities with a level of security that may be at least a factor 1000 higher than non-FLTed cryptographic methods. Increased security is defined herein as the factor of time in computer effort that is required to successfully attack the FLTed method, compared to attack time needed to successfully attack the not FLTed cryptographic method using the same or at least similar computer power. While a factor 1000 is mentioned it is believed that it has been shown that at least a factor $n^2$ in security improvement can be achieved for n being 256 or greater in using an n-state FLT. Further analysis will most likely show that for n being 256 or greater the level of security improvement as defined above can be made at least factorial 200 (200!).

Cryptographic methods like encryption, decryption, message digest generation, digital signatures generation, public key cryptography, elliptic curve cryptography and the like are all computer or machine based operations. They are based on machine procedures that cannot reasonably be done in the mind of humans with or without paper and pencil. They are commonly based on intractable machine problems that cannot be solved by computers or humans within a reasonable time, but can be easily generated by a computer but not by a human. Thus, cryptography herein is machine based cryptography, specifically designed for machines and to be performed by machines. It has a level of complexity that makes it impracticable for a human to be performed within any reasonable time. Basics of machine cryptography are often illustrated for small values of n and are often called toy-examples. Complexity of n-state problems as posed herein increases on a factorial k basis, wherein k may be somewhat smaller than n. It should be clear that at even fairly small values of n solving modified computer based cryptographic problems becomes intractable.

Existing computer cryptographic methods are under continual review and attack. Security of these methods is decreased by increasingly powerful computers or networked computers for attacks which may be brute force attacks. Many methods may lose security due to quantum-computing attacks in the future. FLT modified methods as described herein may be a powerful counter measure against diminishing security. Furthermore, many Internet-of-Things (IoT) devices are connected to servers over insecure Internet connections and require sufficiently secure cryptographic protection. This need is illustrated by recent hacking of Internet connected in-house camera systems. Because IoT devices are generally light on processing power, there currently may be insufficient cryptographic protection. Furthermore, a successful attack on a specific method may render the entire method insecure. FLT based modification allows the use of minimal processing power and the application of lower values of n in n-state methods while offering at least the same or even greater security than the unmodified method. This is particularly significant in the increased control of devices through smartphones.

In one embodiment of the present invention the FLT is applied in cryptographic communication directly from IoT device to a smartphone and thus may be under control of a user. In another embodiment of the present invention, cryptography between an IoT device and a controlling or a monitoring device such as a computer, smartphone or other computing device, is conducted via a server that conducts FLT modification and communication between IoT device and server. Cryptography between server and controlling device may apply standard (not FLTed) cryptographic methods or FLTed cryptographic methods. In preferred embodiments the cryptography between IoT device and server is different from cryptography between server and user device or monitoring and/or controlling device.

In accordance with an aspect of the present invention, n-state switching circuits and n-state computer operations are provided. The value of 'n' herein is preferably greater than 7, or greater than 8, or greater than 15, or in one embodiment greater than 63, or in one embodiment greater than 255, or in one embodiment greater than 1023 and or in one embodiment greater than 1,000,000. In one embodiment of the present invention n is greater than $2^{100}$ (two to the power hundred). In one embodiment of the present invention $n=q^p$ with q a prime number and p is preferably 2 or greater, more preferably 3 or greater, and even more preferable 4 or greater.

As stated earlier above, an FLTed n-state device may be realized in a modified n-state switching table or a modification by way of n-state inverters of an n-state switching table. One may realize the modification by way of discrete components, memories, instructions, combinational circuits or a combination thereof. One should be aware that any of the above modifications effects a change in execution by physical hardware. An FLTed cryptographic method is characterized, at least partially by an FLT modified n-state switching table. It does for the result not matter if an entire FLTed n-state switching table is stored or that individual inverters are used. A criterion for determining if the characterizing FLTed switching function is novel is: was the n-state switching table known previously? A test that fulfills the criterion of a novel FLTed n-state switching table is: there is an n-state inverter (and a corresponding reversing n-state inverter) that modifies a known n-state switching table (for instance of a modulo-n operation) into a novel n-state switching table.

The following patent applications, including the specifications, claims and drawings, are hereby incorporated by reference herein, as if they were fully set forth herein: (1) U.S. Non-Provisional patent application Ser. No. 10/935,960, filed on Sep. 8, 2004, (2) U.S. Non-Provisional patent application Ser. No. 10/936,181, filed Sep. 8, 2004, (3) U.S. Non-Provisional patent application Ser. No. 10/912,954, filed Aug. 6, 2004, (4) U.S. Non-Provisional patent application Ser. No. 11/000,218, filed Nov. 30, 2004, (5) U.S. Non-Provisional patent application Ser. No. 11/139,835 filed May 27, 2005, (6) U.S. Non-Provisional patent application Ser. No. 12/137,945 filed on Jun. 12, 2008; (7) U.S. Non-Provisional patent application Ser. No. 11/679,316, filed on Feb. 27, 2007; (8) U.S. Non-Provisional patent application Ser. No. 11/964,507 filed on Dec. 26, 2007; (9) U.S. Non-Provisional patent application Ser. No. 12/273,262, filed on Nov. 18, 2008.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention.

The invention claimed is:

1. A device to provide cryptographic data on a communication channel, comprising:
   a processor and a memory coupled to the processor, wherein the processor is capable of executing programmed instructions stored in the memory to perform the steps:
   processing a message in an n-state symbol format with n greater than 4 in accordance with a modification of an n-state computer operation in a cryptographic method, the cryptographic method being selected from the group consisting of an encryption, a decryption, a Diffie-Hellman key exchange, a message digest generation, an elliptic curve cryptographic operation, a digital signature generation, a message authentication code (MAC) generation, the modification is a Finite Lab Transform (FLT) of the n-state computer operation into a Finite Lab Transformed (FLTed) n-state computer operation, the n-state computer operation is selected from the group consisting of a modulo-n addition, a modulo-n multiplication, an addition over finite field GF(n), a multiplication over finite field GF(n) and an n-state multiplication all with n greater than 4, wherein the FLT includes a reversible n-state inverter on a first input and a same reversible n-state inverter on a second input to the n-state computer operation and a reversing n-state inverter on an output of the n-state computer operation, a combination of the reversible n-state inverter and the reversing n-state inverter establishing identity; and wherein
   the FLTed n-state computer operation is different from the n-state computer operation and the FLTed n-state computer operation is not in the group consisting of: a modulo-n addition, a modulo-n multiplication, an addition over finite field $GF(n=q^p)$ with q a prime number and p greater than 2 and determined by an irreducible polynomial of degree p over GF(q), a multiplication over finite field $GF(n=q^p)$ determined by an irreducible polynomial of degree p over GF(q), p bitwise XOR operations with p being greater than 2; and providing the cryptographic data, generated in accordance with the modification of the cryptographic method, on the communication channel.

2. The device of claim 1, wherein the FLTed n-state computer operation has a one element that is not interpreted as 1 and/or has a zero element that is not interpreted as 0.

3. The device of claim 1, wherein the FLTed n-state computer operation represents a modified modulo-n multiplication.

4. The device of claim 1, wherein the FLTed n-state computer operation represents a modified multiplication over a Finite Field GF(n=$2^p$) with GF being a galois field and p an integer greater than 2.

5. The device of claim 1, wherein the device performs an Advanced Encryption Standard (AES) encryption or decryption as described in a Federal Information Processing Standard (FIPS) Publication that is modified in accordance with the FLT.

6. The device of claim 1, wherein the device performs a message digest generation as described in a Federal Information Processing Standard (FIPS) Publication that is modified in accordance with the FLT.

7. The device of claim 1, wherein the device performs a digital signature generation as described in a Federal Information Processing Standard (FIPS) Publication that is modified in accordance with the FLT.

8. The device of claim 1, wherein the device performs a Rivest-Shamir-Adleman (RSA) operation that is modified in accordance with the FLT.

9. The device of claim 1, wherein the device performs an elliptic curve cryptography (ECC) operation that is modified in accordance with the FLT.

10. The device of claim 1, wherein the device is a networked computer.

11. The device of claim 1, wherein the device is a smartphone.

12. The device of claim 1, wherein the device is a chipcard.

13. The device of claim 1, wherein the device is a door opener.

14. The device of claim 1, wherein the device is configured in accordance with a Transport Layer Security (TLS) protocol.

15. The device of claim 1, wherein n is greater than two to the power hundred.

16. A method for generating cryptographic data, comprising:

processing a message in an n-state format with n greater than 4 by a processor in accordance with a modification of an n-state computer operation in a cryptographic method, the cryptographic method being selected from the group consisting of an encryption, a decryption, a Diffie-Hellman key exchange, a message digest generation, an elliptic curve cryptographic operation, a digital signature generation, a message authentication code (MAC) generation, the modification is a Finite Lab Transform (FLT) of the n-state computer operation into a Finite Lab Transformed (FLTed) n-state computer operation, the n-state computer operation is selected from the group consisting of a modulo-n addition, a modulo-n multiplication, an addition over finite field GF(n), a multiplication over finite field GF(n) and an n-state multiplication all with n greater than 4, wherein the FLT includes a reversible n-state inverter on a first input and a same reversible n-state inverter on a second input to the n-state computer operation and a reversing n-state inverter on an output of the n-state computer operation, a combination of the reversible n-state inverter and the reversing n-state inverter establishing identity; and wherein the FLTed n-state computer operation is different from the n-state computer operation and the FLTed n-state computer operation is not part of the group consisting of: a modulo-n addition, a modulo-n multiplication, an addition over finite field GF(n=$q^p$) with q a prime number and p greater than 2 and determined by an irreducible polynomial of degree p over GF(q), a multiplication over finite field GF(n=$q^p$) determined by an irreducible polynomial of degree p over GF(q), p bitwise XOR operations with p being greater than 2; and providing by the processor of the cryptographic data generated in accordance with the modification of the cryptographic method on the communication channel.

17. The method of claim 16, wherein the FLTed n-state computer operation has a zero element that is not 0 in origin-0.

18. The method of claim 16, wherein the processor is included in a device selected from the group consisting of: a computer, a smartphone, a chipcard, an ATM-machine, a device connected to the Internet, a Near Field Communication (NFC) device.

* * * * *